Dec. 11, 1945.     W. T. GOLLWITZER     2,390,583
PRINTING MACHINE
Filed July 21, 1941     19 Sheets-Sheet 3
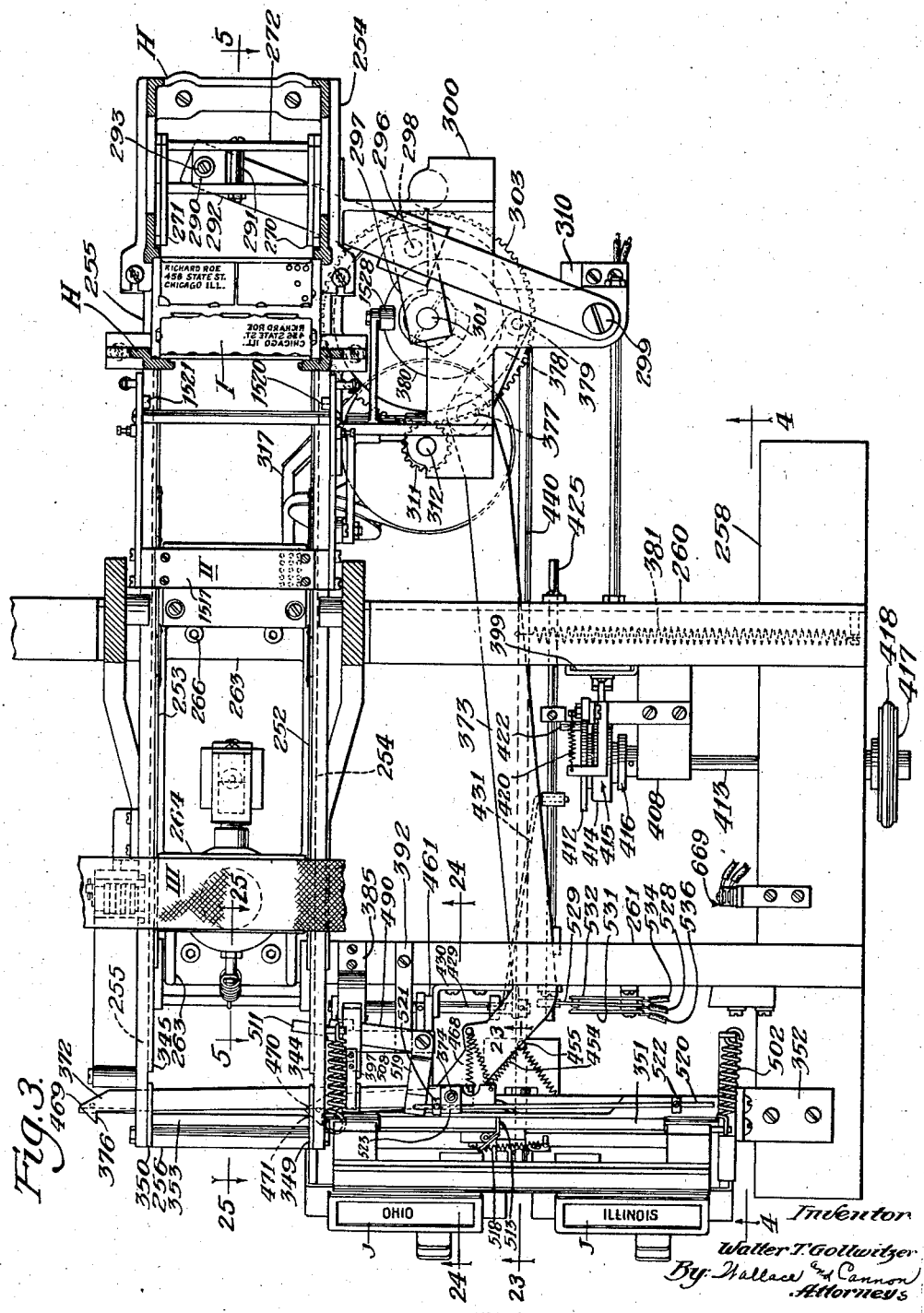
Inventor
Walter T. Gollwitzer
By Wallace and Cannon
Attorneys

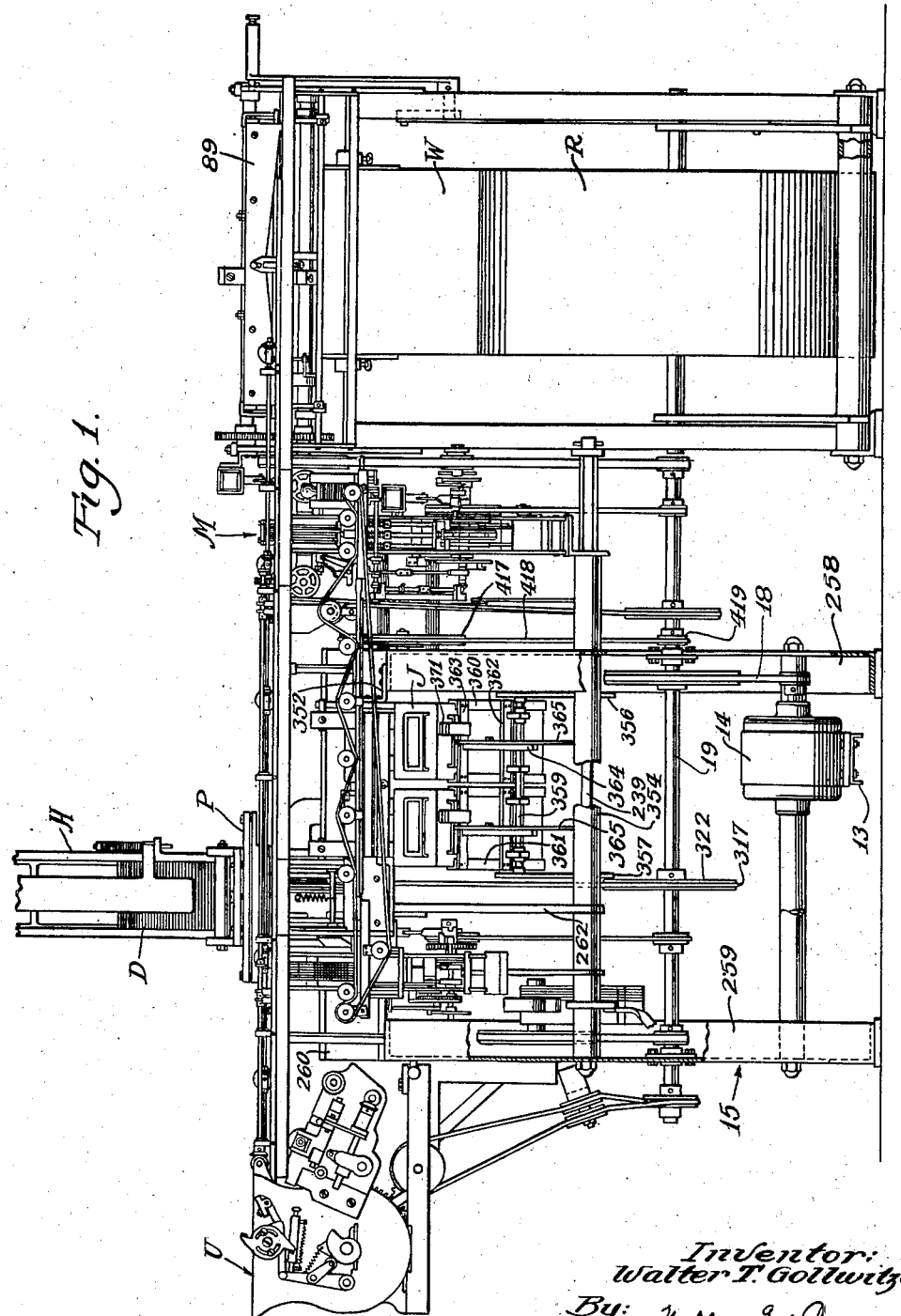

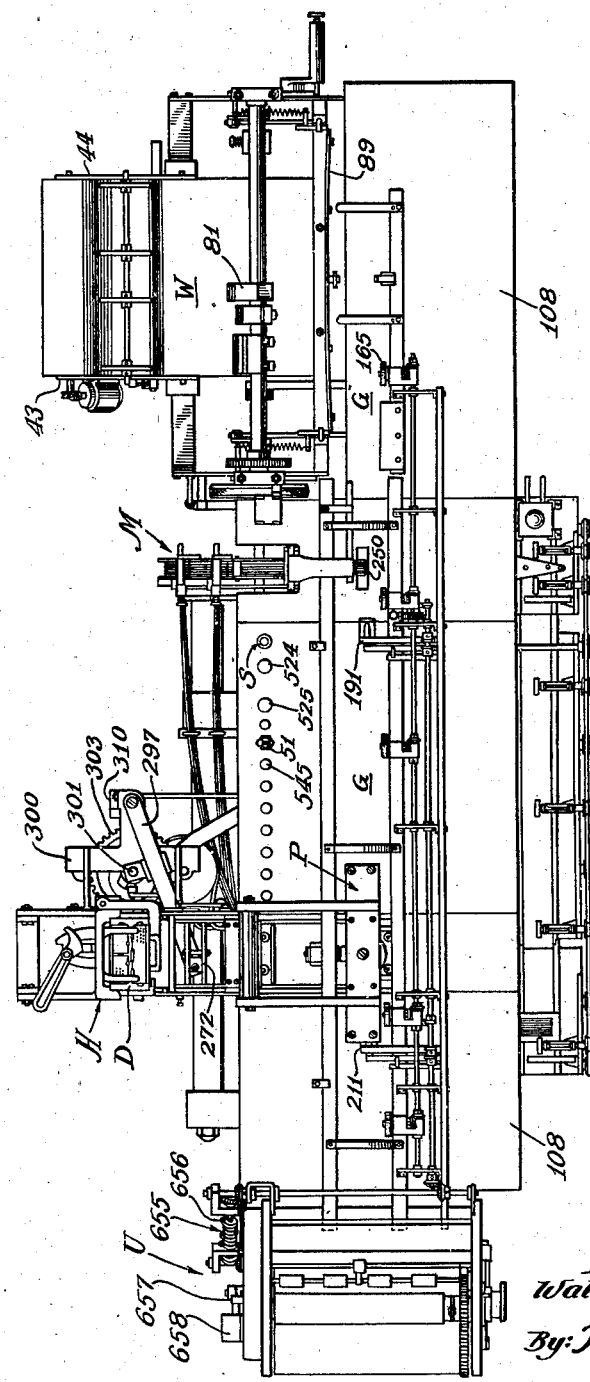

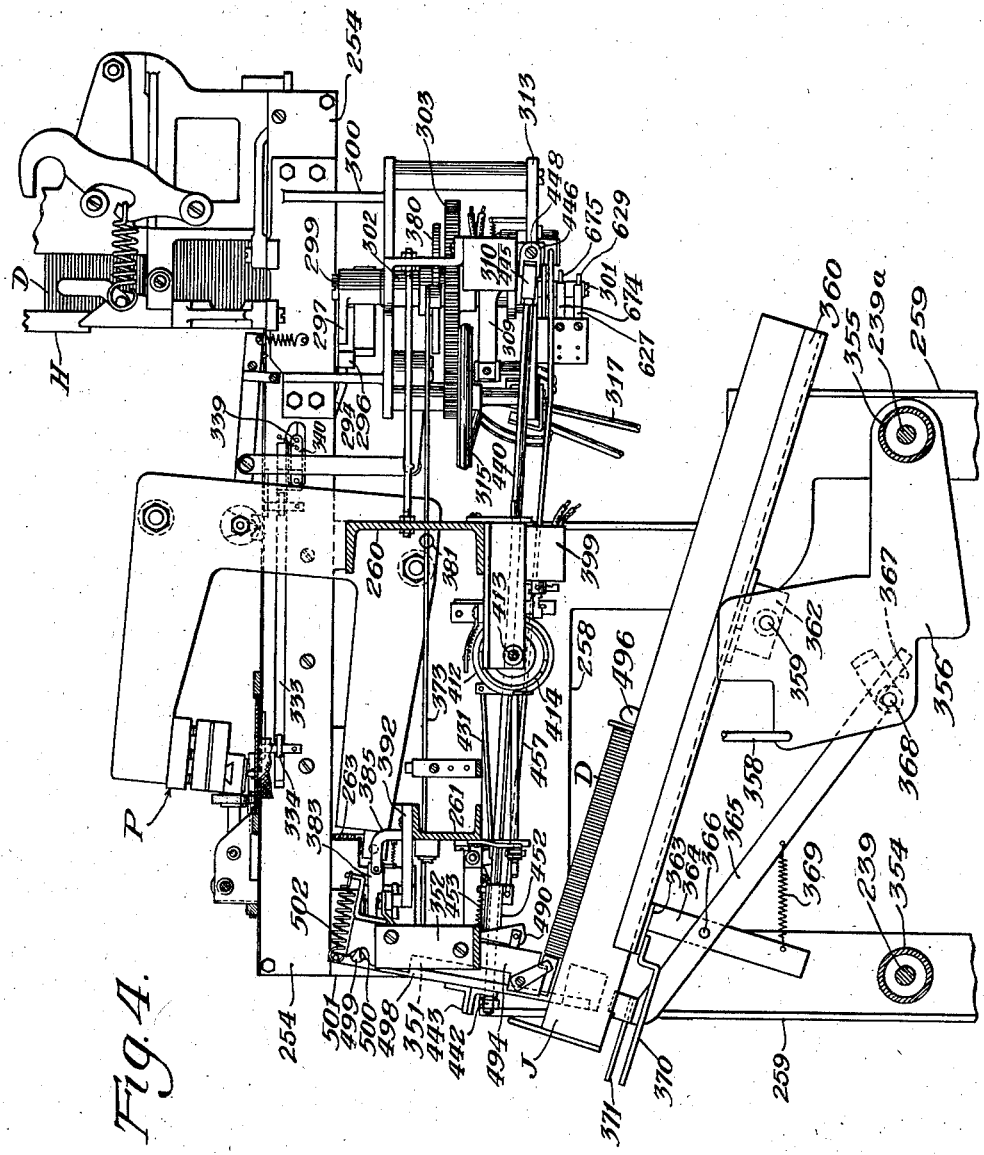

Dec. 11, 1945. W. T. GOLLWITZER 2,390,583
PRINTING MACHINE
Filed July 21, 1941 19 Sheets-Sheet 5
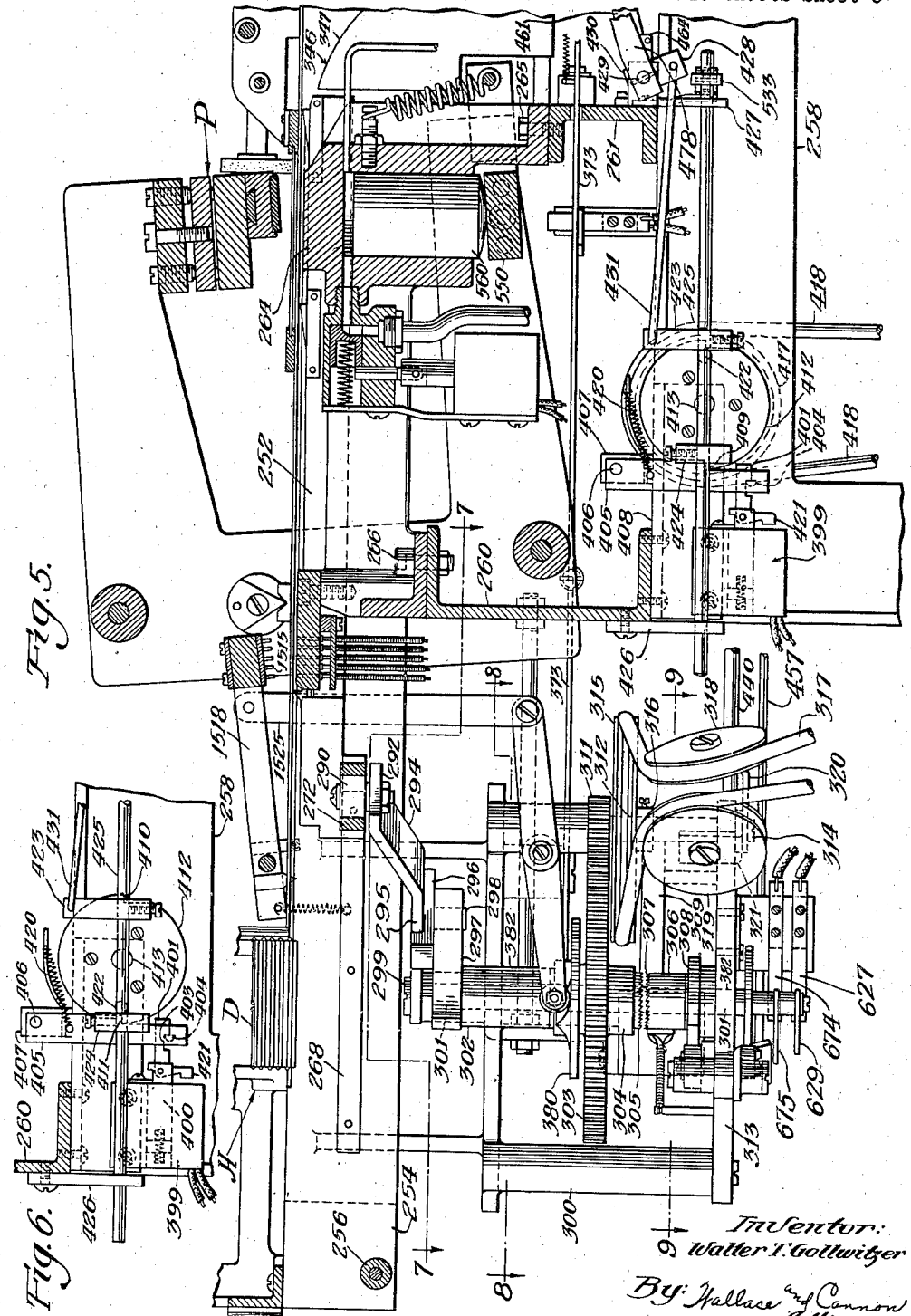
Inventor:
Walter T. Gollwitzer
By Wallace and Cannon
Attorneys Dec. 11, 1945.  W. T. GOLLWITZER  2,390,583
PRINTING MACHINE
Filed July 21, 1941   19 Sheets-Sheet 6

Inventor:
Walter T. Gollwitzer
By Wallace and Cannon
Attorneys

Dec. 11, 1945.  W. T. GOLLWITZER  2,390,583
PRINTING MACHINE
Filed July 21, 1941  19 Sheets-Sheet 7

Inventor:
Walter T. Gollwitzer
By: Wallace and Cannon
Attorneys

Dec. 11, 1945.  W. T. GOLLWITZER  2,390,583
PRINTING MACHINE
Filed July 21, 1941    19 Sheets-Sheet 8
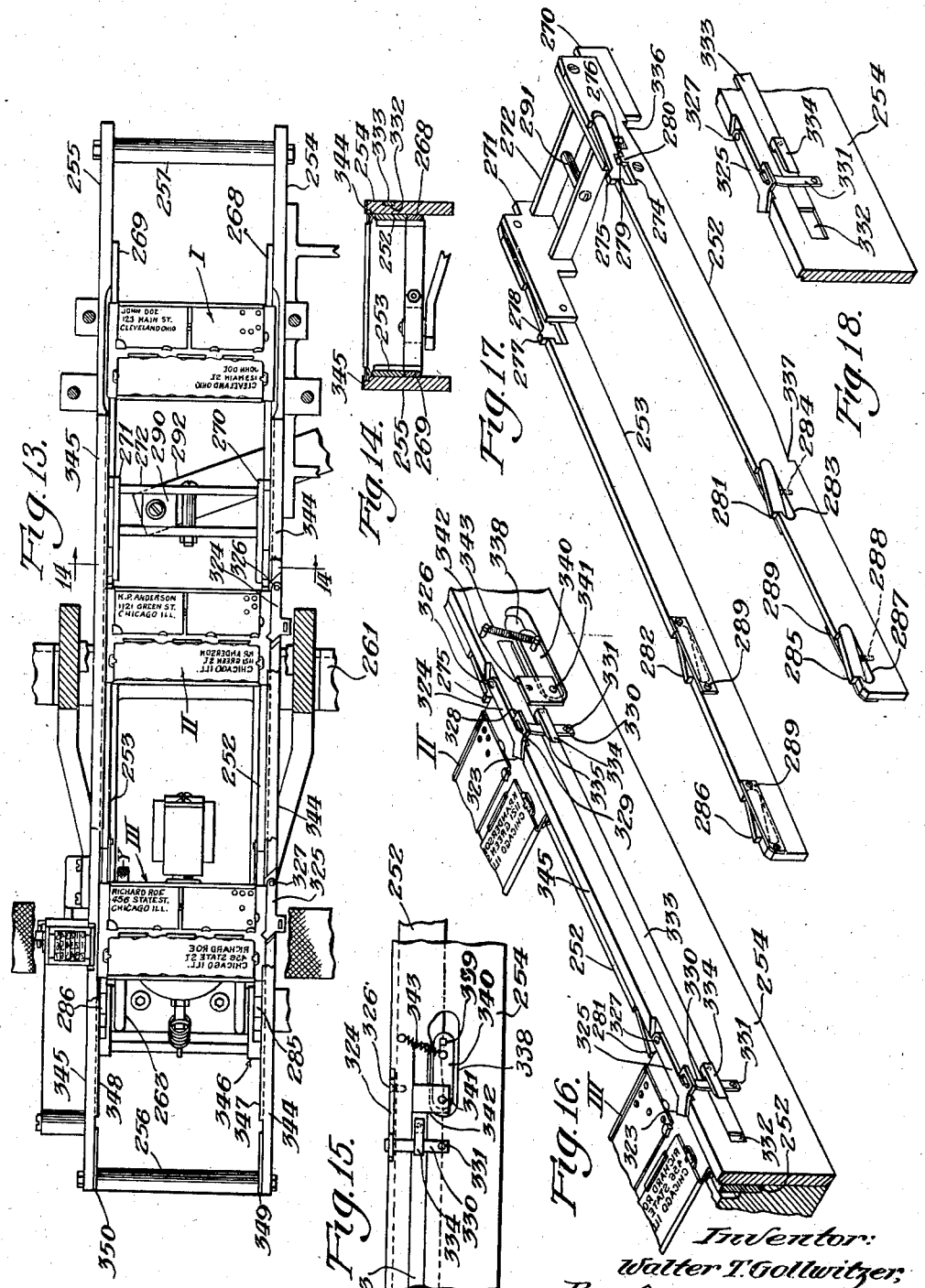
Inventor:
Walter T. Gollwitzer;
By: Wallace and Cannon
Attorneys Dec. 11, 1945.   W. T. GOLLWITZER   2,390,583
PRINTING MACHINE
Filed July 21, 1941   19 Sheets-Sheet 9

Inventor:
Walter T. Gollwitzer
By: Wallace and Cannon
Attorneys

Dec. 11, 1945.   W. T. GOLLWITZER   2,390,583
PRINTING MACHINE
Filed July 21, 1941   19 Sheets-Sheet 10
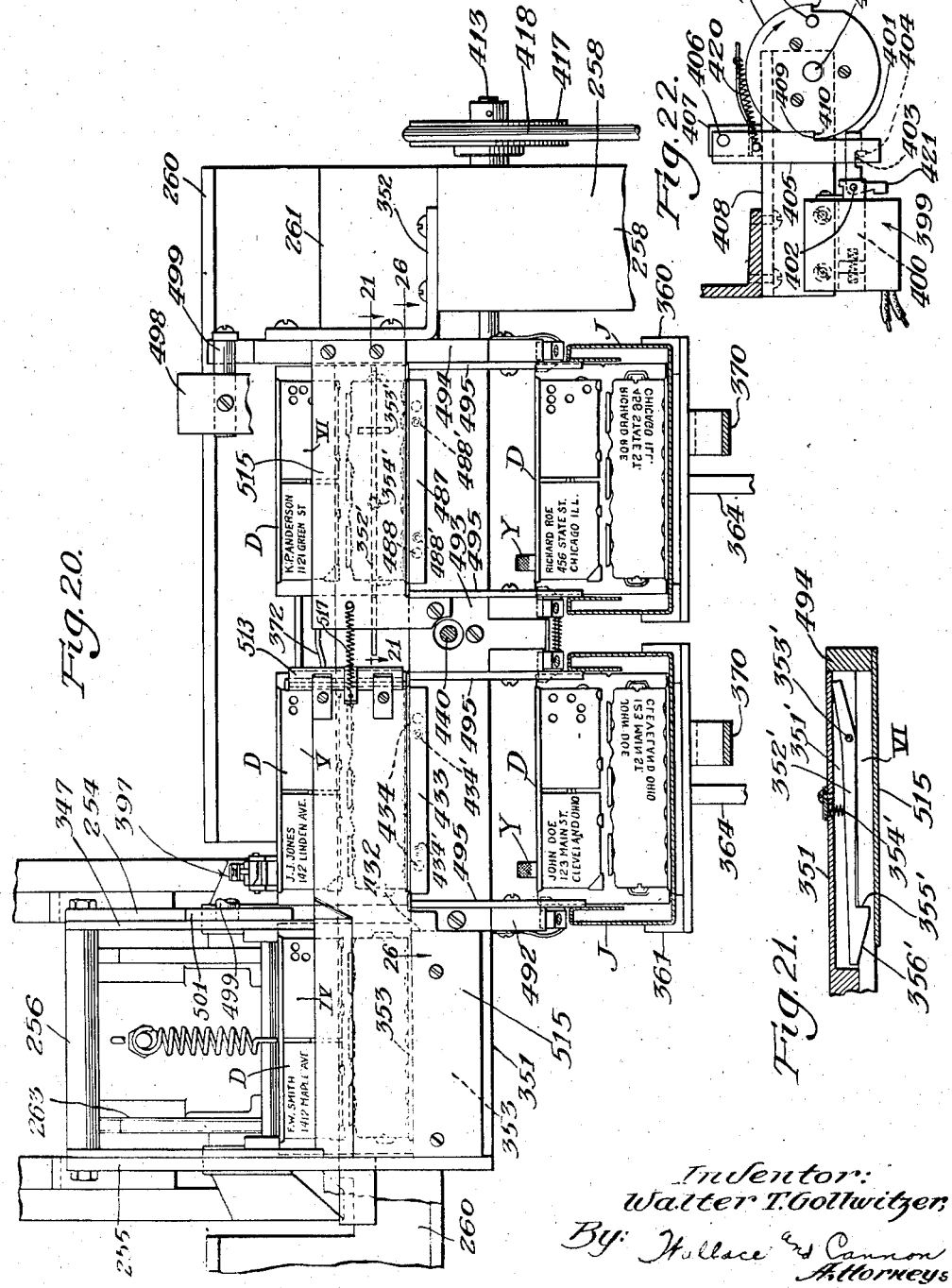
Inventor:
Walter T. Gollwitzer
By: Wallace and Cannon
Attorneys

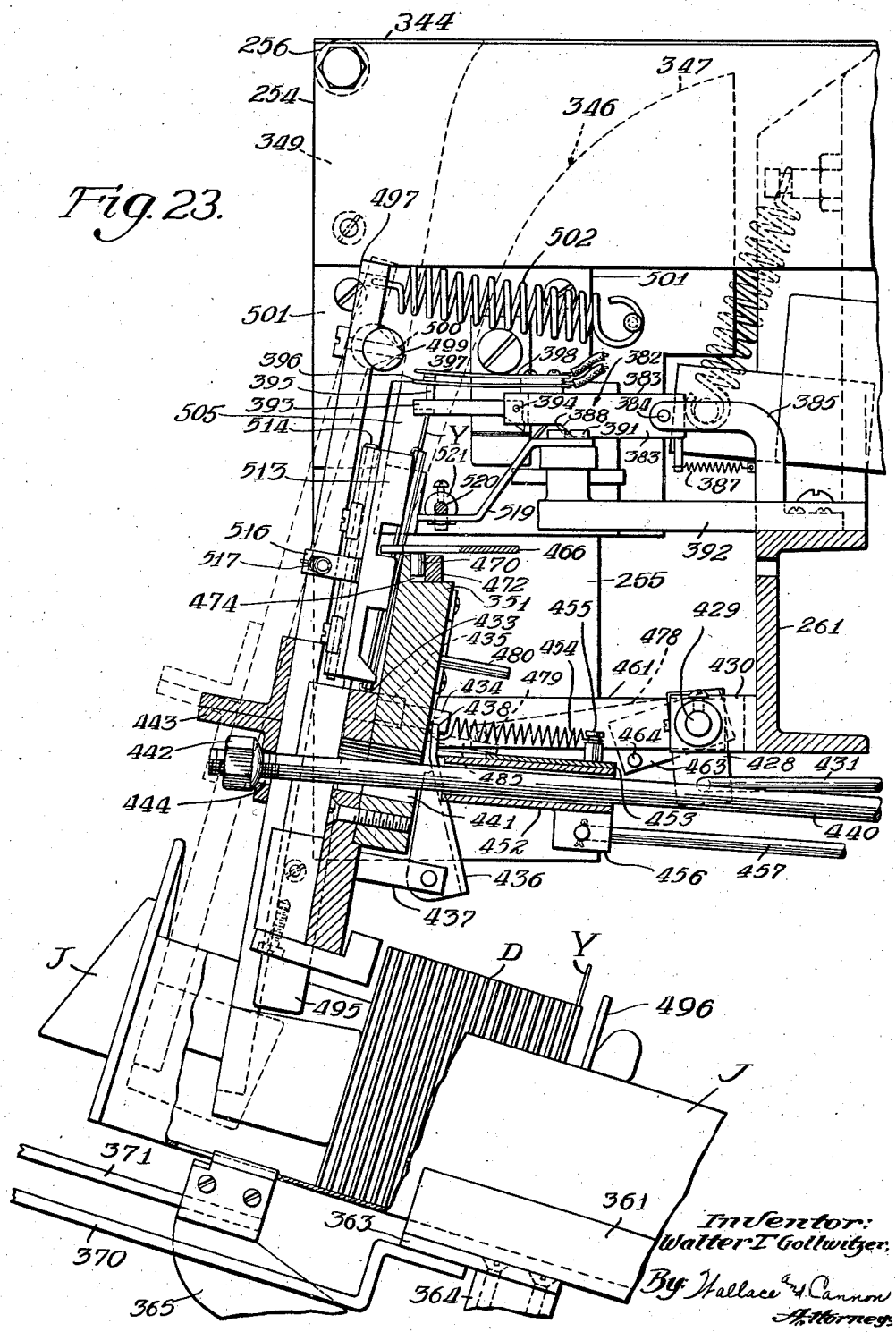

Dec. 11, 1945. W. T. GOLLWITZER 2,390,583
PRINTING MACHINE
Filed July 21, 1941 19 Sheets-Sheet 12

Inventor:
Walter T. Gollwitzer
By: Wallace & Cannon
Attorneys

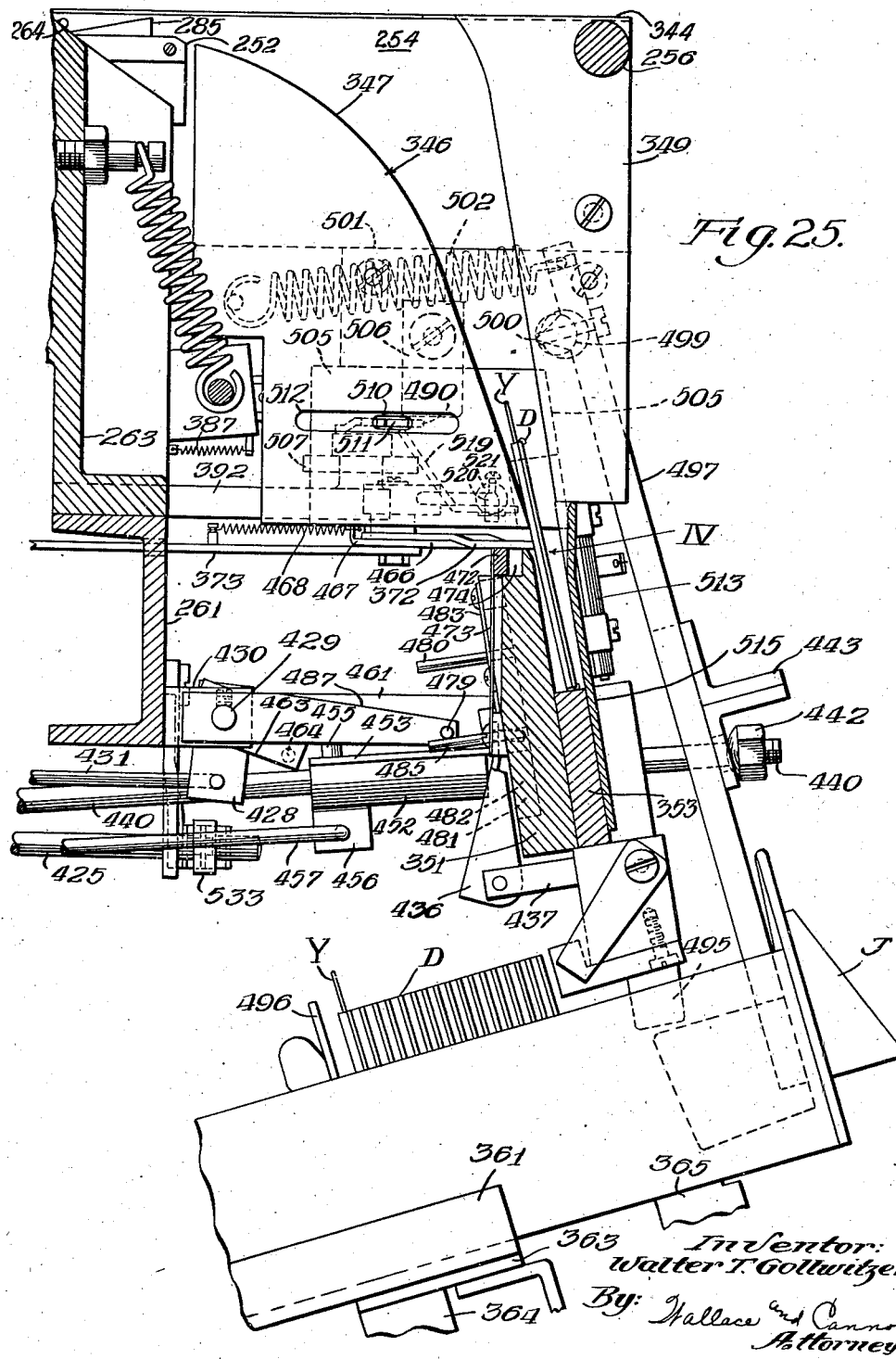

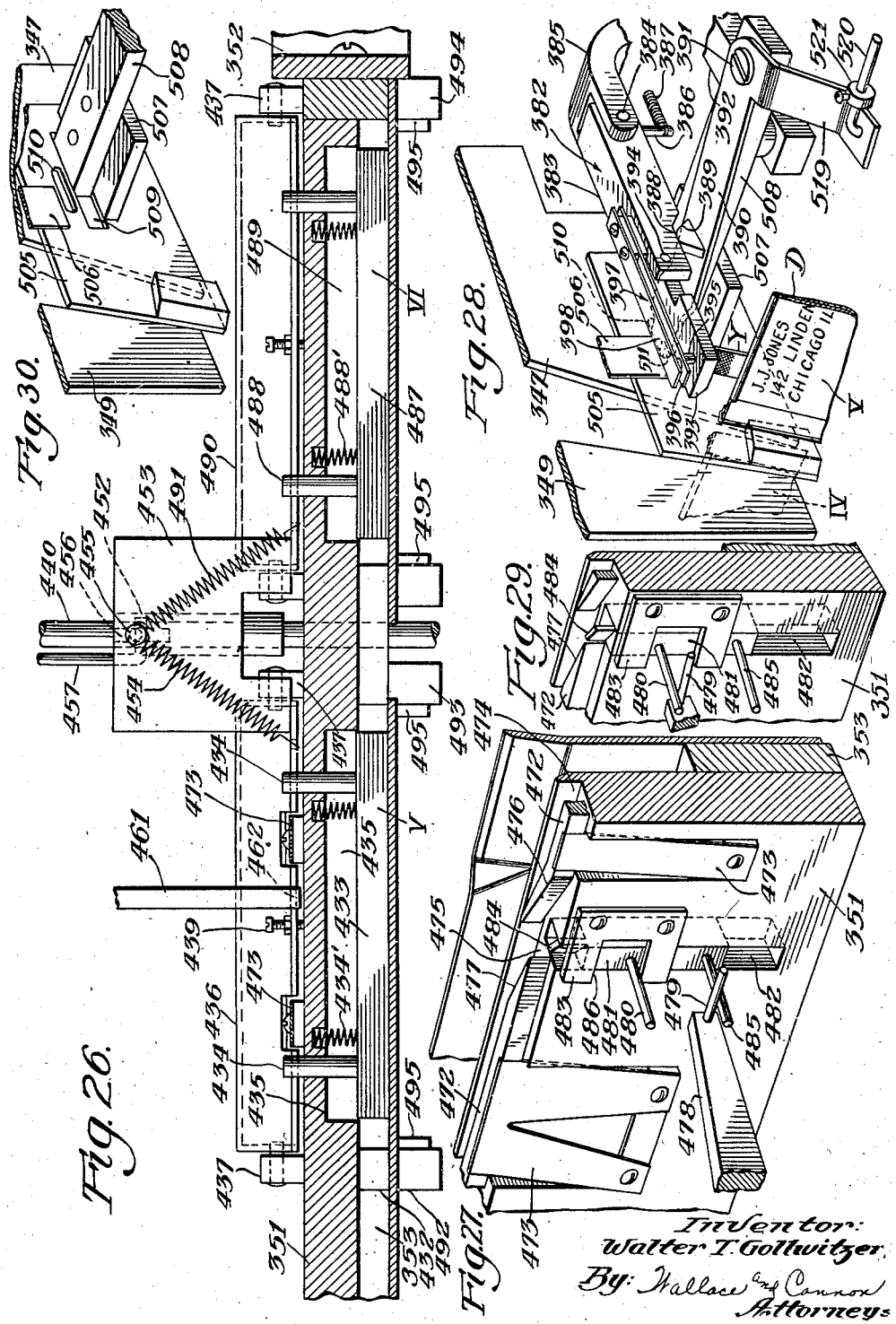

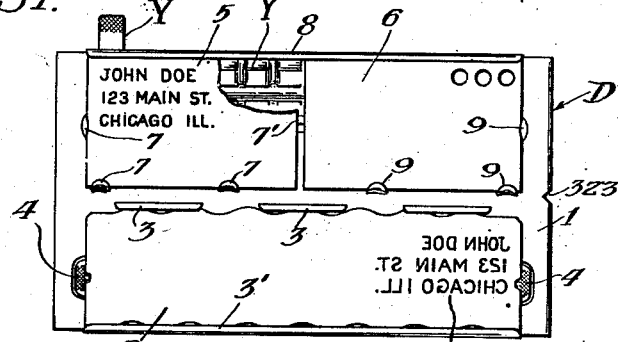

Dec. 11, 1945.    W. T. GOLLWITZER    2,390,583
PRINTING MACHINE
Filed July 21, 1941    19 Sheets-Sheet 16
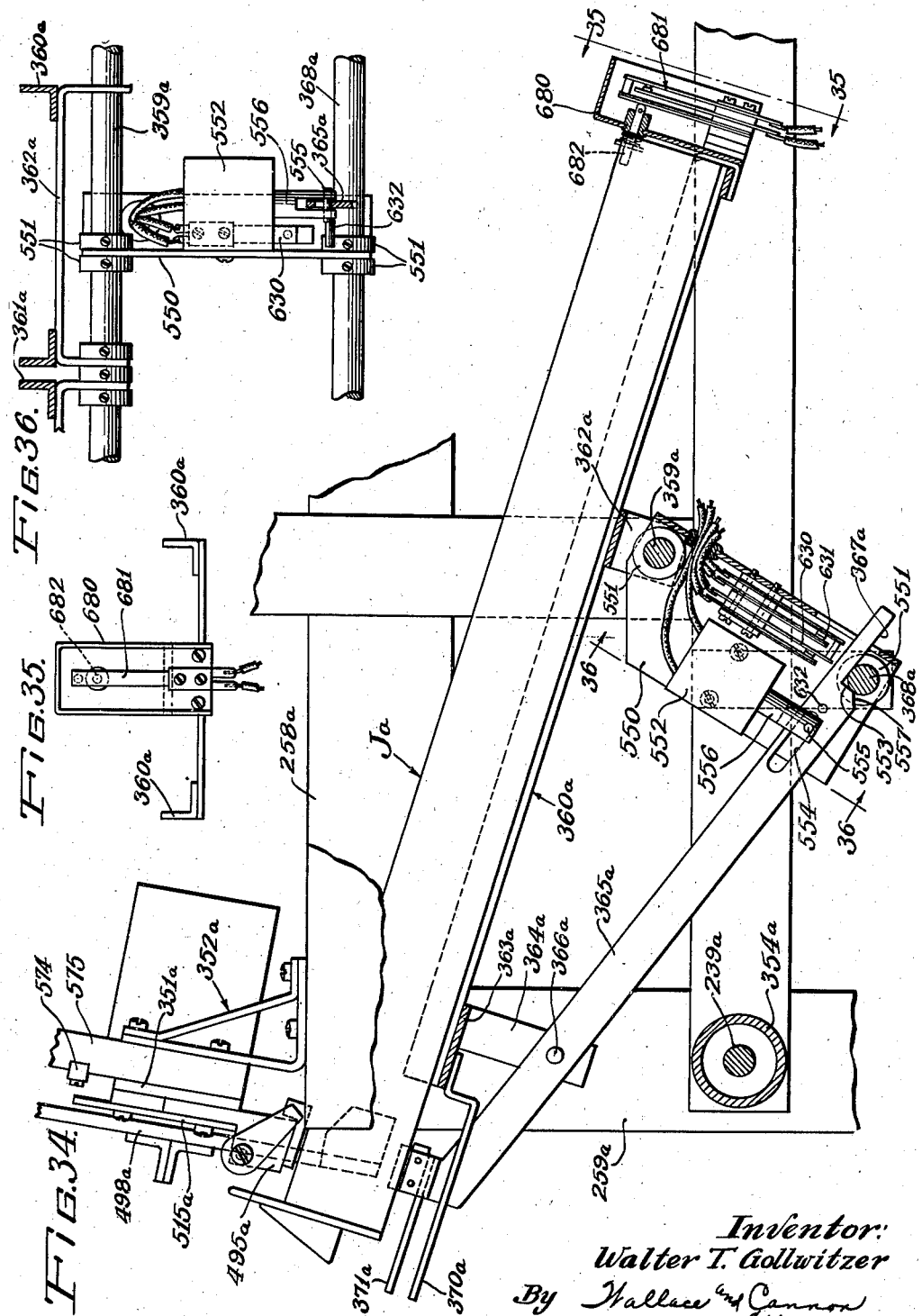
Inventor:
Walter T. Gollwitzer
By Wallace and Cannon
Attorneys Dec. 11, 1945.    W. T. GOLLWITZER    2,390,583
PRINTING MACHINE
Filed July 21, 1941    19 Sheets-Sheet 17
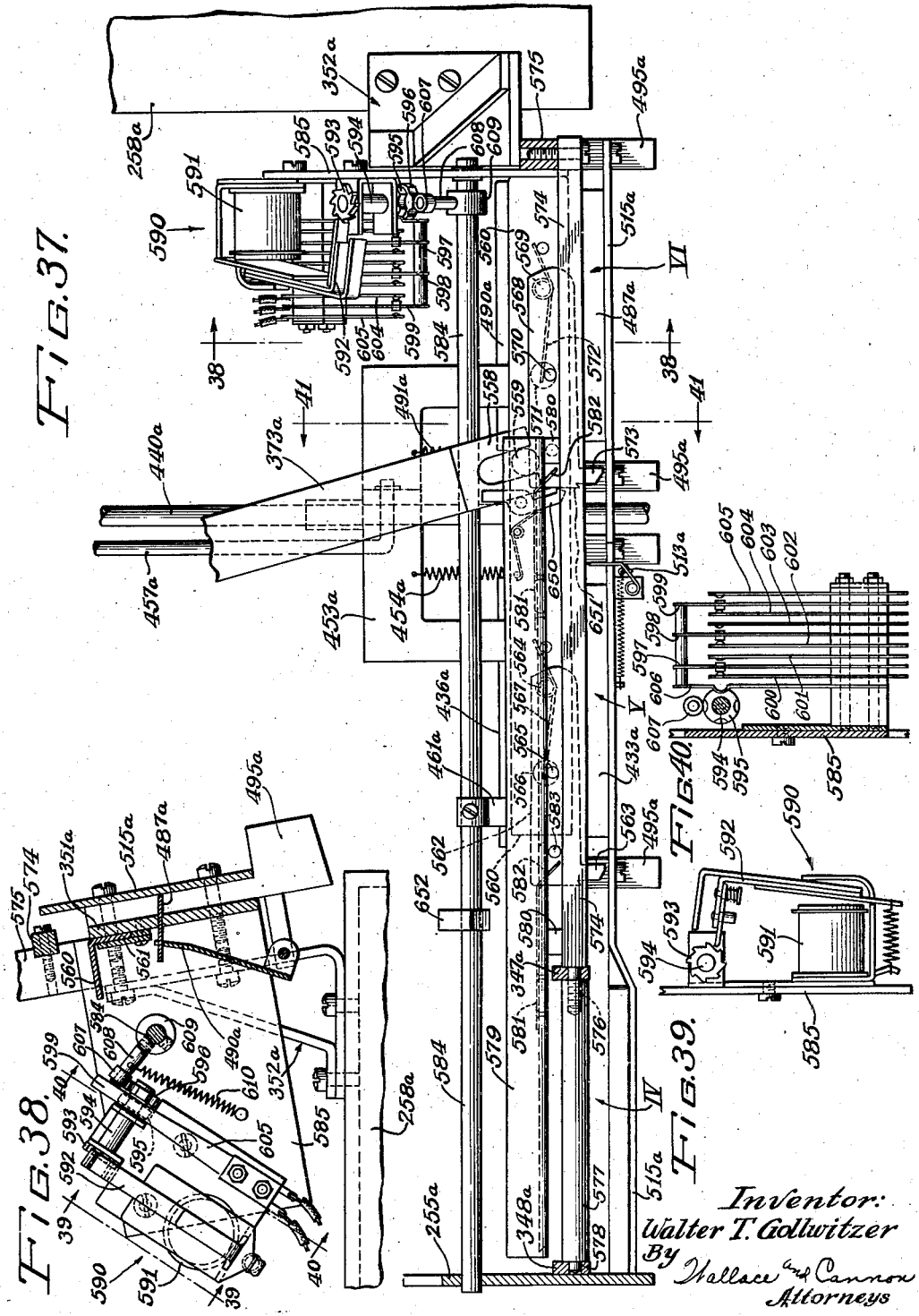
Inventor:
Walter T. Gollwitzer
By Wallace and Cannon
Attorneys Dec. 11, 1945. W. T. GOLLWITZER 2,390,583
PRINTING MACHINE
Filed July 21, 1941 19 Sheets-Sheet 18

Inventor:
Walter T. Gollwitzer
By Wallace and Cannon
Attorneys

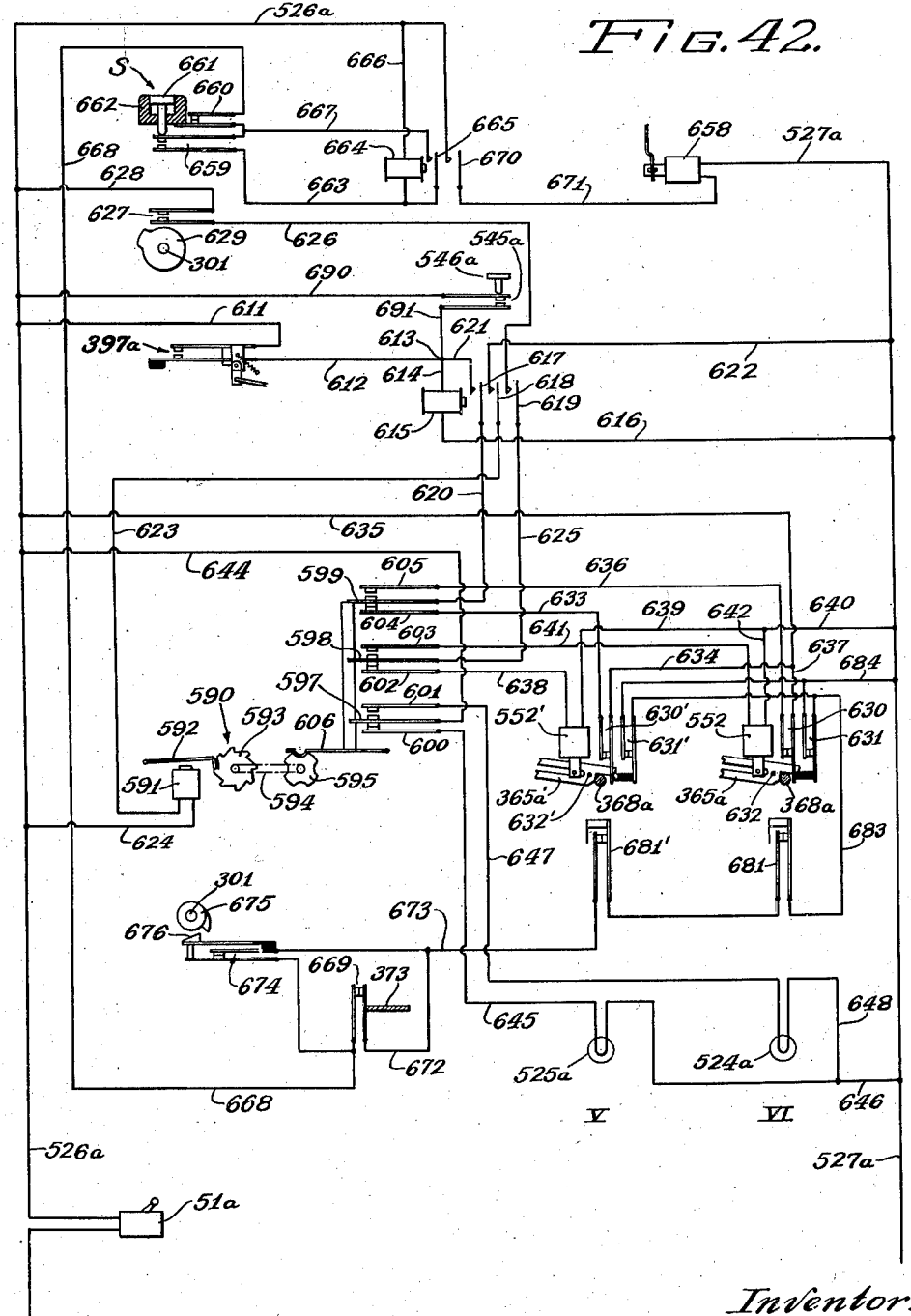

Patented Dec. 11, 1945

2,390,583

UNITED STATES PATENT OFFICE 2,390,583

PRINTING MACHINE

Walter T. Gollwitzer, Euclid, Ohio, assignor to Addressograph-Multigraph Corporation, Wilmington, Del., a corporation of Delaware Application July 21, 1941, Serial No. 403,272

33 Claims. (Cl. 101—58)

This application is a continuation in part of my copending application, Serial No. 221,841, filed July 28, 1938, now issued as Letters Patent No. 2,296,277, patented September 22, 1942.

The invention to which this application pertains relates to printing and like machines through which printing, printing and control or like devices are sequentially fed to have printing, control or other operations performed therefrom, thereon or under control thereof and more specifically this invention pertains to collecting the devices after passage thereof through the position or positions in the machine whereat operations are performed therefrom, thereon or under control thereof.

Printing, printing and control and like devices are customarily stored in drawers, trays or the like when not in use and are usually arranged therein according to some system as, for example, by being filed alphabetically according to the names which may be printed therefrom or according to cities or states that may be printed from or under control thereof. Irrespective of the manner in which such devices are arranged, it is essential that the arrangement or filing thereof be maintained not only when the devices are stored in drawers or the like when not in use but also as they pass through and from operative positions in printing and like machines. It will also be recognized that the drawers, trays or the like in which printing, printing and control or like devices are stored when not in use are of restricted size, accommodating a limited number of devices, so as to enable handling thereof by the operators. Moreover, it is customary to arrange the magazine or other means in the machine in which the devices are placed when being introduced into the machine so that it will have a capacity greater than one of the drawers or the like so that it will not be necessary to interrupt operation of the machine as a supply of devices from one drawer or the like is exhausted and is to be augmented by a supply from another drawer or the like.

In collecting the printing, printing and control or like devices as they pass from operative positions in printing and like machines it is customary to direct the devices back into the drawer or the like from which they are removed when they are introduced into the machine and obviously only so many printing and control or like devices as have been removed from a particular drawer or the like are to be reintroduced thereinto. Heretofore various arrangements have been provided for enabling printing, printing and control or like devices to be properly restored to the drawer or the like from which they are taken when introduced into a printing or like machine and this has usually entailed passing the printing, printing and control or like devices into an intermediate receiver or galley from which the devices were subsequently reintroduced into the drawer or the like from which they were removed. This of course entailed extra handling of the devices and was attended with the ever present likelihood that the devices might be spilled or that for some other reason the order and proper filing thereof might be disrupted.

In view of the foregoing and because of kindred conditions encountered in the use of printing, printing and control and like devices one of the important objects of this invention is to enable such devices to be directly restored to the drawer or the like, from which they are removed when they are introduced into printing or like macihnes, after the devices move from positions in the machines whereat operations are performed thereon or therefrom.

In the course of operation of printing or like machines there will usually be printing, printing and control or like devices from more than one drawer or the like in the machine and furthermore the devices which at a given time are passing from the positions in the machine whereat operations are performed thereon or therefrom will usually have been removed from a particular drawer or the like while the devices in the machine behind such devices will usually have been removed from another drawer or the like and, therefore, since, as has been explained, it is desirable to have the devices returned to the drawer or the like from which they are removed, further important objects of this invention are to enable a plurality of drawers or the like, in which printing, printing and control or like devices are to be stored when not in use in printing or like machines, to be arranged in position to receive the devices after passage thereof through the positions in printing or like machines whereat operations are performed therefrom, thereon or under control thereof; to accurately direct printing, printing and control or like devices into the drawer or the like from which they were removed when placed in a printing or like machine; and to enable such accurate direction of the devices back into the drawer or the like to be effected under control of the devices.

Inasmuch as a plurality of drawers or the like in which printing, printing and control or like devices may be supported in the machine in positions to receive the devices removed from such drawers and placed in the machine, it is obvious that it will be advantageous to determine into which of such plurality of positions a particular drawer or the like should be installed in order that the devices which were removed therefrom will be returned thereto, and thus still another object of this invention is to automatically indicate into which of a plurality of positions in the machine a drawer or the like should be placed in order that the devices removed therefrom will be returned thereto; and an ancillary object is to do so by the use of visible signalling or indicating means.

In the course of operation of the machine the devices removed from a particular drawer or the like and placed in the machine will pass through such machine in a group and in view of such grouping of the devices it follows that those devices removed from a particular drawer or the like will pass into such drawer or the like during a particular time and that during such time no devices should be passed into another drawer or the like supported in the machine. Hence, while the devices are passing into a particular drawer or the like, it is obvious that another drawer or the like in a different position in the machine may be removed and that another may be substituted therefor without interrupting the passing of the devices into a particular drawer or the like, and to facilitate this further objects of my invention are to so support drawers or the like in the machine so that as soon as all of the printing, printing and control or like devices that are to be introduced into a particular drawer or the like have been introduced thereinto this drawer or the like may be removed from the machine and another drawer or the like, from which other devices have been removed and placed in the machine may be substituted therefor; and to so arrange the apparatus so that as soon as all of the devices that are to be returned or introduced into a particular drawer or the like have been collected, the subsequent devices will pass into another drawer or the like for it is this that enables a drawer or the like in which a group of devices has been collected to be removed from the machine to have another substituted therefor.

Further and ancillary objects of this invention are to so arrange a path of travel for the devices through the machine that the devices may be advanced therealong in a step-by-step manner; to cause the devices to come to rest in the intervals in the step-by-step movement thereof at predetermined positions along the path of travel thereof through the machine; to position drawer or other device-receiving means supports relative to selected of the postions along the path of travel of the devices whereat the devices may come to rest in at rest intervals in the step-by-step advance thereof through the machine; to enable the devices to freely pass to drawers or other device-receiving means positioned as aforesaid but at the same time to prevent the passage of devices to a particular drawer or the like when the devices are to be returned to a drawer or the like other than such particular drawer; to enable such selective return of the devices to be effected under control of the devices; to automatically position certain operative parts of the mechanism in a selected position when the devices are to be returned to a drawer or the like disposed at a particular position in the machine and to dispose such operative parts in still another selected position when the devices are to be returned to a drawer or the like disposed in another of the positions whereat the drawers or the like may be supported in the machine; and to bring about such positioning of such operative parts in such a manner that the return of the devices to proper of the drawers or the like will be insured.

Reference has been made hereinabove to printing, printing and control or like devices and while hereinafter reference will be made specifically to printing and control devices of the character, for example, disclosed in Patent No. 2,132,412, patented October 11, 1938, it is to be understood that such devices are representative of devices of the character for use with which the present invention is particularly adapted and thus, while for the purposes of this description reference will be made specifically to printing and control devices, it is to be understood that such specific reference is to be taken in the generic sense for, as will be apparent from the following description, my invention is susceptible of use with a wide variety of devices other than the printing and control devices illustrated and described herein.

Additional objects of the invention are to support the drawers or other device receiving means in chutes or the like which are independently movable to and from a position in which the drawers may be withdrawn from the chutes; to normally retain the chutes in such positions that the drawers are adapted to receive the printing and control devices which may be deposited therein by the device collecting means, the arrangement being such that the drawers may not be withdrawn from the chutes while in such device-receiving positions; to direct a series of printing and control devices utilized by the machine onto a selected drawer from whence the devices were taken, until all of the devices taken from the drawer have been returned thereto; to thereupon automatically trip the chute which supports such drawer and cause this chute to assume its drawer-removing position for enabling the filled drawer to be withdrawn and an empty drawer inserted in its stead; and to concurrently condition the device-collecting means to direct the following series of devices into another selected drawer from which such series of devices was taken, whereby one drawer may be replaced while another drawer is being filled, and conversely.

Other additional objects are to automatically detect the occurrence of any of a number of unsafe or undesirable conditions which may arise in the course of collecting the printing and control devices and to interrupt the operations of the machine or the feeding of devices until such condition has been rectified, some of the aforesaid contingencies being: (1) jamming of the devices while they are being returned to the respective drawer from which they were removed, or any similar cause which prevents proper functioning of the mechanism for returning the devices to such a drawer or the like, (2) overloading of any one of the drawers or the like due, for example, to misoperation of the means for selectively switching the path of movement of the devices from one drawer to another upon a change in series, or because of an omission on the part of the operator to replace with an empty drawer one that has been filled, and (3) an all-full condition which arises when all of the chutes are in their tripped positions, signifying that there are no more drawers available in device-receiving position and that a new drawer should be inserted in place of one of the filled drawers.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a front elevation of a machine embodying my invention and from which the cover plates have been removed;

Fig. 2 is a top plan view of the machine as shown in Fig. 1;

Fig. 3 is also a top plan view, drawn to a larger scale than Fig. 2 and in which certain parts of the machine are broken away, of the guideway through which the printing and control devices utilized in the present machine are fed into and from operative positions in the machine;

Figure 7:
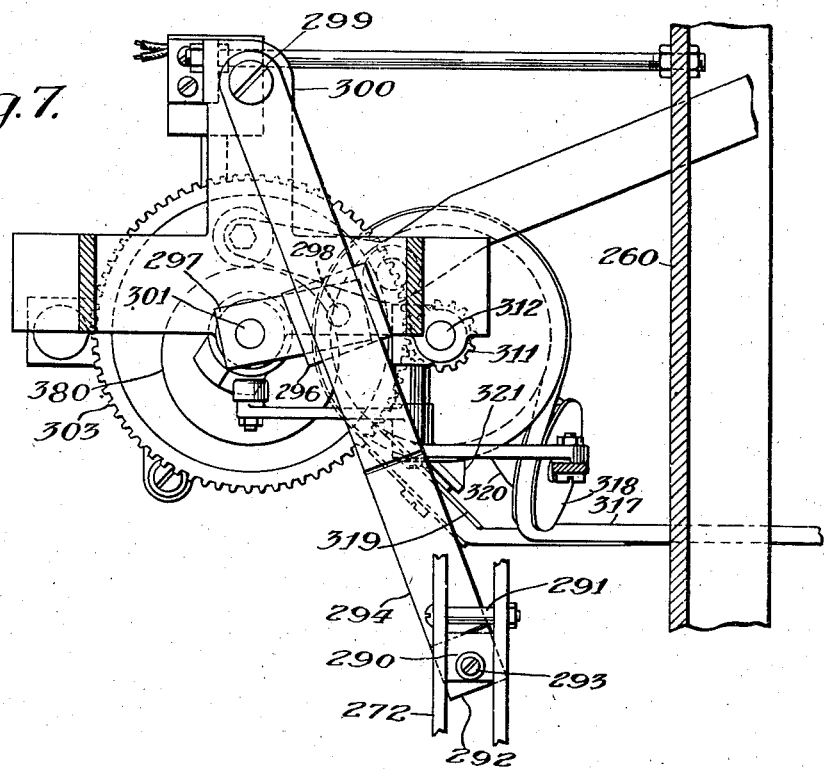
Figure 8:
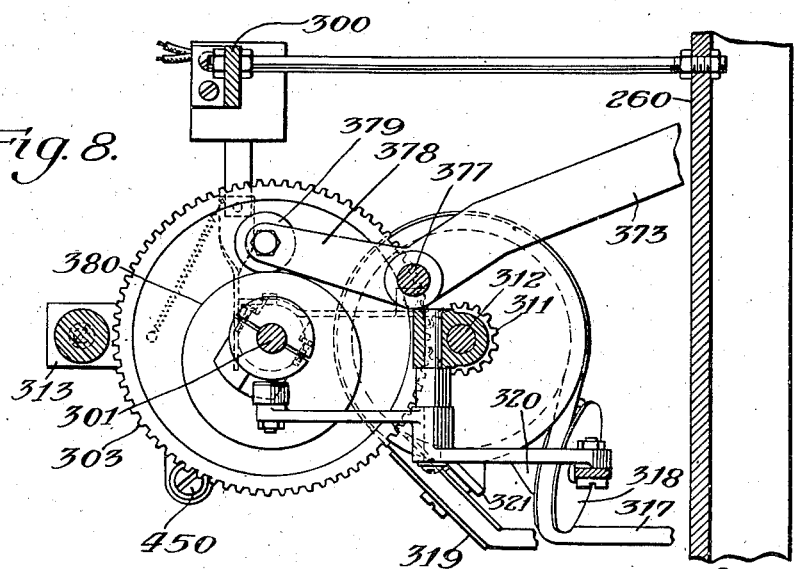
Figure 9:
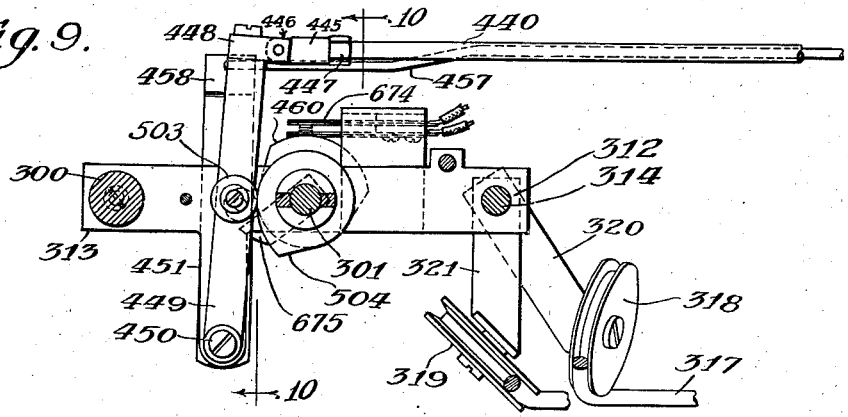
Figure 10:
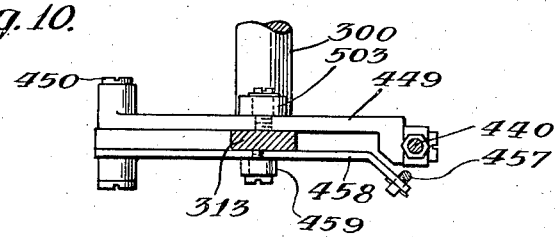
Figure 11:
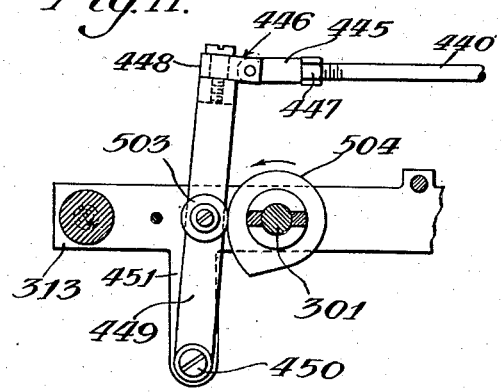
Figure 12:
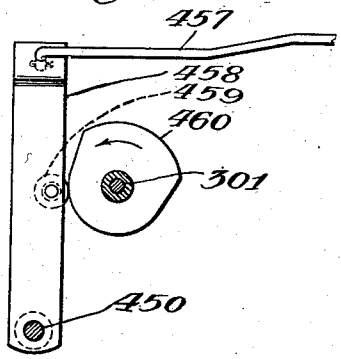
Figure 19:
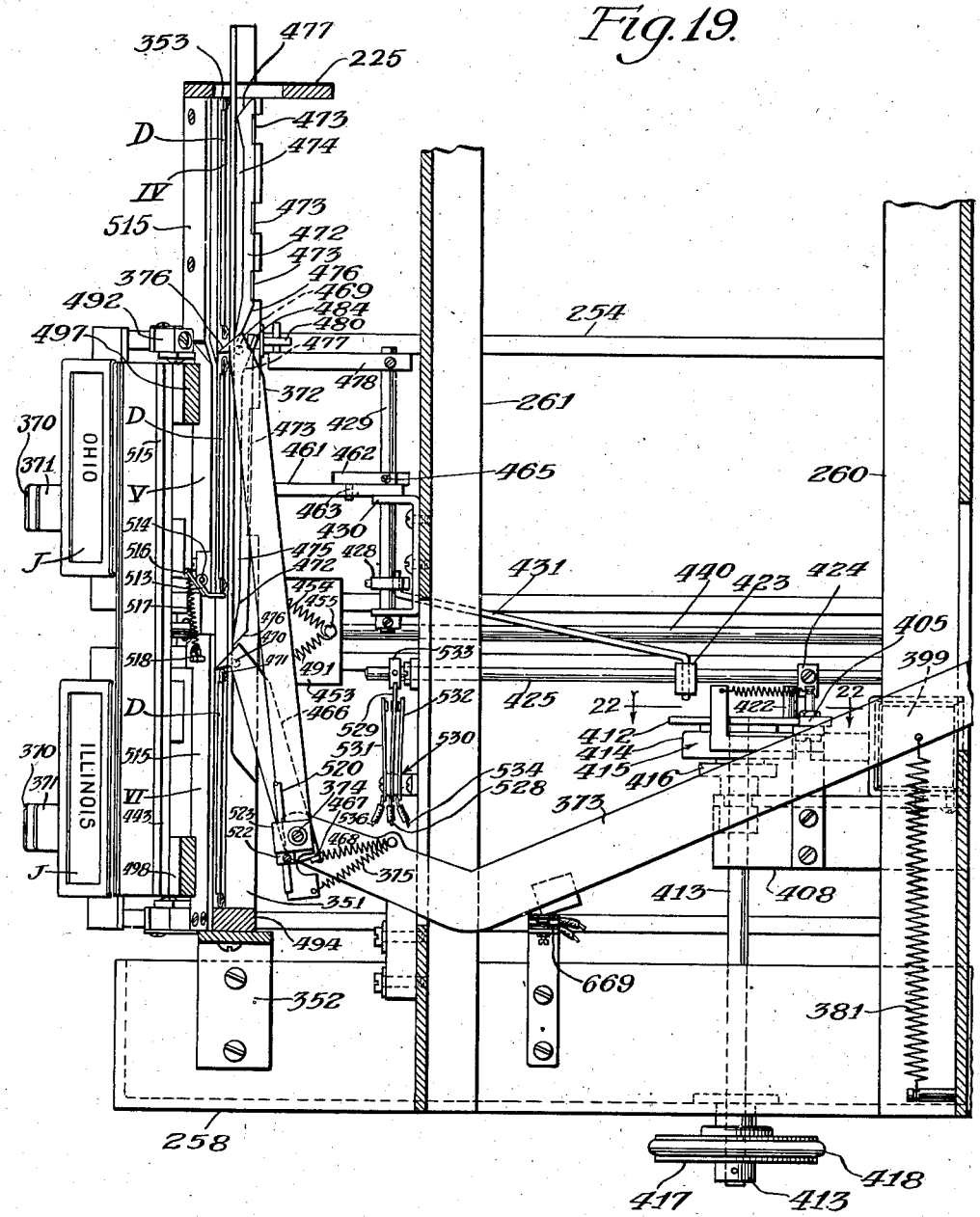
Figure 24:
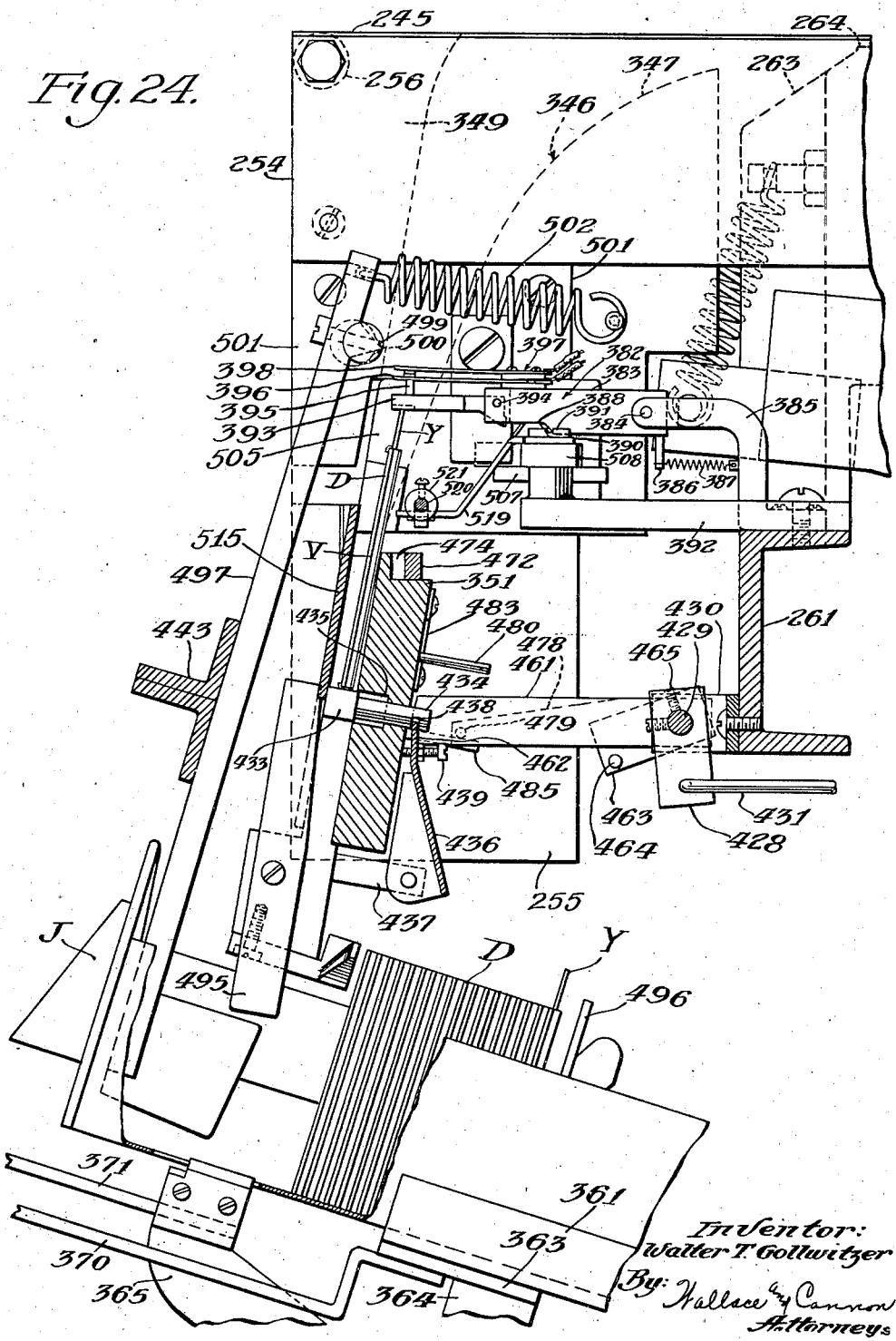
Figure 41:
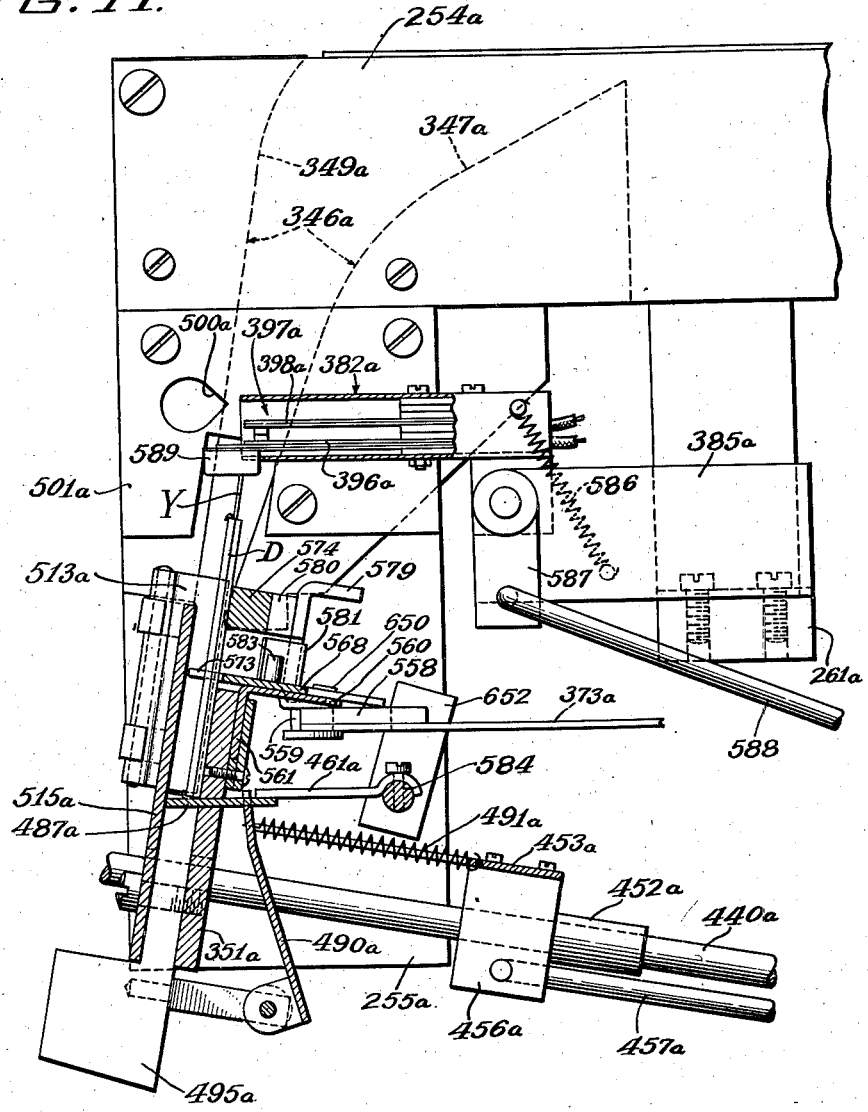

Figs. 4 and 5 are vertical sectional views taken substantially on the lines 4—4 and 5—5 on Fig. 3;

Fig. 6 is a detail view showing certain of the mechanism illustrated in Fig. 5 in another operative position;

Figs. 7, 8 and 9 are sectional views taken substantially on the lines 7—7, 8—8 and 9—9 on Fig. 5;

Fig. 10 is a sectional detail view taken substantially on the line 10—10 on Fig. 9;

Figs. 11 and 12 are detail views of cams and cam followers and related mechanisms illustrated in Fig. 9;

Fig. 13 is a fragmentary plan view of the printing and control device guideway and in which certain mechanisms are broken away;

Fig. 14 is a transverse sectional view taken substantially on the line 14—14 on Fig. 13;

Fig. 15 is a side elevation of the printing and control device feeding mechanism;

Fig. 16 is a perspective detail view of the mechanism shown in Fig. 15 and related mechanisms;

Fig. 17 is a perspective view of the reciprocating carrier bars for the printing and control devices;

Fig. 18 is a detail perspective view of a portion of the mechanism shown in Fig. 16 and illustrating the parts in another operative position;

Fig. 19 is a fragmentary plan view in which the table top and printing device guideway and other mechanisms are broken away and showing a portion of the mechanism for directing the printing and control devices into one or the other of two collectors therefor;

Fig. 20 is a front elevation of the mechanism shown in Fig. 19 and in which the front portion of the printing and control device-receiving drawers is broken away;

Fig. 21 is a detail view taken substantially on the line 21—21 on Fig. 20;

Fig. 22 is a view taken substantially on the line 22—22 on Fig. 19;

Figs. 23, 24 and 25 are vertical sectional views taken substantially and respectively on the lines 23—23, 24—24 and 25—25 on Fig. 3;

Fig. 26 is a horizontal sectional view taken substantially on the line 26—26 on Fig. 20;

Figs. 27 and 28 are perspective detail views of portions of the mechanism for directing the printing and control devices into one or the other drawers or collectors therefor;

Fig. 29 is a perspective detail view of a portion of the mechanism shown in Fig. 27 in another operative position;

Fig. 30 is another perspective detail view showing the manner in which the gate illustrated in Fig. 28 is mounted in position;

Fig. 31 is an elevational view of a printing and control device of the character utilized in the illustrated machine;

Fig. 32 is a vertical sectional view through the anvil on which the printing and control devices rest while impressions are being made therefrom by the platen;

Fig. 33 is a wiring diagram of the electrical arrangements utilized in the illustrated apparatus;

Fig. 34 is a vertical, partially sectional view of a modified form of my invention;

Figs. 35 and 36 are detail views taken on the lines 35—35 and 36—36, respectively, on Fig. 34;

Fig. 37 is a plan view of the aforesaid modification;

Fig. 38 is a detail elevational view of a ratchet relay device taken substantially on the line 38—38 on Fig. 37;

Figs. 39 and 40 are detail sectional views taken on the lines 39—39 and 40—40 on Fig. 38;

Fig. 41 is a vertical sectional view taken on the line 41—41 on Fig. 37; and

Fig. 42 is a wiring diagram of the embodiment of the invention illustrated in Figs. 34 to 41, inclusive.

The machine as illustrated in Figs. 1 and 2 is described in detail in my above referred to copending application, Serial No. 221,841, filed July 28, 1938, to which reference may be made for a detailed description of various operative mechanisms included in the machine other than those to which the present invention particularly pertains. It is to be understood, however, that the aforesaid machine is merely exemplary of machines of the character in which the present invention may be utilized.

The machine in which the present invention is illustrated is so arranged that a roll of paper R, Fig. 1, may be suitably supported near one end thereof and a web W is withdrawn from the roll and passed through suitable web withdrawing means between the side plates 43 and 44, Fig. 2, and past web feeding means including the interrupted roller 81. The free end of the web is led past a severing means including the knife 89 which is operative at predetermined times in the course of operation of the machine to sever sheets from the web. The sheets thus severed from the web are deposited in the guideway G, Fig. 2, and are fed therealong by suitable sheet advancing means such as the roller 165 to have the leading ends thereof advanced into engagement with stop fingers as 191 and 211. During the time the leading edge of a sheet is engaged with the stop finger 191 printing means included in the multiplying mechanism M and which include the platens 250 are operative to make an impression on the sheet. After such an impression has been made the stop finger 191 is retracted from engagement with the leading end of the sheet which thereupon advances into engagement with the stop finger 211 to be disposed beneath the platen P. At predetermined times in the course of operation of the machine the platen P is operated to make an impression directly from printing and control devices which are advanced through the machine in a step-by-step manner and which in the course of such step-by-step advancing come to rest on an anvil beneath the platen P so that when the platen is moved toward a device resting on such anvil an impression is made from embossed type characters on the device resting on the anvil through the intermediary of an inked ribbon interposed between such embossed type characters and the portion of the sheet lying beneath the platen P. After an impression has been made on a sheet by the platen P, the stop finger 211 is retracted from engagement with the leading edge of the sheet which subsequently passes through the form printing unit U in which another impression is made on the sheet, and after passage of the sheets from the form printing unit U they are usually collected in a suitable sheet collector (not shown).

The present invention primarily pertains to the arrangement whereby the printing and control devices from which impressions are made by the platen P as aforesaid are advanced through the machine, such devices in the present instance also including a control portion under control of which the aforesaid multiplying mechanism M is operated. A printing and control device of the aforesaid character is shown in Fig. 31 and is, as explained hereinabove, typical of devices that may be handled by the present invention.

The printing and control device D shown in Fig. 31 includes a carrier or, as it is called in the art, a frame 1 having, in this instance, a metallic plate 2 removably retained thereon by fixed retaining devices 3, a bead 3' at the lower edge of the frame, and yieldable or depressible retaining tongues 4. When one or the other of the tongues 4 is depressed the plate 2 may be slid endwise from the retaining devices 3 and the bead 3'. Type characters T are, in this instance, embossed in the metallic plate 2 so as to appear in relief on one face thereof and in intaglio on the opposite face, impressions being made from the relief faces of the type characters T when the printing and control device D is fed into printing relation with the platen P, Fig. 1, in the machine. The printing and control device shown in Fig. 31 also bears an identification card 5 on which an impression is made from the type characters T so that the data which may be printed from the type characters T may be read easily, thus facilitating handling of the device D. This card 5 is removably retained on the frame 1 above the plate 2 thereon by suitable retaining devices 7 and a bead 8 at the top of the frame. A control card 6 is retained on the frame 1, at one side of the card 5, by the retaining devices 9, the bead 8, and retaining devices 7' interposed between the cards 5 and 6. The card 6 and the underlying portion of the frame 1 are adapted to have perforations formed therein in accordance with a selected code so as to afford control means or representations of data on the device. The perforations in the control card 6 and the underlying portion of the frame 1 may be conveniently produced in a machine such as that disclosed in my co-pending application Serial No. 210,897, filed May 31, 1938, now issued as Letters Patent No. 2,265,229, patented December 9, 1941.

As has been explained hereinabove, printing, printing and control and like devices, of which the just described printing and control device D is exemplary, are customarily stored in drawers, trays or the like when not in use, and when these devices are passed through printing or like machines, for example, one of the character shown herein, they are introduced into a suitable receiver in the machine and in the present instance these printing and control devices are introduced into an upstanding magazine H, Figs. 1, 2 and 3, that is provided at the rear side of the machine and at the rear end of the printing and control device guideway, through which guideway the printing and control devices advance to printing position below the platen P.

After the printing and control devices have passed through printing position below the platen P they are reintroduced into the drawer, tray or the like from which they were removed when introduced into the magazine H. Heretofore the printing and control devices and the like upon passing through machines of the kind to which this invention pertains have been collected in a galley provided in the machine and suitable markers were included in the series of printing and control devices to indicate the groups thereof which were removed from particular drawers and introduced into the magazine, it being understood that both the magazine and the galley were arranged to have a capacity for receiving more printing and control devices than are stored, when not in use, in a particular drawer. The galleys included a dumping means which could be operated to cause the printing and control devices removed from a particular drawer to be reintroduced into the drawer. There was always the likelihood that the printing and control devices might be spilled when they were being introduced into the drawer from the galley in this manner and there was also the possibility that the printing and control devices might not be returned to the proper drawer.

Hence in the present instance the machine is equipped with chutes or the like into which a drawer or the like from which printing and control devices are removed when introduced into the magazine H, may be inserted and two such chutes are provided in the present machine. Indicating means are provided which indicate into which chute a drawer should be placed so that it will receive the printing and control devices that were removed therefrom and placed in the magazine, and automatic means in the machine function to direct the printing and control devices into the drawer in one or the other of the two chutes, these means functioning when the drawers are inserted in accordance with the manner indicated by the indicating means to direct the printing and control devices into the drawer from which they were removed.

In the present machine the lowermost printing and control device in the magazine H is removed therefrom and is fed through positions or stations in the printing device guideway, in one of which stations the control areas on the printing and control devices are sensed to effect set-up of the multiplying mechanism M and in another of which stations impressions are made directly from the type characters provided on the printing and control devices. Included in the means which withdraw the printing and control devices from the magazine and move these devices through the aforesaid stations in the machine are means which positively retain the printing devices in position in the stations into which they are moved to have operations performed thereon or therefrom.

The various means and mechanism provided in the machine that enter into the accomplishment of the foregoing and to which this invention particularly pertains will now be described.

The magazine H is supported at the rear side of the frame 15 and projects upwardly above the bed plate 108 of the machine, Figs. 1 and 2. The printing and control devices D are introduced into this magazine and the lowermost of the printing and control devices D is withdrawn therefrom by the reciprocal carrier bars 252 and 253, Figs. 3, 13, 14 and 17. These carrier bars are disposed between the side plates 254 and 255, Fig. 13, which are spaced apart by spacer bars 256 and 257, openings being provided in the side plates 254 and 255 and bolts being passed through these openings and threaded into tapped openings in the ends of the spacer bars to interconnect the side plates.

The side plates 254 and 255 are rigidly supported in the frame 15 and to this end the frame 15 includes two uprights 258 and 259, Fig. 1. A rear girder 260, Figs. 1, 3, 4 and 5, extends between the uprights 258 and 259 and a front girder 261 extends from the upright 258 to a support member 262, Fig. 1, which is carried by the front tie rod 239. The girders 260 and 261 afford a firm support for the casting 263 on which the anvil 264, Figs. 5 and 32, is provided, the printing and control devices resting on this anvil at the time impressions are made directly therefrom by the platen P. As shown in Fig. 5 the casting 263 is bolted to the girder 261, as indicated at 265, and this casting is also bolted to the girder 260, as indicated at 266. The side plates 254 and 255, Figs. 3 and 32, are firmly secured to the casting 263 which in turn is firmly connected to the girders 260 and 261 and these girders in turn are firmly fixed to the frame 15 whereby a rigid support for the side plates is afforded therefor. The magazine H, as will be seen best in Fig. 3, is mounted on and carried by the side plates 254 and 255 at the rear ends thereof.

The carrier bars 252 and 253 are supported for reciprocal movement over the inner faces of the side plates 254 and 255 by strips 268 and 269, Figs. 5 and 14, the carrier bars merely resting on the upper edges of these strips, as best shown in Fig. 14. A plate 270, Fig. 17, is fast to the inner side of the carrier bar 252 at the rear end thereof and a similar plate 271 is fast to the inner face of the carrier bar 253 at the rear end thereof. Bars 272 are secured to, as by being welded thereto, and extended between the plates 270 and 271 and serve to maintain the rear ends of the carrier bars 252 and 253 in permanent spaced relation, this spaced relation being such that the carrier bars are held in a tight sliding fit against the inner faces of the side plates 254 and 255.

The anvil 264 is recessed at its sides and below the top surface thereof, on which the printing and control devices D rest when impressions are being made therefrom, as indicated at 273, Fig. 32. The forward ends of the carrier bars 252 and 253 rest in these recesses 273 and in this way the forward ends of the carrier bars are supported for reciprocal movement over the inner faces of the side plates 254 and 255 and at the same time are maintained in properly spaced relation.

In the present machine the lowermost of the printing and control devices is withdrawn from station or position I thereof, Figs. 3 and 13, in the magazine H and first comes to rest in what will be referred to hereinafter as the sensing position or station, this position or station being indicated at II, Figs. 3 and 13. In the course of movement of the printing and control devices through the machine they also come to rest in printing position above the anvil 264, which position or station is indicated at III in Figs. 3 and 13. After passing from station III over anvil 264 the printing and control devices pass into the printing and control device collecting means to be described hereinafter. It will be apparent from the foregoing that the printing and control devices come to rest in two different positions or stations after movement thereof from the magazine H.

By referring to Fig. 13 it will be seen that the distance between the printing and control device in station I and the printing and control device in station II is less than the distance between the printing and control device in station II and the printing and control device in station III. Hence each printing and control device moves a lesser distance as it moves from station I, in the magazine H, to station II than it does when it moves from station II to station III. Moreover, the distance through which each device D is moved as it passes from station III to a discharge chute, described hereinafter, at the forward end of the device guideway is relatively short, being appreciably less than the distance between stations I and II. The carrier bars 252 and 253 have a uniform reciprocal movement imparted thereto, which is to say, the amount of the distance travelled by the carrier bars 252 and 253 thereof in each operation is uniform. This uniform movement, however, is utilized for moving the printing and control devices both the distance between stations I and II and the distance between stations II and III, as well as moving the devices the necessary distance from station III to the discharge end of the guideway.

Thus, the printing and control devices are advanced through the machine by imparting to the carrier bars 252 and 253 a stroke which is just slightly greater than the greatest distance between the stations as I and II and III and by so positioning or spacing the various printing and control device engaging means or pawls on the carrier bars that when these bars are in their most advanced or forward positions, the printing and control devices are located in the desired positions or stations by the pawls. This is accomplished by so spacing the pawls one from the other along the bars that in the course of the advancing movement of the carrier bars 252 and 253 the various printing and control devices are engaged successively by the pawls or other engaging means. In the present machine, where the greatest distance the devices are to be moved is between stations II and III, the advancing movement of a device D from station II to station III is first initiated and the pawls, other than those engaging this device, move idly in such a way that the advancing movements of the other devices are initiated subsequently as determined by the distance which they are to be moved. The particular means employed to accomplish the foregoing will now be described.

A slot 274, Fig. 17, is provided in the carrier bar 252 near the rear end thereof and a pawl 275 mounted in this slot is acted on by a spring 276 which urges the forward end of the pawl upwardly so that this end of the pawl normally extends above the top edge of the carrier bar 252. A pawl 277 is similarly mounted in the carrier bar 253, the pawls 275 and 277 being in transverse alignment. The pawls 275 and 277 serve to withdraw the lowermost printing and control device D in station I in the magazine H from this station and advance such device to station II. The pawls 275 and 276 are free to pivot downwardly during the rearward movement of the carrier bars so that they will pass below the lowermost printing and control device in the magazine and then spring up behind this device into position to engage the rear edge of such lowermost printing and control device when the carrier bars 252 and 253 start to move forwardly. In order to facilitate movement of the pawls underneath the lowermost printing and control device during rearward movement of the carrier bars these pawls are beveled as indicated at 278, this serving as a cam surface to insure depression of the pawls against the action of the springs as 276.

It will be recognized that appreciable downward force will be exerted especially when a relatively large number of printing and control devices D are stacked in the magazine H. It is, of course, essential that the pawls remain engaged with a printing and control device during forward movement of the carrier bars. Now particularly at a time when a printing and control device is almost entirely removed from the magazine H, the downward force exerted by the stack of printing and control devices D can be effective on the pawls and in some instances this might so depress the pawls that they would be urged from engagement with the lowermost printing and control device which would not therefore be fed out of the magazine. Hence the pawls 275 and 277 are so mounted in the slots as 274 that they are capable of movement longitudinally of the bars. Then as an incident to the first part of the forward movement of the carrier bars, at which time the pawls are engaging the lowermost of the printing and control devices in the magazine H, these pawls are forced rearwardly of the carrier bars in the slots as 274. Such rearward movement causes the notches as 279 in lower edges of the pawls 275 and 277 to be moved from alignment with the projections as 280 on the lower edges of the slots as 274 and that part of each of the pawls immediately forward of these notches thereupon rests on these abutments during the forward movement of the carrier bars. By reason of the seating of the pawls on these abutments the downward force exerted by the printing and control devices D in the magazine H does not disengage the pawls from the lowermost printing and control device which is therefore fully fed out of the magazine from position I to position II by the pawls 275 and 277. When, however, the pawls move rearwardly with the carrier bars, the beveled edges 278 engage the lowermost printing and control device in the magazine H as an incident to such rearward movement and prior to the time the pawls are cammed downwardly, they are moved slightly forwardly in the slots as 274 to thereby align the notches as 279 with the abutments as 280 so that during the rearward movement of the carrier bars, the pawls 275 and 277 may be cammed down against the action of the springs as 276 and at this time the abutments 280 pass into the recesses 279.

In order that the carrier bars 252 and 253 will not only advance the printing and control devices from position I to position II in the course of the uniform reciprocatory movement imparted thereto, but will also advance the printing and control devices from position II to position III, another pair of pawls 281 and 282 are respectively mounted in slots as 283 in the carrier bars 252 and 253. These pawls are acted on by springs as 284 to have the forwardly disposed ends thereof projected above the top edges of the carrier bars. The pawls 281 and 282 are spaced forwardly of the pawls 275 and 277 in the carrier bars 252 and 253, respectively, in an appreciable amount which is equal to the spacing between position II and position III, which is to say, the pawls 281 and 282 are located in such position with respect to the pawls 275 and 277 that when the carrier bars come to rest in their forwardmost position, in which the pawls 275 and 277 are effective to dispose a printing device, that was in position I at the beginning of the forward stroke in the reciprocatory movement of the carrier bars, in position II, then the pawls 281 and 282 are in such position that the printing and control device which was in position II will be disposed in position III.

Another pair of pawls 285 and 286 are respectively mounted in slots as 287 in the carrier bars 252 and 253 and are acted on by springs as 288 to have the forward ends thereof urged upwardly. The pawls 285 and 286 are spaced forwardly of the pawls 281 and 282 respectively in but a relatively small amount which is equal to the distance from the rear edge of a printing and control device disposed at position III to the point at which the printing and control devices pass from the guide through which they are advanced by the carrier bars 252 and 253 to pass into the printing and control device discharge chute described hereinafter. When the carrier bars are moved rearwardly, the springs 288 yield to enable the pawls 285 and 286 to pass beneath the printing and control device which is at that time disposed in position III.

The various pawls mounted in the carrier bars 252 and 253 have been described as being mounted in slots in the carrier bars. These pawls are retained in these slots by plates as 289, Fig. 17, that are mounted on the inner faces of the carrier bars in alignment with the slots in which the pawls are mounted, and these plates serve to prevent inward movement of the pawls. Outward movement of the pawls is prevented by reason of the fact that the carrier bars 252 and 253 are mounted for sliding movement over and against the inner faces of the side plates 254 and 255 and the pawls engage the inner faces of these side plates to be retained in the slots in which they are mounted.

As has been stated, the distance from position II to position III is greater than the distance from position I to position II, and the distance from position III to the point at which the printing and control devices pass into the printing and control device discharge chute is less than either of these distances. It will also be recalled that the carrier bars 252 and 253 have a uniform reciprocatory movement imparted thereto and the magnitude of such reciprocatory movement is determined by the greatest distance the carrier bars will need move printing and control or like devices. In the present instance the longest movement that need be imparted to the printing and control devices in the course of movement thereof through the printing and control device guideway is from position II to position III and therefore the magnitude of the reciprocatory movement to be imparted to the carrier bars 252 and 253 is sufficient to insure advancing of the printing and control devices from position II to position III.

During the course of the rearward movement of the carrier bars the pawls 281 and 282 ride under a printing and control device disposed at position II, during which time they are forced downwardly against the action of the springs as 284, and in the course of such rearward movement these pawls spring up behind the rear edge of such printing and control device under the effect of the springs as 284, the extent of the rearward stroke in the reciprocatory movement of the carrier bars 252 and 253 being made sufficient to insure that not only will the printing and control devices be advanced from position II to position III but also to insure that the pawls 281 and 282 will be free to spring up behind a printing and control device disposed at position II. Thus, the amount of reciprocatory movement imparted to the carrier bars 252 and 253 in the present instance is equal to the distance from position II to position III plus such additional movement as will be required to insure that the pawls 281 and 282 will be free to operate to properly engage the rear edge of a printing and control device in position II, such slight additional movement being, what is termed in the art, an operative clearance.

The relative spacings of the pairs of pawls along the carrier bars 252 and 253 are such that when the carrier bars come to rest in their rearwardmost position, the pawls 281 and 282 are disposed immediately behind the rear edge of the printing and control device D in position II; the pawls 275 and 277 are disposed in appreciable spaced relation to the rear edge of the device D in position I, and the pawls 285 and 286 are spaced still farther relative to the device D in position III. Hence, when the carrier bars start to move forward again, the pawls 281 and 282 almost immediately engage the rear edge of the device D in position II; subsequently the pawls 275 and 277 engage the device D in position I, and thereafter the pawls 285 and 286 engage the device D in position III. Thus, the device D which was in position II is carried the greatest distance, being in motion during substantially the entire forward stroke of the carrier bars 252 and 253, and is deposited in position III. The device D which was in position I is carried a lesser distance in moving to position II, and the device D which was in position III is moved through only a relatively short distance by the carrier bars, this movement being sufficient to introduce it into the discharge chute. Therefore, by properly locating the pairs of pawls on the carrier bars in the manner just described, different amounts of movement are imparted to the printing and control devices in the device guideway during a single continuous stroke of the carrier bars.

In the foregoing description reference has been made to reciprocation of the carrier bars 252 and 253 and this reciprocal movement is imparted to the carrier bars in the following manner: A block 290, Fig. 3, is mounted between the bars 272 for reciprocal movement between the plate 271 and a spacing pin 291, Fig. 17, that extends between the bars 272. The free end of an arm 292 extends beneath the block 290 and affords a support for said block, the block being pivotally connected to this arm, as indicated at 293.

As best shown in Figs. 5 and 7, the end of the arm 292, to which the block 290 is pivotally connected, is offset upwardly, this offset portion being interconnected by an inclined portion 294 in the arm. That portion of the main extent of the arm 292 adjacent the inclined portion 294 is reciprocally mounted in a recess 295 in a block 296 pivotally mounted on an arm 297, as indicated at 298. The end of the arm 292 opposite that at which the block 290 is pivotally connected is pivotally mounted, as indicated at 299, on a bracket 300, Figs. 2, 4, 5 and 7.

The block 296, the arm 297 and the pivotal connection therebetween indicated at 298 affords a scotch yoke connection for the arm 292, the arm 297 being fast to a vertical shaft 301, Figs. 2, 4, 5 and 7. The shaft 301 is journaled in a vertical bearing 302 that is carried by the bracket 300. A gear 303 is rotatably mounted on the shaft 301 and includes a hub 304 having clutch teeth 305 thereon. A sleeve 306 is slidably but nonrotatably mounted on the shaft 301 and includes clutch teeth 307 which are urged toward the clutch teeth 305 by springs acting between the sleeve 306 and a collar 308 rotatable on the shaft 301, the sleeve 306 being connected to the collar 308 for rotation therewith.

The clutch teeth 305 and 307 and the sleeve 306 are part of a clutch such as is disclosed in my co-pending application, Serial No. 239,561, filed November 8, 1938, now issued as Letters Patent No. 2,265,229, patented December 9, 1941. A pin (not shown) on the sleeve 306 cooperates with a cam surface (not shown) on the arm 309 to hold the clutch teeth 307 separated from the clutch teeth 305. A solenoid 310, Fig. 4, is adapted to be energized to attract its core whereupon the cam surface on the arm 309 is retracted from cooperation with the pin on the sleeve 306 to thereby enable the clutch teeth 307 to engage the clutch teeth 305 and in this manner the gear 303 is connected to the shaft 301. The clutch including the clutch teeth 305 and 307 is a one-revolution clutch, for after the solenoid 310 has been energized to enable engagement of the clutch teeth, the pin on the sleeve 306 acts to again dispose the cam surface on the arm 309 in position to be engaged by this pin near the end of a revolution so that as the pin moves over the cam surface the clutch teeth 307 are separated from the clutch teeth 305 to interrupt rotation of the shaft 301 at the end of a rotation thereof.

The gear 303 meshes with a pinion 311 rotatably mounted on a rod 312, Figs. 5 and 8, that is driven into a socket in the bracket 300, the cross member 313 being fixedly attached to the lower end of this rod, as indicated at 314. A pulley 315 is also rotatable on the rod 312 and is connected to the pinion 311, the pulley 315 being mounted below the pinion 311 and said pulley and pinion are supported in operative position by a collar 316 secured to the rod 312.

A belt 317, Figs. 5 and 9, is passed about the pulley 315 and over guide pulleys 318 and 319 carried by arms 320 and 321 that are secured in position at the point of interconnection of the cross member 313 with the rod 312, as indicated at 314. From the guide pulleys 318 and 319 the belt 317 passes to a pulley 322, Fig. 1, fast on the main drive shaft 19 that is driven from the motor 14, supported on the bracket 13 and connected to the main shaft 19 by a belt 18, the motor 14 being operated continuously when the machine is in operation.

Thus whenever the main drive shaft 19 is rotating, the pinion 311 and the gear 303 are rotated so that when the solenoid 310 is energized to cause the clutch teeth 307 to engage the clutch teeth 305, as described above, the arm 297 is caused to make a complete revolution whereupon through the connection of the arm 292 with the block 296 a reciprocatory movement is imparted to the end of the arm 292 to which the block 290 is pivoted and thereupon reciprocatory movement is imparted to the carrier bars 252 and 253 to advance the printing and control devices through the guideway therefor.

In the illustrated machine, when the printing and control devices are in position II a sensing means cooperates therewith to effect set-up of the multiplying mechanism M and it is advantageous to accurately locate the printing and control device when it is in position II and this sensing means is to cooperate therewith. Furthermore, when the printing and control devices are in position III above the anvil 264 and impressions are being made therefrom it is desirable to firmly hold the printing and control devices in position for so to do enables accurate location of the impressions made therefrom and this also enables clear-cut impressions to be produced.

By referring to Fig. 31 it will be seen that a notch as 323 is provided in one side edge of each printing and control device D. The notch 323, in the illustrated device, is accurately positioned with respect to the control area on the printing and control device, as explained in Patent No. 2,132,412, patented October 11, 1938, and it is also located accurately with respect to the printing plate 2 on the printing and control devices. Inasmuch as notches as 323 are accurately located with respect to other parts on the printing and control device it is possible, by locating means in the machine adapted to cooperate with these notches accurately with respect to parts in the machine adapted to cooperate with the printing and control devices, to insure that the machine parts will cooperate with the printing and control devices parts in an accurate manner. The means in the machine adapted to cooperate with the notches 323 in the printing and control devices are, in the present instance, pawls 324 and 325, Fig. 16, the pawl 324 being positioned to cooperate with the notch in the printing and control device at the station II and the pawl 325 being positioned to cooperate with a notch in the printing and control device at the station III.

The pawl 324 is pivotally connected to the upper edge of the side plate 254, as indicated at 326, and the pawl 325 is similarly mounted, as indicated at 327. In order to insure seating of these pawls in the notches in which they are adapted to seat, these pawls are urged toward the edges of the printing and control devices by applying spring pressure thereon. It will be apparent, however, that if the pawls are spring-urged toward the printing and control devices they will drag thereover and that they might, therefore, subject the printing and control devices to undesirable wear. Hence I have arranged these pawls in such a manner that the pressure exerted thereon may be varied so that appreciable pressure will be effective on these pawls only at the times the pawls are to be operative and at all other times, and especially when the printing and control devices are moving past these pawls, but very light pressure is applied thereon so that objectionable wear on the printing and control devices is avoided. To accomplish this entails arranging the springs effective on the pawls in such a manner that the effective force of the springs may be varied and this is accomplished in the following manner.

As best shown in Fig. 16, each pawl 324 and 325 includes an ear 328 having an opening 329 therein and the free upper end of a leaf spring 330 is passed through this opening. The lower end of each leaf spring is firmly connected to the outer face of the side plate 254 as by a screw 331. A groove 332 is provided in the outer face of the side plate 254 and a slide 333 is mounted in this groove, said slide passing behind each leaf spring 330 and these springs serve to retain the slide 333 in the groove 332. A lug as 334 is fast on the slide 333 in position to cooperate with each spring 330, each lug 334 including an overhanging portion which may pass over the outer face of the adjacent spring. The forward edge of the overhanging portion of each lug 334 is beveled, as indicated at 335, to insure passage of the overhanging portion of this lug over the outer face of the adjacent spring 330 upon reciprocation of the slide 333.

By referring to Fig. 17 it will be seen that a notch 336 is provided in the lower edge of the carrier bar 252 and that another notch 337 is provided in the lower edge of this bar forwardly of the notch 336. These notches are arranged to define oppositely facing shoulders, the shoulder defined by the rear notch 336 facing forwardly and the shoulder defined by the front notch 337 facing rearwardly. An opening 338 is provided in the side plate 254 and a pin 339, Fig. 15, projects through this opening to be engageable in the notches 336 and 337. The pin 339 is fast in a finger 340, pivoted as indicated at 341 to the lower end of a plate 342 secured to the slide 333. A spring 343 extends between spring anchors respectively located on the side plate 254 and the finger 340 and acts on this finger to urge the pin 339 into engagement with the lower edge of the carrier bar 252.

In the latter part of the rearward movement of the carrier bar 252 the shoulder thereon defined by the notch 337 engages the pin 339 and through the finger 340 and plate 342 moves the slide 333 rearwardly, and thereupon the lugs as 334 assume the position shown in Fig. 18. This disposes the beveled edges 335 on these lugs in alignment with, but free of, the springs 330. Hence the fulcrum for each spring 330 is the screw 331 wherefore the extent of each spring between its fulcrum and the point where it applies its effective pressure its relatively elongated and by reason of this each spring exerts but very little pressure on the pawl to which it is connected. Hence, after the carrier bars attain their rearwardmost position and start to move forwardly to advance the printing and control devices in the manner above described, both the pawls 324 and 325 exert but very little pressure on the edges of the printing and control devices moving past them.

However, just before the carrier bars attain their forwardmost position, the pin 339 enters the notch 336 and engages the shoulder thereof whereby, as the carrier bars complete their forward movement, the shoulder of the notch 336 acts through the pin 339, finger 340 and plate 342 to move the slide 333 forwardly. In this movement the slide 333 moves the lugs 334 over the outer faces of the springs 330 with the result that the springs fulcrum on the lugs rather than on the screws 331. This changing in the point of fulcruming of the spring decreases the effective length and thereby substantially increases the effective pressure thereof and at the time this is effected the pawls 324 and 325 are moving into the notches as 323 in the printing and control devices in stations II and III. Therefore effective pressure is applied on the pawls to positively seat these pawls in the notches wherefore the printing and control devices in stations II and III are accurately located, by reason of the fact that the configuration of the pawls and the notches with which they cooperate are complementary, and furthermore, the printing and control devices are firmly held in position. The slide 333 will be moved rearwardly so as to withdraw the lugs 324 from association with the springs 330 prior to the time the printing and control devices start to move forwardly in the next advancing thereof and hence the effective pressure applied on the pawls is relieved prior to the time the printing and control devices are to be moved relative thereto.

During the time the printing and control devices are being carried along by the carrier bars 252 and 253, they are held down on these carrier bars by thin strips 344 and 345, Fig. 14, respectively fastened to the upper edges of the side plates 254 and 255, these thin strips projecting inwardly beyond the inner faces of these side plates and defining the upper surfaces of the printing and control device guideway.

During rearward movement of the carrier bars at which time the pawls 281 and 282 are passing under the printing and control device in position II and the pawls 285 and 286 are passing under the printing and control devices in position III the above described pawls 324 and 325 are seated in the notches in the edges of the printing and control devices in these positions and this seating of the pawls together with the strips 344 and 345 insures that the printing and control devices remain in positions II and III until the rearward movement of the carrier bars 252 and 253 has been completed. However, as explained above, the spring pressure effective on the pawls 324 and 325 is relieved prior to the time the carrier bars 252 and 253 start to move forwardly and therefore when these carrier bars do move forwardly the pawls 324 and 325 are cammed out of the notches in the printing and control devices in the course of the forward movement of the carrier bars, the strips 344 and 345 preventing the printing and control devices riding upwardly away from the carrier bars as the pawls 324 and 325 are being so cammed out.

By referring to Figs. 15 and 16, it will be noted that a clearance is provided between the lower edges of the finger 340 and the opening 338. The purpose of this clearance is to enable the finger 340 to be cammed downwardly without being shifted laterally during the interval when the shoulder of the notch 336 in the carrier bar 252 is moving out of engagement with the pin 339 on the finger 340, and before the shoulder of the notch 337 has engaged the pin 339 during rearward movement of the carrier bars 252 and 253. The spring 343 serves to maintain the pin 339 in contact with the bottom edge of the carrier bar 252 at all times during this operation, and the slide 333 will remain in its forward position due to the frictional engagement of the lugs 334 with the leaf springs 330, until the shoulder of the notch 337 again engages the pin 339 and causes the finger 340 and slide 333 to shift rearwardly.

It has been stated that the pawls 285 and 286, Figs. 5 and 13, eject the printing and control device from the position III above the anvil 264 into a printing and control device discharge chute which is indicated by 346, Figs. 23, 24 and 25. This discharge chute includes two plates 347 and 348 secured to the inner faces of the side plates 254 and 255 near the front ends thereof and the upwardly and forwardly disposed faces of these plates are arcuate as shown in Figs. 23, 24 and 25. In Fig. 25 the forwardmost position attained by the pawl 285 is illustrated and inasmuch as this pawl will be engaged with the rear edge of a printing and control device that has been located at station III it is manifest that, in the course of this pawl and its mate 286 moving into this position, the aforesaid printing and control device is fed out over the upwardly and forwardly disposed arcuate edge of the plates 347 and 348 and as this device attains this position it falls in such a way that its leading edge drops downwardly onto the aforesaid edges of the plates 347 and 348. To insure passage of the printing and control devices onto these edges of the plates 347 and 348, plates as 349 and 350 are secured to the side plates 254 and 255 at the front ends thereof and the rearwardly disposed edges of these plates are also curved for a short distance to define a throat through which the printing and control devices fall, this throat constituting the discharge chute 346. It will be understood that the plates 347 and 348 are spaced to cooperate with the opposite side edges of the printing and control devices as are the plates 349 and 350.

A bar 351 is secured at one end to the upright 258 by a bracket 352, Figs. 3 and 19, and is disposed below the lower end of the discharge chute 346. A bar 353 is secured to the lower portion of the forwardly disposed face of the bar 351 well below the lower ends of the plates 347, 348, 349 and 350, as shown best in Fig. 25. The upper edge of this bar 353 provides the floor or bottom of the discharge chute 346 for as the printing and control devices fall through this chute they come to rest on this upper edge, a printing and control device D being shown in this position in Figs. 20 and 25, this being station or position IV in the movement of the printing and control devices through the machine.

As has been explained, printing and control devices are customarily stored in drawers or other suitable storage means when not in use and where drawers are employed they are intended to be mounted in suitable cabinets. The printing and control devices are removed from these drawers and introduced into the magazine H and when this is done the drawer from which the devices were removed is placed in the machine, in a position and in a manner to be described presently, so that after the printing and control devices, which were removed from such drawer and introduced into the magazine, fall down through the discharge chute 346, they may be passed back into this drawer.

The capacity of the magazine H for receiving printing and control devices is more than the capacity of a single drawer, thus enabling an ample number of printing and control devices to be arranged in the magazine to insure that the machine may be continued in operation once it has been started. Hence, during a substantial portion of the operation of the machine printing and control devices from at least two drawers or other storage members will be in the machine. The drawers or other storage members are usually labeled to identify the printing and control devices that are stored therein and in order that this identification will not be disturbed, which would of course interfere with the system under which the printing and control devices are filed or arranged, it is essential that the printing and control devices pass back into the particular drawer from which they were removed and the present machine automatically operates so as to insure this.

Inasmuch as printing and control devices from at least two drawers will usually be in the machine of my invention I have arranged the machine so that two drawers may be supported therein in position to permit printing and control devices to pass thereinto after the devices attain position IV, Figs. 20 and 25, and this is accomplished in the following manner.

Suitable drawer receiving means are provided in the machine into which drawers may be inserted after printing and control devices are removed therefrom and placed in the magazine H and such means are rigidly mounted in the machine. As has been explained heretofore, tie rods as 239, Fig. 1, extend between the uprights 258 and 259 of the frame 15 and, as best shown in Fig. 4, the tie rod 239 extends between the forward part of said uprights 258 and 259 while the tie rod 239a extends between the rear part of these uprights. A spacing sleeve 354 is disposed about the tie rod 239 between the uprights 258 and 259 and another spacing sleeve 355 extends between these uprights about the tie rods 239a. The sleeve 355 is preferably discontinuous and, intermediate the medial and end sections thereof and at each end of the medial section, brackets 356 and 357, Figs. 1 and 4, are fixedly clamped. In order to insure that the brackets 356 and 357 will be rigidly supported, a brace rod 358 is attached to these brackets forwardly of the connection thereof to the sleeve 355 and this brace rod is firmly connected to the upright 258 at a suitable position.

A rod 359 extends between the brackets 356 and 357, and drawer receiving chutes 360 and 361 are pivotally supported on this rod. Each of these chutes includes oppositely faced coextensive angle irons, and brackets as 362 are secured beneath the inwardly directed flanges of these angle irons, the rod 359 passing through these brackets to afford the pivotal support for the chutes. The brackets 362 also serve to maintain the angle irons in properly spaced relation so that the drawers J may be respectively passed into and rested on the two chutes defined by these angle irons.

A plate as 363 extends between the angle irons forming the sides of each of the chutes 360 and 361 near the forward ends thereof, and an arm as 364 is secured to and depends from each of these plates. A latch bar as 365 is pivotally connected to each depending arm as 364, as indicated at 366, and the lower end of each bar as 365 is recessed as indicated at 367 to seat on a rod 368 extending between the brackets 356 and 357 near the lower ends thereof. As shown in Fig. 4, a spring 369 extends between each depending arm as 364 and each latching bar as 365 and urges the latching bar toward latching engagement with the rod 368. A lower finger piece 370 is secured to each plate as 363 and projects forwardly, and an upper finger piece 371 is secured to the upper end of each latching bar as 365, the finger pieces of each set normally extending in spaced parallel relation as shown in Fig. 4. By grasping the finger pieces 371 and 370 and pressing the finger piece 371 toward the finger piece 370 the recessed end 367 of a latching bar 365 may be disengaged from the rod 368 whereupon the associated chute may be pivoted about the rod 359 into a lower position in which the lower end of the depending arm 364 seats on the periphery of the sleeve 354 to thereby support the chute in such a position that a drawer J may be easily inserted thereinto. After a drawer has been inserted, pressure is applied on the underside of the finger piece 370 whereupon the chute may be pivoted into the position of the chute 360 shown in Fig. 4 and in this position the latch bar 365 engages the rod 368 and supports the drawer in the chute in position to receive printing and control devices in a manner to be explained presently.

The printing and control devices carried to the discharge chute by the pawls 285 and 286 fall through the chute and come to rest on the top edge of the bar 353 in position IV, Figs. 20 and 25, and in order to pass these devices back into the drawer from which they were removed, these devices must be moved into either the position V or the position VI, Fig. 20, depending upon into which one of the two drawers the printing and control devices are to be passed, for, as shown in Fig. 20, the chute 360 is aligned with position VI while the chute 361 is aligned with position V. If the printing and control devices are moved through position V to position VI they will be collected in the drawer J in the chute 360 but if the printing and control devices are moved only to position V they will pass into the drawer J in the chute 361.

In the present instance it will be assumed that the printing and control devices which will be first fed through the printing and control device guideway by the carrier bars 252 and 253 were removed from the drawer that is supported in the chute 360 and hence these printing and control devices are to be returned to this drawer, which means that these printing and control devices are to be fed to position VI, Fig. 20.

The forward movement of the carrier bars 252 and 253 and the pawls 285 and 286 thereon is completed near the end of a cycle of operation of the machine and hence it is near the end of such a cycle of operation that the printing and control device that was in position III during the cycle is fed forwardly and falls down the discharge chute 346 and comes to rest on the top edge of the bar 353 in position IV. In the next cycle of operation this printing and control device is moved along the top edge of the bar 353 from position IV to position V and such movement is effected in the manner now to be described.

A pawl 372, Figs. 3 and 19, is pivotally mounted at the forward end of an arm 373 on a screw pin 374. The tail of the pawl 372 projects beyond the pin 374 and one end of a spring 375 is connected thereto, the other end of this spring being secured to a spring anchor fast in the arm 373. The spring 375 acts on the pawl 372 to urge the hook nose 376 thereon forwardly toward the printing and control devices in positions IV and V.

As best shown in Fig. 3, the arm 373 is pivoted on a stud 377, carried by the bracket 300, near its rear end, said arm including a portion 378 that projects beyond the stud 377 which carries a cam follower 379 that is urged into engagement with the periphery of the cam 380 by a spring 381 (see also Fig. 19). The cam 380 is fast to the above described shaft 301 to rotate with this shaft each time the clutch teeth 307 are engaged with the clutch teeth 305 to connect this shaft with the gear 303. It will be remembered that such engagement of the clutch teeth 307 with the clutch teeth 305 causes the carrier bars 252 and 253 to be reciprocated for advancing the printing and control devices through the guideway therefor, and thus the cam 380 is caused to rotate and operate the arm 373 each time the printing and control devices are advanced through the guideway therefor.

The cam 380 is an eccentric and each time it is rotated with the shaft 301 it acts through the cam follower 379 and portion 378 to impart a reciprocatory movement to the arm 373. The at rest position of the arm 373 is shown in Fig. 19, and in each reciprocation of the arm 373 it moves the pawl 372 from the position shown in Fig. 19 into the position shown in Fig. 3. It will be noted that in the at rest position of Fig. 19 the hook nose 376 of the pawl 372 is at one side of a printing and control device in position IV and that when this pawl attains its other extreme alternative position this hook nose 376 is disposed well to the other side of a printing and control device in position IV.

Therefore, in the cycle of operation following that in which the first of a series of printing and control devices is moved into position IV, the arm 373 will be reciprocated to advance the pawl 372 from the position shown in Fig. 19 into the position shown in Fig. 3 and then to retract the pawl from the position shown in Fig. 3 back into the position shown in Fig. 19. In the course of movement of the pawl 372 from the position shown in Fig. 19, it rides past the rear face of the printing and control device in position IV, and in a manner described in detail hereinafter, and when the hook nose thereof has passed beyond the outwardly disposed edge of this printing and control device this hook nose moves into position such that when the pawl 372 is returned from the position shown in Fig. 3 to the position shown in Fig. 19 the hook nose 376 engages the printing and control device in position IV and moves it into position V.

The cam 380 is timed with respect to the reciprocation of the carrier bars 252 and 253 so that the hook nose 376 withdraws the printing and control device in the position IV from this position well in advance of the time the pawls 285 and 286 attain the position in which the pawl 285 is shown in Fig. 25 so that the succeeding printing and control device D does not move into position IV until well after the preceding printing and control device has been withdrawn from this position and disposed in position V.

Such movement of a printing and control device from position IV to position V and the passage of the succeeding printing and control device into position IV well after the removal of a printing and control device from said position IV is further insured by positioning the pawls 285 and 286 in a position relatively close to the pawls 281 and 282, as shown in Fig. 17, for such positioning of the pawls 285 and 286 insures that these pawls will not engage the rearwardly disposed edge of a printing and control device in position III until a point well along in the advancing movement of the carrier bars 252 and 253 is attained, this point in fact being well near the end of the advancing movement of the carrier bars.

As can be determined by reference to Fig. 31, the printing and control devices D may have tabs Y secured in the tab retaining means Y' thereon. In the present instance the rearwardmost printing and control device in every drawer will have a tab Y retained thereon in the first of the retaining means Y' for, when the printing and control devices are removed from the drawer and introduced into the magazine H, the rearwardmost printing and control device in the drawer assumes the lowermost position in the magazine H. This means that this rearwardmost printing and control device will be the first of a set or group thereof removed from a particular drawer to pass through the machine.

When the first printing and control device of a series, that is, a group thereof removed from a particular drawer, attains the position V, the tab Y thereon is in position to be sensed by sensing means which control the means that determine whether a printing and control device is to move into the drawer aligned with position V or the drawer aligned with position VI.

Such sensing means are generally indicated by 382, Figs. 24 and 28, and include an arm 383 that is pivotally mounted at 384 on a bracket 385 that is carried by the girder 261, Figs. 23 and 24. A pin 386 projects downwardly from the arm 383, and one end of a spring 387 is connected to this pin, the opposite end of said spring being fixed to the bracket 385 and this spring tends to pivot the arm 383 downwardly about its support 384. The lower edge of the arm 383 is recessed to define an inset edge 388 that is adapted for cooperation with an abutment 389 on an arm 390 that is pivotally mounted at 391 on a bracket 392 that is carried by the girder 261, Fig. 24. The abutment 389 is engageable with both the inset edge 388 and the lower edge of the arm 383. In a manner described hereinafter, the arm 390 is rocked about its pivot 391 in each cycle of operation of the machine, at a time substantially concurrent with that at which a printing and control device comes to rest in the position V. At this time the abutment 389 is moved from engagement with the lower edge of the arm 383 into alignment with the inset edge 388 and thereupon the spring 387 pivots the arm 383 downwardly, the arm 383 being held in its upper position against the action of the spring 387 so long as the abutment 389 is engaged with the lower edge thereof.

A plate 393 is pivotally mounted at the forward end of the arm 383 as indicated at 394. The plate 393 carries a stud 395 of insulating material which is engageable with the lower blade 396 of a switch generally indicated by 397, the blade 396 being mounted on but insulated from the arm 383. Another blade 398 of the switch 397 is mounted above and insulated from the blade 396 and a contact on the blade 398 is normally disengaged from a contact on the blade 396.

If the printing and control device moved into the position V carries a tab Y, the plate 393 engages this tab when the arm 383 is pivoted downwardly and this engagement arrests further movement of the plate 393 with the arm 383. The arm 383, however, continues to move downwardly and thereupon the stud 395 engages the blade 396 and forces the contact on this blade into engagement with the contact on the blade 398 to thereby close the switch 397. Of course, if the printing and control device in the position V does not carry a tab Y, the plate 393 will pivot with the arm 383 until the edge 388 engages the abutment 389 whereupon further downward movement of the arm 383 is arrested and in such an operation the stud 395 does not cause the contacts of the switch 397 to be engaged, it being the engagement of the edge 388 with the abutment 389 that always stops lowering movement of the arm 383.

It has been previously explained that the series of printing and control devices that are first passing through the machine in the present instance are to be collected in the drawer in the chute 369 which, as has been explained, is aligned with the position VI. However, the series of printing and control devices which previously passed through the machine were collected in a drawer in the chute 361 which is aligned with the position V, and the mechanisms which selectively cause the printing and control devices to pass into a drawer aligned with the position V or a drawer aligned with the position VI are arranged to cause the printing and control devices to collect in a drawer aligned with position V, which is to say, a drawer in the chute 361.

However, the above described sensing operation which results in closing the switch 397 is performed just prior to the end of a cycle of operation and therefore the switch 397 is closed to initiate a change in the set-up of the aforesaid mechanisms prior to a cycle of operation in which the first printing and control device now in the position V will be moved therefrom into position VI and this is effected in a manner now to be described.

The switch 397 is in circuit with a solenoid 399, Figs. 5, 6, 22 and 33, and when the switch 397 is closed just prior to the end of a cycle of operation the solenoid 399 is energized.

The solenoid 399 includes a core 400 which has a bell crank shaped pawl 401 pivotally mounted thereon as indicated at 402, Fig. 22. The pawl 401 has a notch 403 therein engageable with a pin 404 in the arm 405 that is pivotally mounted at 406 on a plate 407 carried by a bracket 408 supported on the girder 260, Fig. 5. The arm 405 has a shoulder 409 therein that is selectively engageable with the shoulders 410 and 411 on a disc 412 that is rotatably mounted on a shaft 413 journaled in the bracket 408. The disc 412 is rigidly connected to the element 414 of a slip clutch generally indicated by 415, Fig. 3, the other element 416 of this clutch being fast to the shaft 413, which shaft, in addition to being journaled in the bracket 408, is journaled in the upright 258. A pulley 417 is fast on the shaft 413 and a belt 418 is passed about this pulley, Figs. 1, 3, 5 and 20, the belt 418 also passing about a pulley 419, Fig. 1, on the main drive shaft 19 so that so long as the main drive shaft is in operation, the shaft 413 and the element 416 of the slip clutch 415 are rotated. A spring 420 acts on the arm 405 to normally urge the shoulder 409 thereon into engagement with either the shoulder 410 or the shoulder 411 on the disc 412 and this prevents rotation of the disc 412 with the shaft 413, the elements of the clutch 415 slipping relative to each other so long as the disc 412 is so held.

In the present instance where the previous series of printing and control devices was introduced into a drawer aligned with position V, the shoulder 409 has been engaging the shoulder 410 on the disc 412. Therefore, when the solenoid 399 was energized, upon closure of the switch 397 by reason of the presence of a tab Y on the printing and control device in position V, it attracted its core 400 as well as the pawl 401. The notch 403 in this pawl thereupon engaged the pin 404 and then the arm 405 was pivoted against the action of the spring 420 and the shoulder 409 was retracted from engagement with the shoulder 410 and thereupon the element 414 of the slip clutch 415 was picked up by the constantly rotating element 416 and the disc 412 started to rotate clockwise as viewed in Fig. 5.

As soon as the solenoid 399 atracts its core 400 and the pawl 401 in an amount sufficient to disengage the shoulder 409 from the shoulder 410, a depending arm 421 on the pawl 401 engages the face of the solenoid and so pivots the pawl 401 that the notch 403 therein disengages the pin 404 whereupon the spring 420 pulls the arm 405 into engagement with the periphery of the disc 412. The depending arm 421 disengages the notch 403 from the pin 404, and the spring 420 pulls the arm 415 into engagement with the periphery of the disc 412 prior to the time this disc has rotated one hundred eighty degrees so that by the time this disc has rotated one hundred eighty degrees the shoulder 409 is in position to engage the shoulder 411 and thereupon interrupt rotation of the disc 412. The foregoing operation is again effected upon the next closure of the switch 397 and in this operation the shoulder 409 reengages the shoulder 410. Hence, each time the switch 397 is closed, the disc 412 is caused to rotate one hundred eighty degrees.

In the present instance the disc 412 was in the position shown in Figs. 5 and 22 at the time the switch 397 was closed, and the closure of this switch and the energization of the solenoid 399 resulted in the disc 412 moving from the position shown in Figs. 5 and 22 to the position shown in Fig. 6. It is such rotation of the disc 412 that changes the setting of the mechanisms which selectively direct the printing and control devices into the drawer aligned with the position V or into the drawer aligned with the position VI and in the present instance the setting attained directs the printing and control devices into the drawer aligned with position VI. The just referred to change in setting entails the devices now to be described.

A pin 422 is provided in the disc 412 and projects therefrom to cooperate with spaced stops 423 and 424 adjustably secured to a rod 425 that is slidably mounted in brackets 426 and 427 which respectively depend from the girders 260 and 261. When the disc moves from the position shown in Fig. 5 into the position shown in Fig. 6, the pin 422 moves from engagement with the stop 423 and into engagement with the stop 424 and thereby shifts the rod 425 to the left, as it is viewed in Fig. 5, it being understood that the spacing between the stops 423 and 424 is less than the diameter of the circle inscribed by the rotation of the pin 422 so that each time the pin engages one or the other of these stops the rod 425 is shifted. It will of course also be understood that when the disc 412 rotates from the position shown in Fig. 6 back into the position shown in Fig. 5 the pin 422 moves from engagement with the stop 424 back into engagement with the stop 423 and shifts the rod 425 to the right, as viewed in Fig. 5.

A depending arm 428, Figs. 5 and 23, is fast on a shaft 429 that is journaled in a bracket 430 which is carried by the girder 261. A link 431 extends between the stop 423 and the arm 428 and each time the rod 425 is shifted, as above described, movement is imparted through the link 431 to the arm 428 to move the shaft 429 from one alternative position into another. The shaft 429 operates mechanisms that determine into which of the two drawers the printing and control devices are to be fed and such mechanisms will now be described.

As best shown in Figs. 20 and 26, the bar 353 terminates at the point 432, which point is slightly to the left, as viewed in Fig. 20, of the point at which the printing and control devices come to rest in position V above a bar 433, Figs. 24 and 26. This bar is supported on pins 434 which are passed through openings in the bar 351. A recess 435 is provided in the face of the bar 351 in alignment with the bar 433 and suitable means are provided which act on the pins 434 to retract the bar 433 from the position shown in Fig. 26 back into the recess 435 against the action of springs as 434', and when this is done a printing and control device in position V which will be resting on the bar 433 falls downwardly to pass into a drawer supported in the chute 361, the means which guide the plate in this descent being described presently.

The means which retract the bar 433 into the recess 435 include a rocker 436 pivotally mounted in lugs 437, Figs. 24 and 26. The pins 434 have recesses 438, Fig. 24, provided therein and the upper edge of the rocker 436 passes into these recesses. An adjustment screw 439 is mounted in the rocker 436 and engages the rear face of the bar 351 to stop the rocker 436 in a forward position in which this rocker disposes the bar 433 in position to support a printing and control device in position V.

It will be manifest that as a printing and control device is fed from position IV to position V, Fig. 20, it is necessary that the bar or gate 433 be disposed in such a position that the printing device may pass thereonto for otherwise the printing and control device would tilt and tend to fall toward the drawer supported below position V with a side edge downwardly rather than its bottom edge downwardly as should be done in order to properly collect the printing and control devices in a drawer supported in the chute 361. Therefore, during the time a printing and control device is being advanced from position IV to position V the gate afforded by bar 433 is in the position shown in Figs. 24 and 26 and when in this position a printing and control device may move thereonto and be supported thereby.

However, when printing and control devices are to pass into the drawer supported in the chute 361, which is aligned with position V, it is necessary to retract the gate 433 from the position in which it is shown in Figs. 24 and 26 back into the recess 435 and when the gate is retracted into this recess a printing and control device resting thereon falls downwardly to pass into the drawer supported in the chute 361. In order to permit a printing and control device to fall into such drawer and in order to have the gate 433 in position to receive a printing and control device when such a device is advanced from position IV to position V, the gate 433 is retracted into the recess 435 in the first part of a cycle of operation so that a printing and control device resting thereon may fall therefrom into a drawer supported in the chute 361 in such first part of a cycle of operation. A printing and control device will be advanced from position IV to position V during the latter part of a cycle of operation and at this time the gate 433 should be and is disposed in the position shown in Figs. 24 and 26 so that it will be ready to receive a printing and control device fed thereonto in the course of movement of such a device from position IV into position V. The means which operate the gate 433 in the aforesaid manner include devices carried by parts of a mechanism now to be described.

As is explained hereinafter an arrangement is provided for packing the printing and control devices rather tightly together in the drawer into which they pass, a mechanism for this purpose being common in the art and being known as a packer, and an example of such a mechanism will be found in U. S. Letters Patent 1,299,437. A reciprocatory movement is imparted to such packers employed in the present machine (one such packer being associated with each of the drawers respectively supported in the chutes 360 and 361) and common means are provided for this purpose. Such means include a rod 440, Figs. 3, 23 and 25, this rod passing through an opening 441 in the bar 351 and having a nut 442, Figs. 23 and 25, on the forward end thereof and, as will be explained presently, this nut engages and operates the packers, the packer arms of said packers being tied together by a cross bar 443 and an opening 444 being provided in this cross bar through which the forward end of the rod 440 passes to be supported therein.

As best shown in Figs. 4, 9 and 11, the rear end of the rod 440 is threaded and is run into a tapped opening in one element 445 of a universal joint 446, a lock nut 447 insuring firm connection of the rod 440 in the element 445. The other element 448 of the universal joint 446 is fast to one end of an arm 449, the opposite end of which is pivotally connected, as indicated at 450, to a projection 451 on the cross member 313, Figs. 9 and 11.

It will therefore be seen that the rod 440 is firmly supported at its front and rear ends and this rod is utilized to support the devices which operate the gate 433 in the manner now to be described.

As best shown in Figs. 23, 25 and 26, a sleeve 452 is slidably mounted on the rod 440 and a plate 453 is fast to this sleeve. The forward edge of this plate 453 is held in engagement with the upper edge of the rocker 436, as clearly shown in Figs. 23 and 26, by the action of the spring 454 which extends between the rocker 436 and a spring anchor 455 on the plate 453. A lug 456, Fig. 23, depends from the rear end of the sleeve 452 and one end of a link 457 is pivotally connected to this lug. The other end of the link 457 is pivotally connected to one end of an arm 458, Figs. 9, 10 and 12, which has the opposite end thereof pivotally mounted on the stud affording the pivotal connection 450. A roller 459 is mounted on the arm 458 substantially midway in the extent thereof, and this roller projects beyond the edge of the arm to engage the periphery of a cam 460 that is fast on the shaft 301 which, in the manner above described, is caused to make a complete revolution each time the solenoid 310 is energized to cause the clutch teeth 307 to engage the clutch teeth 305, Fig. 5. The springs as 434', Fig. 26, acting on the gate 433, are effective through the medium of the pins 434, rocker 436, spring 454, sleeve 452, and rod 457 to urge the roller 459 into engagement with the periphery of the cam 460.

The configuration of the cam 460, Fig. 12, is such that immediately after the start of a cycle of operation the cam so acts on the roller 459 that the link 457 is caused to be retracted rearwardly and this is effective through the spring 454 to move the rocker 436 rearwardly. It will be recalled that the rocker 436 is pivotally connected to the lugs 437, Fig. 24, and when the rocker 436 pivots rearwardly at this time the gate 433 is retracted from the position in which it is shown in Figs. 24 and 26 back into the recess 435 against the action of springs as 434'. Springs 434' are sufficiently yieldable to enable the pulling force exerted by spring 454, when roller 459 is on the rise of the cam 460, to be sufficient to cause the gate 433 to seat in the recess 435. A printing and control device resting thereon at this time falls therefrom toward the drawer supported in the chute 361. The configuration of the cam 460 is such that, well prior to the end of a cycle of operation, the sleeve 452 and therefore the plate 453 thereon are caused to move forwardly, due to the decrease of tension in spring 454, wherefore the springs 434' are effective to reposition the gate 433 in the position in which it is shown in Figs. 24 and 26. This occurs prior to the time that the hook nose 376 on the pawl 372 so engages the edge of a printing and control device in position IV that the printing and control device will start to move from position IV to position V. Therefore, by the time the hook nose 370 moves a printing and control device from position IV to position V the gate 433 will be in position to receive and support the printing and control device moved into position V.

The just described arrangement for retracting the gate 433 is such that it will operate to tend to retract the gate 433 in each and every cycle of operation. However, in those instances where a printing and control device disposed in position V is not to pass into the drawer supported by the chute 361 but is to pass into the drawer supported in the chute 360, the printing and control device must be advanced from position V to position VI. This would be prevented if the gate 433 were retracted in the manner above described and hence where a printing and control device is to be advanced from position V to position VI, by means to be described presently, an arrangement is provided whereby the rocker 436 is prevented from pivoting rearwardly at a time the cam 460 acts on the roller 459 and through the link 457 to move the sleeve 452 rearwardly along the rod 440.

The arrangement which enables this to be accomplished includes the pawl 461, Figs. 3, 5, 19, 23, 24, 25 and 26, which is recessed at its forward end, as indicated at 462, Fig. 24, so that it may neatly seat on the top edge of the rocker 436. The rear end of the pawl 461 is freely mounted on the shaft 429, Figs. 5 and 24, which shaft it will be recalled is moved into alternate positions by the action of the pin 422 on the disc 412 on the stops 423 and 424, and it is this movement of the shaft 429 into alternate positions that determines whether or not the cam 460 is to be effective to retract the gate 433. Whether or not the gate 433 is retracted determines whether a printing and control device moves into the drawer in the chute 361 or into the drawer in the chute 360.

In the present instance where the pin 422 moves from the position shown in Fig. 5 into the position shown in Fig. 6 and engages the stop 424 to act through the link 431 to move the shaft 429 into a given position, this shaft attains a position such that the arm 463 thereon moves into the position in which it is shown best in Fig. 24 in which position the pin 464 on the arm 431 is disengaged from the pawl 461, it being appreciated that the arm 463 is fast to the shaft 429, this being effected in the present instance by the set screw 465. With the pin 464 so disposed out of engagement with the pawl 461, this pawl remains in the position in which it is shown in Fig. 24, which is to say, it remains in engagement with the rocker 436 and the recess 462 therein acts as an abutment so that when the cam 460 moves the sleeve 452 rearwardly on the rod 440 the plate 453 will be retracted from engagement with the rocker 436 and the spring will be elongated. Thus the rocker 436 remains in the position shown in Fig. 24 and therefore the gate 433 is not retracted back into the recess 435, and hence the printing and control device which was moved onto the gate in the preceding cycle of operation does not fall down into the drawer supported in the chute 361 but rather is advanced into position VI in the manner to be described presently.

However, when switch 397 is again closed by reason of the engagement of the plate 393 with a tab Y on the first printing and control device of a series, when this device is disposed in position V, the solenoid 399 will again be energized and in this instance the pin 422 will move from the position shown in Fig. 6 back into the position shown in Fig. 5, and in the course of this movement this pin will engage the stop 423 and so move this stop that the link 431 will rock the shaft 429 in such a direction that the pin 464 will engage the pawl 461 and move this pawl into an elevated position in which it will be free of the rocker 436. So long as the pawl 461 remains in its elevated position, the gate 433 will be retracted each time the sleeve 452 is moved along the rod 440 by the action of the cam 460 and therefore printing and control devices passed to position V will fall down into the drawer supported in the chute 361. If the gate 433 is retracted, which has been stated heretofore occurs during the start of a cycle of operation, and the printing and control device which has been resting thereon falls into the drawer supported in the chute 361, the means which are effective to advance the printing and control devices from position V to position VI, in the course of their advancing movement, do not engage a printing and control device in the position V for by this time the printing and control devices will have fallen in the drawer supported in the chute 361, this being explained in further detail hereinafter.

However, when the pawl 461 remains in the position shown in Fig. 24 and prevents retraction of the gate 433 in the manner above described, then the printing and control device supported on this gate, which is position V, is advanced to position VI and this is accomplished in the following manner.

A pawl 466, Fig. 19, is pivotally mounted on the pin 374, which is the same pin as that on which the pawl 372 is pivotally mounted. This pawl 466 includes an upstanding projection 467 that is disposed outwardly of the pin 374, and a spring 468 is connected to this upstanding projection and acts on the pawl 466 to urge it forwardly into the position in which it is shown in Fig. 19. In connection with the description of the operation of the pawl 372, it has been explained that the arm 373 is reciprocated in the course of each cycle of operation and that in so doing the pawl 372 is advanced from the position in which it is shown in Fig. 19 into the position in which it is shown in Fig. 3, and in such reciprocation the pawl 466 is also advanced from the position in which it is shown in Fig. 19 into the position in which it is shown in Fig. 3.

The pawl 372 advances across the rear face of a printing and control device in position IV while the pawl 466 advances across the rear face of a printing and control device in position V. Printing and control and like devices usually have spacing flanges projecting from the rear faces thereof and there are other irregularities in the rear faces of such devices. Particularly because of the irregularities on the rear faces of the printing and control devices, if the pawls 372 and 466 were permitted to ride on such rear faces in the advancing movement thereof there might be a tendency to drag the printing and control devices from positions V and IV. Hence it is advantageous to insure that the pawls are kept free of the rear faces of the printing and control devices in the course of the advancing movement of the pawls, and this is advantageous not only from the standpoint of what has just been described but also because it prevents unnecessary wear on the printing and control devices which might arise if the pawls were permitted to drag thereover. Moreover, proper guiding of the pawls during the advancing movement thereof prevents the pawls from unnecessarily pivoting forwardly in the course of their advancing movement in the event there are no printing and control devices in one or the other of positions IV and V.

Such guiding of the pawls is accomplished in the present instance by providing a pin 469, Fig. 19, near the hook nose 376 of the pawl 372 and a pin 470, Figs. 19 and 23, adjacent the hook nose 471 of the pawl 466, which hook nose corresponds to the hook nose 376 and insures engagement of the pawl 466 with a printing and control device in position V when such a device is to be advanced to position VI. As best shown in Fig. 24, the upper edge of the bar 351 is recessed and strips as 472, Fig. 19, are secured to springs as 473, Fig. 27, these springs being fast to the rear face of the bar 351 and supporting the strips as 472 in the recessed portion in the upper edge of the bar 351 to thereby define guideways 474 and 475 for the pins 469 and 470, respectively, these guideways being defined between the upstanding part of the bar 351 and the strips as 472. The edges of the strips as 472 first engaged by the pawls 372 and 466 in the advancing movement of these pawls, which is the movement of these pawls from the position shown in Fig. 19 to the position shown in Fig. 3, are beveled as indicated at 476, Figs. 19 and 27, so that as the pawls start forwardly, the pins 469 and 470 may ride over these beveled edges 476 and thereby insure passage of the pawls from the position shown in Fig. 19 to the position shown in Fig. 3 over the rearwardly disposed faces of the strips 472 and hence in spaced relation with printing and control devices in positions IV and V.

Near the end of the advancing movement of the pawls 372 and 466, in which end position the parts are shown in Fig. 3, the pins 469 and 470 respectively provided thereon move from the rear faces of the strips 472 under the influence of the springs 375 and 468 acting on the pawls and the pawls move forwardly at this time so that the hook noses 376 and 471 thereof are extended beyond the edges of the two printing devices respectively positioned in the positions IV and V. Then during the retracting movement of the pawls 372 and 466 the hook noses thereof engage the just mentioned printing and control devices and in this movement the printing device in position IV is moved to position V while the printing and control device in position V is moved to position VI. During this movement the pins 469 and 470 respectively pass through the guideways as 474 and to insure movement of the pins into these guideways the edges of the strips first engaged by the pins 469 and 470 in the retracting movement of these pawls are beveled as indicated at 477, Figs. 19 and 27, thus insuring passage of the pins 469 and 470 into the guideways as 474.

The mounting of the strips as 472 in the recessed portion of the upper edge of the bar 351 is clearly shown in Fig. 27 and it will be apparent from the above description that the strips as 472 are supported by the springs as 473 to insure the movement of the pins 469 and 470 therealong in the manner above described.

It will be remembered that in those instances where the pawl 461 is retracted from engagement with the rocker 436, that shortly after the initiation of a cycle of operation the gate 433 is retracted into the recess 435 so that a printing and control device at position V may fall into the drawer supported in the chute 361. If for any reason, a printing and control device so intended to fall did not promptly fall there might be instances where the hook nose 471 of the pawl 466 might move into the position in which it is shown in Fig. 3 and this pawl might start its retracting movement in time to engage such a printing and control device at position V. This printing and control device might have started to fall and would therefore be caught between the far edge of the opening defined by the retraction of the gate 433 in which instance jamming of the plate and possibly even of the machine might result. Furthermore, if the printing and control device had not already started to fall it might inadvertently be moved over into position VI in which instance it would be directed into the improper drawer. Therefore, in those instances where the printing and control devices are to be collected in the drawer supported in the chute 361 the pawl 466 is rendered ineffective during its retracting movement in so far as any plate advancing functioning thereof is concerned for so to do insures against this pawl improperly coming into contact with a printing and control device in position V.

It will be recalled that in those instances where printing and control devices are to pass into the drawer supported in the chute 361, the shaft 429 will be disposed in the position opposite from that in which it is shown in Figs. 24 and 25, which is to say, in so far as Fig. 24 is concerned, this shaft will be disposed in such position that the pin 464 will be engaging the pawl 461 and holding the recessed end thereof out of engagement with the rocker 436. Under these circumstances, an arm 478, Figs. 25 and 27, secured to the shaft 429, is moved into a position such that a pin 479 thereon engages a pin 480 fast in a vertically movable slide 481, Figs. 27 and 29, which is mounted in a recess 482 formed in the bar 351, said recess opening into the rear face of the bar 351 but not extending entirely therethrough, and the slide 481 being retained in this recess by a clamp plate 483 fastened to the rear face of the bar 351.

When the pin 479 engages the pin 480, the slide 481 is moved from the position in which it is shown in Fig. 27 into the position in which it is shown in Fig. 29 and in this position an inclined cam surface 484 thereon is aligned with the beveled face 477 on the strip 472 with which the pin 470 cooperates. The inclined cam surface 484, when arranged in the position shown in Fig. 29, cooperates with the rear face of the associated strip 472 so that as the pin 470, Fig. 23, on the pawl 466 rides off this rear face, in the advancing movement of the pawl 466, this pin will pass onto the cam surface 484, this occurring during the latter part of the advancing movement and the pin 470 will remain in engagement with this cam surface 484. Hence in the retracting movement of the pawl 466 the pin 470 will travel back over the cam surface 484 which will direct the pin 470 back into engagement with the rear face of the strip 472 so that in this retracting movement of the pawl 466 the hook nose 471 thereof will be prevented from engaging the printing and control device in position V for the advantageous reasons above described.

Where printing and control devices are to be advanced from position V to position VI in order that these printing and control devices will be collected in the drawer in the chute 360, the positioning of the shaft 429 is that shown in Figs. 24 and 25 and this causes the pin 479 to engage a pin 485 on the slide 481 and thereupon the slide 481 is moved into the position in which it is shown in Fig. 27. When the slide is in this position the cam surfaces 484 is retracted from cooperating relation with the beveled edge 477, Fig. 27. Hence with the parts in this position the pin 470 will travel along the rear face of the strip 472 and when it has passed beyond the end of this strip near the end of the advancing movement of the pawl 466 it is in position to engage the beveled edge 477 during its retracting movement wherefore this pin is guided onto the front face of the strip 472. When the pin travels along this front face of this strip the hook nose 471 is in position to engage the printing and control device in the position V and incident to the retracting movement of the pawl 466 this causes the printing and control device which has been in the position V to be advanced into the position VI.

As has been explained with respect to the present description, printing and control devices are being returned to the drawer in the chute 360 which of course means that the slide 481 and the cam surface 484 thereon are to be disposed in the position in which these parts are shown in Fig. 27, which is to say, the retracted position thereof. The retracted and advance positions of the slide 481 are limited by engagement of the pin 480 with opposite edges of a bifurcation 486 formed in the clamp plate 483, said pin 480 extending into this bifurcation.

When the printing and control devices are advanced into position VI they come to rest on a gate 487, Fig. 26, which corresponds to the gate 433, this gate being mounted on studs 488 slidably journaled in openings in the bar 351. The gate 487 is retractable into a recess 489 by a rocker 490 which corresponds to and is mounted in a manner similar to the rocker 436 and which rocker 490 is connected to the studs 488 in the same manner as that in which the rocker 436 is connected to the studs 434. The plate 453 also engages an upstanding edge on the rocker 490, and a spring 491 is extended between the spring anchor 455 and the rocker 490. Springs as 488' tend to hold gate 487 in the position as shown in Fig. 26. Inasmuch as printing and control devices will only attain position VI when these devices are to be collected in a drawer in the chute 360, the gate 487 is retracted into the recess 489 each time the sleeve 452 is moved rearwardly along the rod 440 and hence it is not necessary to provide a pawl as 461 in association with the rocker 490.

In the present instance where the first of the printing and control devices to pass through the machine are to be collected in a drawer in the chute 360, the first of these devices attains position V and causes the switch 397 to be closed which energizes the solenoid 399. Energization of the solenoid 399 permits the disc 412 to move from the position shown in Fig. 5 into the position shown in Fig. 6 and in so doing the shaft 429, and more particularly the pawl 461 and the arm 478, are moved into the position in which these parts are shown, for example, in Figs. 24 and 25. The switch 397 is closed at the time the first printing and control device bearing the tab Y moves from position IV and comes to rest in position V which, as explained heretofore, is near the end of a cycle of operation. Hence the operation of disposing the shaft 429 in the position shown in Figs. 24 and 25 is initiated near the end of a cycle of operation and the moving of the shaft 429 into its alternative position is completed prior to the initiation of the next cycle of operation.

Then by the time, in the next cycle of operation, the hook noses 376 and 471 attain their advanced positions, the pawl 461 will have engaged the rocker 436 and, therefore, in the portion of the cycle of operation in which the pawls 372 and 466 are moved from the position shown in Fig. 19 into the position shown in Fig. 3 so that the hook nose 471 will be in position to engage the printing and control device bearing the tab Y, the pawl 461 will be operating to prevent movement of the gate 433. Therefore, the printing and control device bearing the tab Y will be moved from position V to position VI and by the time this printing and control device starts to move to position VI the gate 487 will be in the position shown in Fig. 26 and, therefore, the first printing and control device bearing the tab Y will move onto this gate. In the next cycle of operation the gate 487 will be retracted and thereupon this first printing and control device will pass down to the drawer supported in the chute 360.

It is essential that printing and control devices moved into position VI will be prevented from having any tendency to move back toward position V, and to this end a recess 351', Fig. 21, is formed in the face of the bar 351 at position VI and a pawl 352', Figs. 20 and 21, is pivotally mounted in this recess as at 353', this pawl being urged forwardly by spring 354' to dispose the hook nose 355' thereon in position to engage the trailing edge of the printing and control device moved into position VI. The end of the pawl 352' first engaged by the printing and control devices in the course of movement thereof from position V to position VI is beveled as indicated at 356' and this enables the pawl 352' to be pivoted rearwardly during the time a device advances from position V to position VI, the spring 354' of course returning the pawl 352' to device retaining position as soon as the trailing edge of the printing and control device has passed beyond the shoulder 355'.

It is of course essential when the gates 433 and 487 are retracted that the printing and control devices fall in such a way that they will pass into the drawer in which they are to be collected in the manner in which they are to be stored in these drawers. Hence, suitable guide means are provided below the gates 433 and 487 and in the present instance such guide means are as follows. Three blocks 492, 493 and 494, Figs. 20 and 26, are secured to the front face of the bar 351 and depend therefrom. The block 492 is disposed between positions IV and V and is so located that it is spaced slightly away from the adjacent end of the gate 433. The block 493 is mounted in such a position that opposite faces thereof are spaced slightly away from the adjacent ends of the gates 433 and 487, while the block 494 is mounted in such a position that the face thereof disposed toward position VI is slightly spaced away from the adjacent end of the gate 487. Strips as 495, Figs. 20 and 24, are mounted on each block 492, 493 and 494 in such a position that a printing and control device that will pass between opposite faces of the blocks from either position V or position VI will be prevented from tilting forwardly in its downward movement by these strips, such location of the strips being clearly shown in Fig. 24. The printing and control devices are prevented from falling rearwardly by the front face of the bar 351, as is also shown in Fig. 24, for by the time a printing and control device has moved from engagement with the front face of the bar 351 it will have passed into the drawer to which it is being returned.

The drawers into which the printing and control devices are returned have followers as 496 therein, the details of this arrangement being disclosed in U. S. Letters Patent No. 1,808,475. The first printing and control device which will be the one bearing a tab Y will pass into a drawer J intended to receive the same in front of the follower 496 therein, and the succeeding printing and control devices will pass into such drawer in front of the preceding printing and control device. When the drawers J are initially positioned in the chutes 360 and 361, the followers 496 therein are disposed in a forwardmost position and as the printing and control devices pass into the drawers to be collected therein it is necessary that the follower be forced rearwardly so that space will be provided into which the succeeding printing and control devices may pass and such rearward movement is effected by the packers to which reference has been made hereinabove and which are operated by the rod 440, these packers being similar to those described in the above referred to U. S. Letters Patent 1,299,437.

In the present instance the packer arrangement includes two packer arms 497 and 498, these being the arms that are inter-connected by the cross tie 443. Each packer arm has a knife edge as 499, Figs. 4 and 20, thereon which seats in the bottom of a V-shaped notch 500, the V-shaped notch for the knife edge on the arm 497 being provided in the periphery of a circular opening in a plate 501, Fig. 23, that is secured to and depends from the plates 347 and 349 attached to the side plate 254. The V-shaped notch for the knife edge on the arm 498 is provided in the block 494, as shown in Fig. 4. The mounting of these knife edges in these V-shaped notches provides a substantially frictionless fulcrum for the packer arms 497 and 498, this being particularly advantageous also because it reduces wear to a minimum, for the packer arms 497 and 498 are both reciprocated in every cycle of operation of the machine.

Springs as 502, Figs. 23 and 24, act on the arms 497 and 498 above the pivotal mountings therefor and these springs urge the lower ends of these packer arms forwardly, these lower ends being disposed to extend into the drawers J, mounted in the chutes 360 and 361, in the manner illustrated, for example, in Fig. 24. Inasmuch as the springs 502 so pivot the arms 497 and 498 the cross tie 443 is positively urged into engagement with the nut 442 on the forward end of the rod 440 and in this way the cross tie 443 is held in tight engagement with the nut 442.

It has been previously explained that the rear end of the rod 440 is connected to the element 445 of the universal joint 446, Fig. 11, and that the other element 448 of this joint is fixed to the upper end of an arm 449 which is pivotally mounted at 450.

A roller 503 is mounted on the arm 449 substantially midway between the ends thereof and the action of the springs 502 on the arms 497 and 498 and the cross tie 443, through medium of the rod 440, universal joint 446 and arm 449, holds this roller 503 in engagement with the periphery of a cam 504 that is fast on the shaft 301 immediately above the cam 460. Thus each time the clutch teeth 307 are engaged with the clutch teeth 305, Fig. 5, and the shaft 301 is caused to make a complete revolution, as previously described, the cam 504 acts on the roller 503 and therefore the rod 440 to impart a reciprocatory movement to this rod. The first part of this reciprocatory movement causes the cross tie 443 and therefore the packer arms 497 and 498 to be moved rearwardly in the drawers into which they respectively extend, as shown in Fig. 23, it being understood that the packer arm 497 extends into the drawer supported in the chute 361 while the packer arm 498 extends into the drawer supported in the chute 360. Hence, in the first part of each cycle of operation, the packer arms 497 and 498 move rearwardly through the drawers therein and are effective to force the followers as 496 in these drawers rearwardly. The configuration of the cam 504 is such that it permits the springs as 502 to return the packer arms 497 and 498 to their forward positions, as shown in Fig. 24, well prior to the time printing and control devices released from either the gate 433 or the gate 487 are to pass into the drawer to which such printing and control devices are to be returned. This operation of the packer arms insures that space will be afforded in the receiving drawers for printing and control devices to be returned thereto.

When printing and control devices are picked up by the pawls 285 and 286 and are fed into the printing and control device discharge chute 346, Fig. 25, these devices fall of their own weight down onto the top edge of the bar 353 and such falling is unrestrained. It may therefore be that a printing and control device in striking the top edge of the bar 353 will bounce and in so bouncing it might move in such a direction that it would interfere with a printing and control device, for example, that might at this time be falling from position V into a drawer J. In order to prevent a printing and control device passing to position IV in any way interfering with a printing and control device in position V, a gate is provided intermediate these positions and such gate includes the plate 505, Figs. 25 and 28, which is held against the adjacent face of the plate 347 by a leaf spring 506 and the block 507, Fig. 30, said block being fast to the under side of a bar 508. The bar 508 has one end thereof secured to the plate 347 and the opposite end thereof is mounted on the bracket 392. An elongated slot 509 is provided in the plate or gate 505 and the forward end of the bar 508 is fitted into this slot to afford a sliding support for the gate 505. Another slot 510 is provided in the plate 505 and an upwardly offset portion 511 on the arm 390 is passed into this slot, the forward end of the portion 511 passing through an enlarged opening 512, Fig. 25, in the plate 347.

It will be remembered that the arm 390 is rocked to move the abutment 389 into alignment with the inset edge 388 near the end of a cycle of operation to permit the plate 393 to move toward a printing and control device in position V to engage a tab Y on such a device if the device is equipped with such a tab. Thus near the end of a cycle of operation, during which time a printing and control device ejected from the anvil 264 by the pawls 285 and 286 will be passing through the discharge chute 346, the arm 390 will act through the slot 510 in the gate 505 to move the gate into the position in which it is shown in Figs. 28 and 30. When in this position the gate 505 closes the space between the plates 347 and 349 wherefore if a printing and control device passing into position IV should tend to bounce upon striking the top edge of the bar 353 it will strike against the gate 505 rather than against a printing and control device in position V and hence the gate 505 prevents a printing and control device passing into position IV from interfering with a printing and control device in position V.

The hook nose 376 on the pawl 372, Fig. 19, as has been described heretofore, picks up a printing and control device in position IV and carries such printing and control device to position V and in order to prevent a printing and control device so moved from overrunning position V, another gate or stop is provided intermediate positions V and VI, such gate including the plate 513, Figs. 3, 19 and 23, that is pivotally mounted on a stud 514 carried by the discontinuous facing plate 515, Figs. 20 and 25, that is secured to the front face of the bar 353 and which affords the front wall of positions IV, V and VI. An arm 516 extends from the gate 513 and one end of a spring 517 is fast to this arm, the other end of this spring being connected to a spring anchor 518 fast in the plate 515. The spring 517 is effective on the gate 513 to normally hold it in the position in which it is shown in Fig. 19 in which position it acts as a stop to prevent a printing and control device moved by the nose 376 from overrunning position V.

When the nose 471 on the pawl 466 moves into the position shown in Fig. 3 and thereafter engages a printing and control device in position V, the force impressed on the printing and control device by the nose 471 overcomes the tension of the spring 517 and pivots the gate 513 so as to permit the printing and control device to be moved from position V to position VI by the nose 471.

Reference has been made heretofore to movement of the arm 390 and such movement is imparted to the arm 390 through the arm 519 thereof, Fig. 28, from a link 520 which has a hook end passed into a suitable opening in the arm 519. Collars 521 and 522 are fast on the link 520, which link is supported in the block 523, Fig. 3, that is pivotally mounted at 374 on the arm 373, this also being the pivotal mounting position of the pawls 372 and 466.

In the course of reciprocation of the arm 373 the block 523 slides along the link 520 and as the arm 373 is approaching the position in which it is shown in Fig. 3 the block 523 engages the collar 521 so that just prior to the time the pawls 372 and 466 attain the positions in which they are shown in Fig. 3 the engagement of the block 523 with the collar 521 acts on the link 520 to pivot the arm 390 from the position in which it is shown in Fig. 28 into a position such that the abutment 389 is engaged with the lower edge of the arm 383. In the course of this movement the gate 505 is retracted from the position in which it is shown in Fig. 28 so that when the pawls 372 and 466 start to move from the position in which they are shown in Fig. 3 back into the position in which they are shown in Fig. 19, the printing and control device in position IV may move through the space between the plates 347 and 349, shown best in Fig. 28, into position V.

Then as the arm 373 moves from the position shown in Fig. 3 back into its at rest position shown in Fig. 19, the block 523 engages the collar 522, this engagement taking place immediately prior to the time the arm 373 attains the position in which it is shown in Fig. 19, and when the block 523 engages the collar 522 the link 520 is so moved that the arm 390 is pivoted into the position in which it is shown in Fig. 28, at which time the gate 505 is disposed in its operative position above described and the abutment 389 is disposed below the inset edge 388 for the purpose hereinabove described.

It will be remembered that the shaft 429 is moved into alternate positions to arrange parts carried thereby in such a way that the printing and control devices will pass either into a drawer J supported in the chute 361 or a drawer J supported in the chute 360. It will also be understood that the position of the shaft 429 is changed from one of its alternate positions to the other each time the first printing and control device removed from a particular drawer attains position V. It has also been explained that it is important to return printing and control devices introduced into the magazine H back into the drawer from which they are removed when they are so introduced into the magazine and it is therefore advantageous to know when the machine is to be initially placed in operation, for example, into which of the chutes 360 or 361 the drawer, from which the first of the printing and control devices introduced into the magazine were removed, is to be placed, and to this end suitable indicating means are provided which are operative to indicate whether a drawer should be introduced into the chute 360 or 361 in order that the first of the printing and control devices passing through the machine will pass into the proper drawer. Such indicating means in the present instance comprise a pair of lamps 524 and 525, Figs. 2 and 33.

As best shown in Fig. 33, when the main switch 51 is closed, circuit is closed to the line wire 526, the other line wire 527 being directly connected to a source of current. A conductor 528 leads from the line wire 526 to the movable middle blade 529 of a switch 530, Figs. 19 and 33, which includes stationary blades 531 and 532. The movable blade 529 of the switch 530, as best shown in Fig. 19, has the free end thereof passed into a collar 533 of insulating material fast on the slide rod 425, Figs. 5 and 33.

When the disc 412 is in the position shown in Fig. 5, which, as has been explained heretofore, positions the shaft 429 to cause the printing and control devices to pass into the drawer J in the chute 361 (position V, Fig. 20), the movable blade 529 of the switch 530 is engaged with the stationary blade 531 and this closes a circuit from the line wire 526 through conductor 528, blade 529, blade 531 and conductor 536 to the lamp 524, this lamp being connected to the other line wire 527 by a conductor 537. Hence, when, in the present instance, the main switch 51 is closed and, as described above, the disc 412 is in the position shown in Fig. 5, the lamp 524 will be lighted. Suitable indicia will be associated with the lamp 524 to indicate that when this lamp is lighted a drawer J is to be introduced into the chute 360 (position VI), since a new drawer should always be introduced into the position at which no printing and control devices would normally be deposited by the machine at that time, for a reason which will appear presently.

When the first of a group of printing and control devices that are to pass into a drawer disposed in the chute 361 subsequently attains position V, and the plate 393, Figs. 28 and 33, seats on the tab Y carried by said first device, the pin 395 engages a contact on the blade 396 with a contact on the blade 398 to thereby close the switch 397, and thereby circuit is closed from the line wire 526 through a conductor 540, switch 397, conductor 541 to a terminal 542 and thence through a conductor 543, winding of solenoid 399 and conductor 544 to the line wire 527, whereupon the disc 412 rotates from the position shown in Fig. 5 into the position shown in Fig. 6 and in so rotating the slide rod 425 is shifted from the position shown in Fig. 5 into the position shown in Fig. 6 and in the course of such movement of the slide rod 425 the movable blade 529 is moved from engagement with the stationary blade 531 into engagement with the stationary blade 532 and thereupon circuit is closed from line wire 526 through conductor 528, blade 529, blade 532, conductor 534 to lamp 525, this lamp being connected to the conductor 527 by the conductor 535. The printing and control device collecting mechanism is thus conditioned to pass printing and control devices into the drawer J in position VI, and thereupon the lamp 525 will be lighted and suitable indicia will preferably be associated with this lamp to indicate that the next drawer inserted into the machine should be placed in the chute 361 (position V), for when the next leading printing and control device bearing tab Y moves into position V the mechanisms under control of the positioning of the shaft 529 will be operated to cause the printing and control devices to pass into a drawer disposed in the chute 361.

As shown in Fig. 2, the lamps 524 and 525 will be disposed in position corresponding to the positioning of the chutes into which the drawer is to be inserted. For example, looking in at the front of the machine as it is viewed in Fig. 1, the lamp 524 will be arranged in a right-hand position with respect to the lamp 525 for, as explained above, when the lamp 524 is lighted a drawer J should be inserted into the right-hand chute 360, Fig. 20. Conversely when a drawer J is to be introduced into the left-hand chute 361, Fig. 20, the lamp 525 is lighted and therefore the lamp 525 is positioned in a left-hand position with respect to the location of the lamp 524. This arises by reason of the fact that the lighting of a lamp 524 or 525 corresponding to a position VI or V, respectively, indicates that the machine is not conditioned to pass printing and control devices into a drawer in such position at that time. Hence, a new drawer may be inserted to replace one already there without interfering with the collection of printing and control devices. The lighting of a lamp further indicates that the drawer at the corresponding position is filled; that is, all the printing and control devices taken from it have been returned and that this filled drawer should be removed.

Operation of the solenoid 399 may be brought about manually, if desired, by closing a switch 545, Figs. 2 and 33, this being effected by pushing down the push button 546 to engage the contacts on the blades of the switch, thereby closing circuit from line wire 526 (if the main switch 51 is closed) through conductor 547, closed switch 545, and conductor 548 to terminal 542 and thence through conductor 543, winding of solenoid 399 and conductor 544 to line wire 527.

It is desirable in some instances, in addition to operating a signalling device such as a lamp to indicate that a drawer is filled and ready for replacement, that the chute or other drawer-supporting means be automatically disposed in a position wherein the drawer may be withdrawn from the chute. To this end, and for the purpose of attaining other objects herein set forth, resort may be had to the form of apparatus illustrated in Figs. 34 to 42, inclusive. The parts of the structure disclosed in these views which correspond to parts shown in the preceding views bear reference characters which are similar to those designating the corresponding parts in the first embodiment. However, in Figs. 34 to 42 the suffix $a$ is added to such reference characters.

Referring to Fig. 34, a drawer Ja is shown supported in the chute 360a which is pivotally mounted on the frame of the machine in much the same manner as is the chute 360, Fig. 4. However, inasmuch as it is desired to automatically control the positioning of the chute 360a, suitable means for accomplishing this have been provided in the present instance. Thus, an angle plate 550, Figs. 34 and 36, is carried by the rods 359a and 368a which are passed through suitable openings in this plate, collars 551 being provided on these rods to secure the angle plate 550 against displacement. A solenoid 552 is mounted on the plate 550 above the latching bar 365a which rests on the rod 368a. The lower end of this latching bar is recessed as indicated at 367a to afford a shoulder such as 553 which normally abuts the rod 368a so that the bar 365a serves as a brace for the chute 360a to maintain this chute in its extreme clockwise position, Fig. 34, wherein the drawer Ja is adapted to receive printing and control devices which may be deposited therein. A longitudinal slot 554 is formed in the bar 365a beneath the solenoid 552 and receives a pin 555 which is passed through the bifurcated lower end of the core 556 of the solenoid 552, this bifurcated end portion straddling the bar 365a, as shown in Fig. 36. A beveled surface 557 is interposed between the shoulder 553 on the bar 365a and the lower longitudinal edge of this bar.

Hence, whenever the solenoid 552 is energized, in a manner to be explained, the lower end portion of the bar 365a is raised slightly until the cam surface 557 rests on the rod 368a and thereupon the weight of the drawer Ja and chute 360a pressing down on the latching bar 365a causes this bar to ride up over the rod 368a, as the drawer and chute swing counterclockwise as viewed in Fig. 34, about the pivot rod 359a. It has been explained hereinabove that the chute as 360a may be released by manually pressing the finger pieces as 370a and 371a together to thereby disengage the shoulder on the latching bar 365a from the rod 368a, and in the present instance such manual release or tripping of the chute may be performed whenever necessary independently of the action of the solenoid 552. In either event, the outer end of the drawer Ja descends until the chute 360a is arrested upon engagement of the arm 364a with the sleeve 354a disposed about the tie rod 239a. When the chute 360a has attained this position, which will be referred to hereinafter as its lower position, the drawer Ja may be conveniently withdrawn therefrom and a new drawer substituted in its place if desired. The chute 360a may then be restored to the position shown in Fig. 34, which will be referred to hereinafter as its upper position, by manually lifting upward on the finger piece 370a until the shoulder 553 of the latching bar 365a again engages the rod 368a. The new drawer is then in a position to receive printing and control devices ejected thereto.

It will be understood that where two drawers are employed, as shown in Fig. 1, an automatic chute-tripping means such as that including the solenoid 552, Fig. 34, may be associated with each chute as 360 and 361, Fig. 1. This enables the chutes to be automatically tripped and moved to their lower positions independently of each other, for example, in alternation, as will be described presently.

Referring now to Figs. 37 and 41, it will be observed that this form of the invention embodies various improvements in, and in some instances simplification of, the basic structure disclosed in Figs. 1 to 33, inclusive. Thus, in so far as the means for transferring printing and control devices D from the position designated IV, Fig. 19, to the positions V and VI, is concerned, the pawls 466 and 372 mounted on the lever 373 have been eliminated, and in lieu thereof the arrangement now to be described is employed. In this particular construction, the transfer lever 373a has a bifurcated end portion 558 which receives a headed pin 559 depending from a sliding shuttle 560 that is in the form of an angle plate having a depending leg portion 561 slidably mounted on the rear face of the bar 351a. As the lever 373a is reciprocated laterally, in the manner explained hereinabove with reference to the lever 373, the shuttle 560 slides back and forth between the positions IV and VI, Fig. 37.

For the purpose of engaging and transferring successive printing devices as D, Figs. 32 and 41, from position IV to position V, a plate 562 having a dog 563 thereon is pivotally mounted on the shuttle 560 as indicated at 564, Fig. 37. A pin 565 on the plate 562 extends through an enlarged circular opening 566 in the shuttle 560. A spring 567 acting on the plate 562 urges the pin 565 into engagement with the edge of the circular opening 566 in such a manner as to cause the dog 563 to project into the printing and control device guideway afforded between the facing plate 515a and the bar 351a, Fig. 41. When the shuttle 560 is in its extreme left-hand position as viewed from above, Fig. 37, the dog 563 is disposed to engage the edge of a printing and control device in the position or station IV. Then as the shuttle 560 returns to its right-hand position as shown in Fig. 37 the dog 563 moves the printing and control device from the station IV to station V. A spring-urged stop plate 513a, Figs. 37 and 41, positioned between stations V and VI, prevents the printing and control devices from overrunning position V.

A similar means is provided for moving printing and control devices from station V to station VI whenever this is to be done in the course of ejecting such devices from the machine. Thus a plate 568, Figs. 37 and 40, is pivotally mounted on the shuttle 560 and 569 and has a pin 570 extending into an enlarged opening 571 in the shuttle 560. A spring 572 acting on the plate 568 normally urges the pin 570 into engagement with an edge of the opening 571 to thereby cause a dog 573 on the plate 568 to project into the printing and control device guideway. When the shuttle 560 is in its extreme left-hand position, as viewed from above Fig. 37, the dog 573 is normally disposed slightly to the left of a printing and control device in position V. Then as the shuttle 560 advances to the right, Fig. 37, the dog 573 engages a printing and control device in position V and moves it into position VI, the stop plate 513a yielding in such circumstances to permit passage of the printing and control device.

The printing and control device guideway is defined not only by the facing plate 515a and the bar 351a but also by a bar 574 which is mounted in spaced relation above and parallel to the bar 351a. One end of the bar 574 is secured to a block 575, Figs. 37 and 38, which is attached to a bracket 352a carried by the upright 258a. The other end of the bar 574 has a threaded stud 576 which passes through an opening in the lower end of the guide plate 347a which forms part of the printing and control device discharge chute 346a, Fig. 41. A rod 577 having a central tapped opening at one end thereof is screwed to the stud 576 to clamp the bar 574 to the plate 347a, Fig. 37, the other end of the rod 577 having a reduced portion 578 which fits in a socket afforded in the other guide plate 348a. Thus, as the printing and control devices D are delivered to the discharge chute 346a by the device feeding mechanism, Figs. 3, 13 and 17, they slide down along the arcuate edges of the guide plates 347a and 348a into the space between the facing plate 515a on one side thereof and the bar 351a and rod 557 on the other, Figs. 37 and 41. The devices are then successively moved along the guideway, being guided by the bar 574, in the manner just described.

It is desirable, when the shuttle 560 is being moved to the left, Fig. 37, that the dogs 563 and 573 be maintained out of engagement with the printing and control devices during such retracting movement of the shuttle so that there will be no tendency to drag the printing and control devices back along the guideway. To this end suitable means have been provided to retract the dogs 563 and 573 out of the printing and control device guideway until the shuttle 560 has attained its left-most position, as viewed from above Fig. 37. As shown in Figs. 37 and 41, an angle bar 579 is secured to posts 580 which extend rearwardly from the bar 574. The vertical leg of the angle bar 579 carries flexible strips 581 on the rear face thereof, these strips having bent end portions 582 that extend through suitable openings in the vertical leg of the bar 579 toward the printing and control device guideway. The plates 562 and 568 are provided with pins 583 which cooperate with the end portions 582 of the strips 581 as the shuttle 560 moves to the left, Fig. 37. While the strips 581 have some flexibility, the tendency of their end portions 582 to flex is sufficiently limited so that the pins 583 are cammed rearwardly as the plates 562 and 568 move to the left with the shuttle 560, Fig. 37, and in this way the plates 562 and 568 are pivoted clockwise, Fig. 37, to retract the dogs 563 and 573 out of the printing and control device guideway.

As the shuttle 560 moves to the left, Fig. 37, the pins 583 ride along the rearward faces of the strips 581 and the depending leg of the bar 579 to thereby maintain the retracted dogs 563 and 573 in their retracted positions, and just before the completion of leftward movement of the shuttle 560 the pins 583 enter suitable openings in the bar 579 to enable the springs 567 and 572 to restore the plates 562 and 568 into their normal positions whereupon the dogs 563 and 573 project into the printing and control device guideway. Thereafter, as the shuttle 560 moves to the right, Fig. 37, the dogs 563 and 573 advance the printing and control devices along the guideway, and just before completion of such movement of the shuttle the pins 583 pass beneath the end portions 582 of the flexible strips 581. These end portions thereupon yield sufficiently to permit passage of the pins 583 and they snap back into the positions in which they are shown in Fig. 37.

As described hereinabove with reference to the drawers as J, the drawers as Ja, Fig. 34, are positioned directly beneath stations V and VI in the printing and control device guideway, and the printing devices are selectively ejected to these drawers from such stations. As shown in Figs. 37 and 41, horizontal gates 433a and 487a slidably fitted through openings in the bar 351a normally extend into engagement with the facing plate 515a to thereby define the bottom of the printing and control device guideway at positions V and VI, respectively. Each of the gates is pivotally connected to a rocker as 490a, Fig. 41, which is connected by a spring as 491a to a sliding plate 453a mounted on the rod 440a which operates the packer arms as 497a, Fig. 34. The plate 453a has extensions which are normally urged by the springs 454a and 491a into engagement with the rockers 436a and 490a, respectively, Figs. 37 and 41. Reciprocatory movement is imparted to the sliding collar 452a and plate 453a by the rod 457a, and as the plate 453a is retracted rearwardly the springs 454a and 491a tend to pull the rockers 490a to thereby retract the gates 433a and 487a out of the printing and control device guideway. When either of the gates is retracted in this manner, while a printing and control device D is resting upon it, such a device thereupon drops down between guide strips 495a into the drawer Ja, Fig. 34, positioned therebelow. The packer arms 497a are thereupon operated to pack the device D in the drawer along with the other devices that are being collected in such drawer.

It will be recalled that there will be instances in which the devices D are to be ejected from station V and not from station VI, and vice versa. When devices are to be ejected from station V, both of the gates 433a and 487a are retracted during each rearward movement of the reciprocatory plate 453a. Thus a device which is in position V drops down into its particular drawer, this taking place while the shuttle 560 is moved to the left, Fig. 37. Then, as the shuttle 560 moves to the right, the dog 573 fails to encounter a printing and control device in position V and hence no device D is fed to position VI.

On the other hand, when devices are to be ejected from position VI and not from position V, it is necessary to maintain the gate 433a closed at all times so that the dog 573 may advance devices from position V to position VI. To this end a pawl 461a, Fig. 41, is fixed to a rock shaft 584 which is journaled at one end in the side plate 255a and at its other end in a plate 585 secured to the upright block 575. The shaft 584 may assume one of two alternative positions, as will be explained, and in one of these positions of the shaft 584 the pawl 461a is so disposed as to prevent opening of the gate 433a by blocking rearward movement of the rocker 436a, causing the spring 454 to merely yield as the plate 453a is retracted. Under these conditions the printing and control device in position V is not ejected so that the dog 573 is effective on its return movement to advance this printing and control device from position V to position VI. When the device D reaches station VI it remains there until the gate 487a is opened, whereupon it drops into the drawer beneath this station. However, if the pawl 461a is in its raised position, it is ineffective to block the rocker 436a and under these circumstances the devices D are ejected from station V.

Inasmuch as one of the functions of the present apparatus is to direct groups of printing and control devices back into the drawers or other storage receptacles from which they were taken, suitable means have been provided to segregate the devices taken from the various drawers to thereby insure return of each group or series of devices to its respective drawer. Such means in the present instance includes the sensing switch 397a, Fig. 41, which is constructed and operated in a manner similar to the corresponding switch in Figs. 23 and 24. The upper and lower blades 398a and 396a of switch 397a are mounted in a block of insulation carried by the rocker 382a which is pivotally mounted on the bracket 385a. A spring 586 acting on the rocker 382a tends to maintain this rocker in raised position for separating the blades 396a and 398a of the switch 397a. An arm 587 depending from the rocker 382a is connected to a rod 588 which is acted upon by suitable cam means (not shown) in much the same manner as is the rod 457a for periodically rotating the rocker 382a counterclockwise, as viewed in Fig. 41. The lower blade 396a of the switch 397a carries a block of insulation 589 which is adapted to seat on a tab Y, Figs. 31 and 41, of a printing and control device D which is positioned at station V, Fig. 37. Engagement of the block 589 with the tab Y arrests the downward motion of the switch blade 396a to cause the contact on the blade 398a to move into engagement with the contact on the blade 396a as the rocker 382a descends. It is only the leading printing and control device D in each series thereof that is equipped with a tab as Y in position to cause closure of the switch 397a when the device D is in position V. Thus, the switch 397a is closed only once for each series of printing and control devices passing this sensing position. It is this closure of the switch 397a as each new series of devices advances through the guideway that brings about the conditioning of the apparatus for selectively directing the printing and control devices into the appropriate drawers or other storage receptacles, as will now be explained.

A ratchet relay device generally designated 590 is mounted on the side plate 585 as shown in Figs. 37, 38 and 39. This device comprises a magnet 591 and an armature 592 which is adapted to actuate a ratchet wheel 593 through a single step of rotative movement each time the magnet 591 is energized. The shaft 594 on which the ratchet wheel 593 is mounted carries two cams 595 and 596. Each of these cams has, in the present instance, four equally spaced notches and intervening lobes in its periphery. The ratchet wheel 593 has eight teeth and is given one-eighth of a turn during each actuation thereof by the armature 592 of the relay 591. This arrangement is effective to bring the high and low points of each cam 595 and 596 alternately into engagement with the means with which these cams cooperate as the ratchet is advanced in a step-by-step manner. It will be understood, of course, that a greater or less number of teeth and lobes may be utilized, provided they are so arranged to accomplish the same result.

A contact pile is mounted on but insulated from the side plate 585 and cooperates with the cam 595, as best shown in Figs. 37 and 40. This contact pile comprises three elongated blades 597, 598 and 599, each of which cooperates with two shorter contact blades respectively designated 600 and 601, 602 and 603, and 604 and 605. The blades 597, 598 and 599 are connected by insulating studs to each other and to a rider 606 cooperating with the cam 595. When the point of the rider 606 is seated in a notch of the cam 595, the blades 597, 598 and 599 are respectively engaged with the blades 600, 602 and 604 and are disengaged from the blades 601, 603 and 605. However, when the rider 606 is on a lobe of the cam 595, the contact blades 597, 598 and 599 are respectively engaged with the blades 601, 603 and 605 and are disengaged from the blades 600, 602 and 604. Thus, as the magnet 591 is repetitiously energized the rider 606 alternately seats in the notches and on the lobes of the cam 595 to thereby reverse the positions of the contacts on alternate energizations of the magnet.

The cam 596 cooperates with a roller 607 which is mounted on a stud 608 fixed on a collar 609 on the rock shaft 584, Figs. 37 and 38, a spring 610 acting upon the stud 608 to maintain the roller 607 engaged with the periphery of the cam 596. As the shaft 594 is advanced rotatively in a step-by-step manner upon repetitious energization of the magnet 591, the roller 607 alternately enters the notches or rides on the lobes of the cam 596. Each time the roller 607 is seated on a lobe of the cam 596 the shaft 584 is disposed in such a position that the pawl 461a, Fig. 41, is in position to prevent the opening of the gate 433a, Fig. 37. When the roller 607 is seated in a notch of the cam 596, the shaft 584 is rocked to elevate the pawl 461a and thereby enable the gate 433a to be opened. The arrangement is such that the roller 607 is on a lobe of the cam 596 whenever the rider 606, Fig. 40, has seated in a notch in the cam 595, and conversely, the roller 607 seats in a notch in the cam 596 whenever the rider 606 is on a lobe of the cam 595. One of the purposes of staggering the cams 595 and 596 in this manner is to minimize the mechanical load which must be handled by the magnet 591 in stepwisely rotating these cams.

The tab-sensing switch 397a, Fig. 41, is employed to operate the stepping magnet 591, Fig. 37, by causing this magnet to receive a timed impulse whenever a new series of printing and control devices commences to move into station V, Fig. 37, and also to effect other control operations, as will presently be described. Referring to Fig. 42, whenever the switch 397a is closed in response to the sensing of a tab Y on a printing and control device D in position V, a circuit is completed from the line wire 526a (assuming switch 51a is closed) through a conductor 611, the closed switch 397a, conductor 612, terminal 613, conductor 614, the winding of a relay 615, and a conductor 616 to the line wire 527a. The relay 615 has three contacts 617, 618 and 619 which are normally opened when the relay is in a deenergized condition, but upon energization of the relay 615 these contacts close. One terminal of the relay contact 617 is connected by a conductor 620 to the contact blade 599 while the other terminal of this relay contact is connected by a conductor 621 to the terminal 613. The relay contact 618 is so connected that when it closes a circuit is completed from line wire 527a through the conductor 622, relay contact 618, conductor 623, winding of magnet 591, and conductor 624 to the other line wire 526a. The magnet 591 thereupon energizes and it advances the ratchet wheel 593, shaft 594 and cams 595 and 596 one step, or one-eighth of a rotation in this instance. One terminal of the relay contact 619 is connected by a conductor 625 to the contact blade 598 while the other terminal of this relay contact is connected by the conductor 626 to one terminal of a normally open cam-operated switch 627, the other terminal of said switch being connected by the conductor 628 to the line wire 526a. The switch 627 is adapted to be periodically closed by a cam 629 in timed relation with the feeding of printing and control devices through the machine. The cam 629 may be conveniently mounted on the drive shaft 301 of the printing and control device feeding mechanism, as shown in Fig. 5, the switch 627 being supported nearby for cooperation with this cam.

Referring to Fig. 34, it will be observed that a pair of switches is mounted in association with each of the drawer-tripping solenoids as 552. Referring to the solenoid 552, for example, two normally closed switches 630 and 631 are mounted on, but insulated from, the angle plate 550 just above and slightly to one side of the latch bar 365a which rests on the rod 368a. One contact blade of each of these switches is longer than the other blade and these longer blades are interconnected by a stud of insulating material. A pin 632, Figs. 34 and 36, of insulating material is fastened to the latch bar 365a in such a manner that when the bar 365a is tripped and rides over the rod 368a following energization of the solenoid 552, the pin 632 bears against the elongated contact blade of the nearest switch 630 and causes both switches 630 and 631 to open as an incident to a chute-tripping operation. In the following description it will be assumed that the solenoid 552, chute 360a and drawer Ja shown in Fig. 34 are allocated to the station VI, Fig. 37, in the printing and control device guideway, and corresponding parts allocated to the station V are designated by similar reference characters except for the prime suffixes.

Referring again to Fig. 42, it will be noted that the contact blade 604 in the pile of spring contacts controlled by the ratchet relay device 590 is connected by a conductor 633 to one contact of the switch 630' associated with the solenoid 552' at station V, the other contact of this switch being connected by conductors 634 and 635 to the line wire 526a. The contact blade 605 is connected by a conductor 636 to one contact of the switch blade 630 associated with the solenoid 552 at station VI, the other contact of the switch 630 being connected by conductors 637 and 635 to the line wire 526a. The contact blade 602 in the pile controlled by the relay device 590 is connected by a conductor 638 to one end of the winding of the solenoid 552', the other end of this winding being connected by conductors 639 and 640 to line wire 527a. The contact blade 603 is connected by a conductor 641 to one end of the winding of the solenoid 552, the other end of which winding is connected by conductors 642 and 640 to the line wire 527a.

It will be assumed that the parts are originally positioned as shown in Figs. 37 and 42 prior to the feeding of any of the printing and control devices through the machine. The first printing and control device D to be advanced into position V, Fig. 37, will bear a tab Y, Fig. 41, and hence will cause the sensing switch 397a to close during a sensing operation thereof. Such closure of the switch 397a results in energization of the magnet 591 in the manner explained hereinabove to thereupon bring a lobe of the cam 595 beneath the point of the rider 606. This causes the contact blades 597, 598 and 599 to engage the blades 601, 603 and 605 respectively and to disengage the blades 600, 602 and 604, respectively. Relay 615, having been energized by the closure of the switch 397a, is maintaining its contacts 617, 618 and 619 closed. A holding circuit for the relay 619 is completed from line wire 526a through conductors 635 and 637, switch 630 associated with the tripping solenoid 552, conductor 636, contact blades 605 and 599, conductor 620, relay contact 617, conductors 621 and 614, winding of relay 615 and conductor 616 to line wire 527a. This holding circuit having been established, the relay 619 thereafter is held energized so long as the holding circuit remains unbroken.

When the rider 606 is on a lobe of the cam 595 the roller 607, Figs. 37 and 38, is seated in a notch of the cam 596 and therefore the pawl 461a is maintained in its elevated position. Under these circumstances the apparatus is conditioned to pass the printing and control devices D into the drawer positioned immediately below the station V, Fig. 37, because of the fact that the gate 433a is opened during each rearward stroke of the plate 453a when the pawl 461a is in its upper position. Shortly after the ratchet relay device 590 has been actuated in the manner just described to cause the rider 606 to assume a position on a lobe of the cam 595, the cam 629 momentarily closes its contact 627 and thereupon circuit is closed from line wire 526a through conductor 623, contact 627, conductor 626, contact 619 of relay 615, conductor 625, contact blades 598 and 603, conductor 641, winding of relay 552 and conductors 642 and 640 to line wire 527a. The magnet 552 is thus energized and retracts its plunger to lift the latch bar 365a, Figs. 34 and 42. Chute 360a and drawer Ja thereupon swing downwardly or counterclockwise, as viewed in Fig. 34, while the latch bar 365a rides up over the rod 368a. As the bar 365a moves longitudinally, the pin 633 engages the aligned switch blades and opens the switches 630 and 631. The effect of opening the switch 631 will be explained hereinafter. As the switch 630 opens, the aforesaid holding circuit for the relay 615 is broken and this relay promptly releases whereupon contacts 617, 618 and 619 thereof open.

Opening of relay contact 617 is without effect inasmuch as this relay contact constitutes part of the holding circuit for the relay 619, which holding circuit has already been broken at the switch 630. Opening of contact 619 prevents any further impulses from being sent to the winding of the magnet 552 by the cam switch 627 until the relay 615 is energized in a subsequent operation at a time when the contacts 598 and 603 are engaged. The opening of relay contact 618 breaks the circuit to the winding of magnet 591, and this magnet thereupon deenergizes and releases its armature 592 so that the armature is retracted into position to engage the next tooth on the ratchet wheel 593.

In the manner just explained, the magnet 552, Figs. 34 and 42, is energized to trip its latch bar 365a and thereby release the chute 360a to the action of gravity and the chute 360a thereupon descends until the depending arm 364a thereof seats on the sleeve 354a of the tie rod 239a. Such tripping of the chute 360a indicates that a drawer should be placed in this chute, or if a drawer Ja is already positioned therein that this drawer should be removed and replaced by a new drawer. When this has been done, the chute 360a may be manually returned to the position shown in Fig. 34, in which position the drawer Ja is adapted to receive any printing and control devices which may be ejected at station VI, Fig. 37. The apparatus is not conditioned to eject devices from station VI, however, until a change in series has been detected by the sensing switch 397a, Figs. 41 and 42. In the meantime, devices continue to be ejected from station V to the drawer at such station. When the chute 360a, Fig. 34, is returned to its normal or upper position, as shown in this view, the latch bar 365a rides along the rod 368a until the shoulder 553 drops into latching engagement with this rod and thereby the chute and the drawer therein are retained in the upper position thereof. As an incident to the restoration to latching position of the latch bar 365a, the pin 632 moves out of engagement with the blades of the switches 630 and 631, thereby enabling the switches to again close.

When all of the printing and control devices in a complete series thereof have been ejected from station IV, Fig. 37, the first printing and control device D of a new series moves to this station and such a device will carry a tab Y, Figs. 31 and 41, in position to bring about closure of the sensing switch 397a during a sensing operation thereof. When such a sensing operation is effected, the relay 615, Fig. 42, becomes energized to close its contacts 617, 618 and 619. Closure of the contact 618 energizes the stepping magnet 591, Figs. 37, 38, 39 and 42, which actuates its armature 592 to advance the ratchet wheel 593 in the amount of a single tooth. This brings a notch of the cam 595 beneath the point on the rider 606 and concurrently causes the roller 607 to ride up on a lobe of the cam 595. As a result of the foregoing operation the switch contact blades 597, 598 and 599 engage the contact blades 600, 602 and 604 and become disengaged from the blades 601, 603 and 605. Likewise, the pawl 461a, Figs. 37 and 41, in the cycle of operation in which the sensing of the tab Y occurs, is lowered until it is in position to block the rocker 436a and thereby prevent opening of the gate 433a at station V. The apparatus is thus conditioned to prevent printing and control devices D from being discharged at station V so that the dog 573, Fig. 37, is effective to move these devices successively to station VI where they are ejected to the drawer Ja, Fig. 34. The pawl 461a, however, does not so cause the gate 433a to be retained in closed position until the last printing and control device in the series preceding that led by the device bearing the sensed tab Y, and this insures discharge of the last device of the series into its proper drawer.

As the relay 615 upon energization thereof, as aforesaid, closes its contact 617 a holding circuit is established for this relay in a manner similar to that described hereinabove, except that this holding circuit now extends through the blades 599 and 604 of the contact pile controlled by the ratchet relay device 590, thence through conductor 633, switch 630' associated with the tripping magnet 552' at station V, and conductors 634 and 635 to the line wire 526a. Closure of the relay contact 619 conditions circuit to the winding of the magnet 552' so that when cam 629 closes the switch 627 a circuit is completed from line wire 526a through conductor 628, switch 627, conductor 626, relay contact 619, conductor 625, contact blades 598 and 602, conductor 638, winding of magnet 552' and conductors 639 and 640 to the line wire 527a. The magnet 552' thereupon energizes and trips the chute at station V, causing this chute and the drawer carried thereby to move to their lower positions in which the drawer may be withdrawn from the chute. As an incident to this operation the pin 632' on the latch bar 365a' opens the switches 630' and 631'. As switch 630' opens it breaks the holding circuit for relay 615, causing this relay to release with the effects described hereinabove. The drawer at station V may then be removed and a new drawer inserted in its stead, whereupon the chute and drawer may be returned to their upper or device-receiving positions.

It will thus be seen from the foregoing that the apparatus is selectively conditioned upon the sensing of control indicia such as tabs Y, Fig. 41, on the leading printing and control devices D of the successive groups or series thereof to cause such devices to be selectively ejected from the stations V and VI, Fig. 37.

This is accomplished in such a manner that one group of devices may be ejected from station VI and the following group or series from station V, or vice versa, the point at which the devices are ejected alternating back and forth between the stations V and VI, as each group or series passes through the machine. As an incident to a group change, the drawer into which the devices of the last group preceding the change have been delivered is automatically brought into a position in which it may be conveniently withdrawn from the drawer chute, and a new drawer substituted therefor. Thus the operator of the machine is apprised of the fact that a drawer has been filled; that is, that all of the devices which were taken from this drawer have been returned to it, and thereupon the aforesaid substitution of drawers may be effected while the devices are being ejected to the drawer at the other station. Hence, no interference with or interruption of the device-feeding operations is occasioned by the removal or replacement of a drawer.

For the purpose of further indicating the condition of the drawers at the several ejecting stations, indicating devices such as lamps 524a and 525a similar to the lamps 524 and 525, Fig. 2, may be employed. The lamp 524a is mounted in association with the ejecting station VI while the lamp 525a is similarly mounted in association with the ejecting station VI. It will be recalled that when the rider 606 of the ratchet relay device 590 is seated in a notch of the cam 595 the apparatus is conditioned to eject printing and control devices from station VI. Under these circumstances a circuit is completed from line wire 636a through a conductor 644 to the movable contact blade 597, thence through blade 600, conductor 645, lamp 525a, and conductor 646 to the line wire 527a. The lamp 525a thus lights to indicate that devices are not being ejected at station V and that the drawer at this station may be removed and replaced by a new drawer, or if the run of printing and control devices has not yet started to pass through the machine, the lighting of the lamp 525a indicates that the first drawer should be placed at station V since the devices in the first series to be fed will be ejected from this station. Similarly, when the ratchet relay device 590 is actuated to cause the rider 606 to ride on the lobe of the cam 595, at which time the apparatus is conditioned to eject devices from station V, a circuit is completed from line wire 526a through conductor 644, contact blades 597 and 601, conductor 647, lamp 524a and conductors 648 and 646 to the line wire 527a. Under these circumstances the lamp 524a lights to indicate that a new drawer may be inserted at station VI.

It will be recalled that the function of the dog 573, Fig. 37, on the sliding shuttle 560 is to advance printing and control devices from station V to station VI. However, if the devices are to be ejected from station V, the dog 573 will be ineffective because the apparatus is so timed in its operation that under these conditions the device at station V will be, or should be, ejected to the drawer at such station prior to the time the shuttle 560 commences its advancing movement to the right, Fig. 37. However, it may happen that a device is not fully ejected at such time and if the dog 573 were to engage the edge of such a device at station V while a portion of this device was still extending up into the printing and control device guideway, the apparatus would very likely jam and damage might result. In order to guard against such a contingency means have been provided to cause the dog 573 to be held retracted out of the printing and control device guideway during the time it is passing the ejecting station V, whenever the apparatus is conditioned to eject devices from this station. To this end a spring-urged latch 650, Figs. 37 and 41, is pivotally mounted on the shuttle 560 adjacent the plate 568 on which the dog 573 is formed. The hook nose of this latch 560 is adapted to engage a lug 651 on the plate 568 when this plate has been cammed rearwardly by the strip 582 in the course of movement of the shuttle 560 to the left as it is viewed in Fig. 37. The latch 650 is therefore normally effective to maintain the dog 573 retracted out of the printing and control device guideway during the time that this dog is ineffectively moving back and forth past the station V.

When the apparatus is conditioned to eject printing and control devices from station VI, the situation is different for then the dog 573 should be released toward the end of the advancing movement of the shuttle 560 to the left, as viewed in Fig. 37, so that it may perform the function of advancing the printing and control device at station V to station VI. Therefore, means are provided to release the plate 568 carrying the dog 573 under these circumstances. Thus an arm 652, Figs. 37 and 41, is secured to the rock shaft 584 in such a manner that whenever the roller 607 is on the high point of the cam 596, Fig. 38, the arm 652 is positioned in alignment with the tail of the latch 650. This will be the case when the apparatus is conditioned to eject devices from station VI and hence when the shuttle 560 nears the end of its movement to the left as viewed in Fig. 37, the tail of the latch 650 strikes the arm 652 and the latch 650 is pivoted to release the plate 568. Thereupon the spring 572 restores the plate 568 into a position in which the dog 563 projects into the printing and control device guideway. However, if the apparatus is to eject devices from station V, the rock shaft 584 is then so positioned that the arm 652 cannot engage the tail of the latch 650 and therefore the dog 573 is held retracted by the latch 650 so that it cannot engage a printing and control device which is being tardily ejected from station V.

As explained in greater detail in my aforesaid co-pending application Serial No. 221,841, the machine in which the apparatus constituting the present invention is particularly adapted to be utilized comprises a number of units such as, for example, the mechanism for feeding and severing the web W, Figs. 1 and 2, the sheet feeding means, a means such as the multiplying mechanism M for recording variable data upon the sheets fed through the machine, a printing mechanism including the platen P, a form printing unit U, and other kindred and associated mechanisms and devices. These various machine units are all adapted to be controlled by a single governing means which determines the relative times at which the various operations are performed by the machine. Such governing means in the present instance includes a series of timing cams generally designated 655, Fig. 2, mounted upon a cam shaft 656 that is adapted to be coupled to the drive shaft of the form-printing unit U through the medium of a clutch mechanism 657 which is preferably of the character disclosed in my co-pending application Serial No. 239,563, filed November 8, 1938, now issued as Letters Patent No. 2,265,134, patented December 9, 1941. A solenoid 658 operates when energized to cause the clutch 657 to be engaged for coupling the cam shaft 656 to the aforesaid drive shaft, the arrangement being such that the cam shaft 656 commences to rotate when the printing drum of the unit U has attained a predetermined angular position. Thereupon the cams 655 operate to sequentially close certain switches to thereby energize the various clutch solenoids such as 310, Fig. 4, at predetermined times in the cycle of operation of the machine. As explained hereinabove, the energization of the solenoid 310, for example, causes the clutch on the shaft 301, Fig. 5, to become engaged to send the shaft 301 through a complete cycle of rotation and thereby actuate the printing and control device feeding mechanism for advancing printing and control devices from the magazine H and along the printing and control device guideway. In like manner, the clutches for the other units of the machine are engaged at proper times to bring about cyclic operation of their respective machine units.

In order to initiate or terminate automatic operation of the machine, a push button generally designated S, Figs. 2 and 42, is mounted on the control panel of the machine and is arranged to cooperate with a pair of switches 659 and 660. The switch 659 is normally open but may be closed by depressing a central plunger 661 of the push button S. The switch 660 is normally closed but may be opened by depressing the shell 662 of the push button S. One blade of the switch 659 is connected by a conductor 663 to one end of the winding of a relay 664, and also to one terminal of a normally open contact 665 of this relay, and the other end of the winding of this relay is connected by a conductor 666 to the line wire 526a. The other terminal of the relay contact 665 is connected by the conductor 667 to one blade of each of the switches 659 and 660 in common, so that the contact 665 is connected in parallel with the switch 659. The other blade of the switch 660 is connected by the conductor 668 to one terminal of a switch 669, the function of which will be explained presently. The relay 664 has a second normally open contact 670 which is connected on one side to the line wire 526a and on its other side to one end of the winding of the clutch solenoid 658, the other end of this winding being connected to the line wire 527a.

Reference has been made hereinabove to certain safety control features which have been incorporated in the present apparatus. For example, there may be instances in which the transfer lever 373, Fig. 19, or 373a, Fig. 37, fails to return to its normal at rest position at the end of the stroke in which it is adapted to advance printing and control devices D away from the discharge station IV and toward the ejecting stations V and VI. Such a contingency may arise, for example, due to jamming of the printing and control devices and in such an instance it is desirable to prevent the machine from feeding any more printing and control devices until the detrimental condition has been remedied. To this end a switch as 669, Fig. 42, may be mounted in position to be closed by the transfer lever as 373, Figs. 3 and 19, only when this lever is in its normal at rest position. Such a switch could also be similarly arranged to be closed by the shuttle 560 or lever 373a, Fig. 37. One blade of the switch 669 is connected to the conductor 668, Fig. 42, as previously explained, while the other blade of this switch is connected by the conductor 672 to another conductor 673.

Another switch 674 is electrically connected in parallel with the switch 669 between the conductors 668 and 673, and this switch 674 is arranged to be operated by a cam 675 which is preferably mounted on the drive shaft 301 of the printing and control device feeding mechanism, Fig. 5. However, if desired, this cam could also be located on the timing cam shaft 656, Fig. 2. The switch 674 is normally in closed position but is periodically opened when a lobe on the cam 675 engages an abutment 676 on the switch 674. The switch 674 is only opened at a time when the switch 669 should be closed by the transfer lever as 373 in the normal operation of the machine. Thus an electrical connection is continuously maintained between the conductors 668 and 673 if the machine is operating in a normal manner. However, if the lever as 373 fails to return to its normal at rest position in time to close the switch 669 at the time the cam 675 opens the switch 674, circuit between conductors 668 and 673 is broken with an effect to be described presently.

It has also been mentioned hereinabove that it is desirable to detect an overloaded condition of any one of the drawers as Ja, Fig. 34. Hence each chute as 360a has mounted at the rear end thereof a small housing 680 which supports a switch 681, Figs. 34 and 35. The drawers as Ja in which the printing and control devices are deposited after being ejected by the machine are cut away at the rear ends thereof and each drawer is provided with a follower as 496, Fig. 4, which is progressively moved toward the rear of the drawer as the packer arms as 498 pack the successively fed printing and control devices D into the drawers. The number of printing and control devices introduced into a single drawer should never be sufficient to cause the follower 496 to be pushed to the rearward extremity of the drawer. However, there are some circumstances under which a drawer may become inadvertently filled to capacity with the printing and control devices. This would occur in the event of improper operation of the means for selectively switching the line of flow of the printing and control devices from one drawer to another when a complete series has been deposited in the one drawer. Moreover, the operator may be careless or inexperienced and fail to observe when a drawer has become filled so that this drawer remains in position to receive printing and control devices until the apparatus has again become conditioned to pass devices into that drawer. This may occur when the operator fails to note a change in the lighting of the signal lamps as 524 and 525, Fig. 2, or even in the event an automatic drawer tripping device is provided, as shown in Fig. 34, the operator may inadvertently return the chute and drawer to their upper positions without substituting an empty drawer for the filled drawer.

The housing 680 of each of the switches as 631, Fig. 34, supports a spring-urged pin 682 which is slidably mounted therein and which extends for a short distance into the drawer as Ja from the rear end thereof. The switch 681 is normally closed but when a follower as 496, Fig. 4, in the drawer Ja approaches too closely to the end of the drawer, it engages the pin 682 and pushes the pin against the switch 681 and thereby causes the switch to open. Referring now to Fig. 42, it will be seen that the various switches as 681 and 681' associated with the drawer chutes are electrically connected in series with each other and constitute a series path between the aforesaid conductor 673 and another conductor 683. Hence if either of the drawer overload switches 681 or 681' is opened, the electrical connection between the conductors 673 and 683 is broken, with an effect to be described.

Another unsafe condition which may arise is that more than one of the drawer chutes as 360a, Fig. 34, may be concurrently in the lower or drawer-removing position. This again may arise from the carelessness of the operator in failing to make the necessary replacements of drawers which have become filled or it may occur in a number of other ways. In any event it is undesirable to have more than one chute as 360a in drawer-removing position at the same time during normal operation of the machine. Hence means have been provided which become operative to effect a controlling action whenever one drawer chute is tripped while the other chute is in its lower position. Reference has previously been made to normally closed switches as 631 and 631', Figs. 34 and 42, associated with the automatic chute or drawer tripping means at the respective ejecting stations V and VI. These switches open whenever a chute as 360a assumes its lower position. As shown in Fig. 42, the switches 631 and 631' are electrically connected in parallel between the conductor 683 and another conductor 684, the latter conductor being connected to the line wire 527a. Electrical connection between the conductors 683 and 684 can only exist when at least one of the switches 631 and 631' is closed, and conversely this electrical connection is broken if both of these switches are concurrently in open position.

The just described arrangements for preventing inadvertent or improper operation of the machine are effective when the machine is being operated automatically. Thus, when automatic operation of the machine is to be initiated, the plunger 661 of the push button S, Fig. 42, is momentarily depressed to close the switch 659. Thereupon a circuit is completed from the line wire 526a through conductor 666, winding of relay 664, conductor 663, switches 659 and 660 in series, conductor 668, either or both of the switches 669 and 674, conductors 673, switches 681' and 681 in series, conductor 683, either or both of the switches 631 and 631', and conductor 684 to the line wire 527a. Relay 664 thereupon energizes and closes its contacts 665 and 670. Closure of the contact 670 establishes a circuit through the winding of the solenoid 658 to thereby energize this solenoid and cause the clutch 657 to couple the timing cam shaft 656 to the drive shaft of the form printing unit U. Automatic operation of the machine is thereupon initiated and continues so long as the solenoid 658 is maintained energized.

Closure of the contact 665 of relay 664, Fig. 42, establishes a holding circuit from the line wire 526a through conductor 666, winding of the relay 664, relay contact 665, conductor 667, switch 660, and thence through the just-traced circuit path including the switches 669, 674, 681', 681, 631 and 631' to the line wire 527a. So long as this holding circuit remains unbroken, the relay 664 remains energized and maintains its contact 670 closed. However, if this holding circuit is broken upon the occurrence of any of the unsafe conditions to which reference has been made, the relay 664 deenergizes to open its contact 670, thereby deenergizing the solenoid 658 and interrupting automatic operation of the machine, which includes interruption in the feeding of the printing and control devices through the machine, until the undesirable condition is corrected. Moreover, the machine is prevented from being inadvertently started again while the faulty condition remains uncorrected, since the starting switch S is incapable of completing a circuit through the winding of relay 664 under these circumstances.

Thus, if the transfer lever as 373, Fig. 19, or 373a, Fig. 37, fails to operate in timed relation with the normal feeding of the printing and control devices through the machine, then the switch 669, Figs. 19 and 42, may be opened at the time the cam 675, Figs. 5 and 42, opens the switch 674. Then again one of the drawers as Ja, Fig. 34, may become overloaded and cause its safety switch as 681 to open. Another possibility is that both of the chutes as 360a may be concurrently in their lower positions causing both of the switches 631 and 631', Fig. 42, to be opened.

In each of these instances the holding circuit for the relay 664 is broken with the result aforesaid. Thus it will be seen that safe operation of the machine is insured by the provision of such safety control devices.

Since there may be instances in which it is desired to manually effect a drawer-tripping operation at a particular ejecting station, and as an incident thereto condition the machine for delivering devices to a drawer at another ejecting station, the manually operable switch 545a, Fig. 42, is provided. This switch may be closed by momentarily depressing the push button 546a, whereupon a circuit is established from line wire 526a through a conductor 690, switch 545a and conductor 691 to the terminal 613, from whence the circuit continues through the conductor 614, winding of relay 615 and conductor 616 to line wire 527a. Relay 615 thereupon energizes and is locked up through its holding circuit, and a circuit is closed through the contact 618 of relay 615 to the winding of the stepping magnet 591. The magnet 591 energizes and advances the ratchet wheel 593 and cams 595 and 596, Figs. 37, 38 and 42, a single step rotatively, for the purposes described hereinabove. Thereafter the cam 629 closes the timing switch 627 and completes a circuit through the contact 619 of relay 615 to the winding of the selected chute-tripping magnet 552 or 552'. Subsequently the relay 615 is released as an incident to the operation of the chute-tripping mechanism, and operation of the machine thereafter continues.

It is possible, of course, that the manual switch 545a may be closed at the exact instant when the cam 629 is maintaining the timing switch 627 closed. Under such circumstances it is contemplated that the stepping magnet 591 will act more quickly than either of the tripping magnets 552 and 552', following energization of the relay 615, and hence the ratchet relay device 590 will have time to operate before either of the drawers is tripped. To further insure this timed relation in the operations of the magnets 552, 552' and 591, the contacts 618 and 619 of the relay 615 may be arranged to close sequentially, so that the cam switch 627 may be required to close a second time under the just referred to condition in order to bring about a drawer-tripping operation, the relay 615 meanwhile remaining locked up through its holding circuit until a drawer has been tripped.

It will be apparent from the foregoing that the present invention materially facilitates the collection of printing and control or like devices after they have been utilized in a printing or like machine. The primary advantage afforded by this apparatus is that the contents of several drawers or other printing and control or like device containers may be introduced into the magazine of a machine to be sequentially utilized by the machine, and then these devices are returned directly to the drawers or containers from which they were taken.

Another advantage of the present invention is that the devices, after being discharged from the final position at which they are utilized by the machine, are advanced in a direction transverse to the direction of their previous advancing movement to the position at which they are ejected to the selected drawers or containers, whereby such drawers or containers may be disposed in readily accessible positions in the machine.

The drawer selection apparatus disclosed herein insures that each series of printing and control devices will be directed back into the appropriate drawer. When a new series of devices advances toward the ejecting stations, a detecting means senses the presence of a control indicium such as a tab on the leading device of the series, and conditions the apparatus to direct these devices into a drawer other than the drawer into which the devices of the preceding series are deposited. It is of course evident that such control of the drawer selection apparatus could be equally well effected by rendering the detecting means responsive to an indicium on the training device of the leading series without departing from the ambit of the present invention.

Moreover, indicating means such as lamps are provided in the machine to afford a visible signal apprising the operator as to the condition of the machine in so far as the selection of drawers is concerned. Thus, in the present form of the invention, the lighting of a lamp above a particular chute prior to the start of operation of the machine indicates that the apparatus will operate to direct the first series of devices utilized to the machine into a drawer at such position. Hence, the drawer from which the first series of devices is taken should be inserted in this chute, and the second drawer placed in the other chute. As the devices pass to the first drawer, the first lamp is extinguished and the lamp above the second chute lights to indicate that the next series of devices to come through will be deposited in the drawer at this second position. Then, when the first drawer has been filled and the second series of printing and control devices is about to be fed into the second drawer, the lamp above the first drawer again flashes on, while the second lamp is extinguished, to thereby indicate that the first drawer should be withdrawn and replaced by a third drawer. When the second drawer is filled and the apparatus deposits devices in the third drawer (which is positioned in the first chute), the second lamp flashes on to signal the operator that it is time to substitute a fourth drawer for the second drawer, and so on.

In addition to affording a visual indication of the condition of a drawer, as just described, the last described form of my invention herein disclosed embodies means for automatically tripping each chute and disposing it in a drawer-removing position when the drawer contained in such chute has become filled (that is, when all the devices which were taken from this drawer have been returned to it). In the event that the operator is careless or is absent and fails to observe when both drawers have become filled, certain safety devices become operative when both chutes are concurrently in drawer-removing position and thereupon interrupt the operation of the machine. Additional safety features have been incorporated in the structure to detect overloading of any of the drawers, or jamming of the mechanism for transferring the printing and control devices from the discharge chute to the ejecting stations, and to control operation of the machine in dependence upon the occurrence of such contingencies.

It should be noted that although I have particularly illustrated and described the device collecting means as constituting a two-drawer system, it is obviously capable of modification to accommodate a larger number of drawers. Likewise, there are certain novel features which may be employed to advantage in the case of single-drawer collectors. It is also to be noted that while I have referred to the devices D herein as being printing and control devices, such devices could well be what are commonly known in the art as printing devices and these devices could bear either stencil printing means or embossed type characters or the devices could be of other form and constitute, for example, only control rather than printing means or both printing and control means.

Thus while I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. In a machine through which printing or like devices arranged in groups by having a group designating means included on one device in each group are advanced seriatim to at least one station in the machine whereat at least one operation is performed on or under control of the device at each station and wherein the groups of devices are sequentially advanced through the machine, discharge means into which the devices are advanced after passage thereof through a station such as the aforesaid in the machine, at least two positions in the machine arranged in spaced relation one with the other and with the discharge means and to which the devices may be passed from the discharge means, means for effecting the passage of the devices from the discharge means to said positions, sensing means for sensing the group designating means of such devices, and means governed by said sensing means and operative in response to repeated and like sensing operations of said sensing means to so actuate the means for effecting passage of the devices to said positions that the devices in one group thereof pass to one of said positions and the devices in the succeeding group thereof pass to another of said positions whereby the groups of devices are collected together at the respective positions to which they are passed after passage thereof from the discharge means.

2. In a machine through which printing or like devices arranged in groups by having a group designating means included on one device in each group are advanced seriatim to one station in the machine whereat at least one operation is performed on or under control of the device at each station and wherein the groups of devices are sequentially advanced through the machine, discharge means into which the devices are advanced after passage thereof through a station such as the aforesaid in the machine, at least two supports in the machine arranged in spaced relation one with the other and with the discharge means and on which a storage receptacle for the devices may be removably disposed, means for effecting passage of the devices from said discharge means into said receptacles, sensing means for sensing the group designating means of such devices, and means governed by said sensing means and operative in response to repeated and like sensing operations of said sensing means to so actuate the means for effecting passage of the devices to said receptacles that the devices in one group thereof pass into one of the receptacles and the devices in a succeeding group thereof pass into another of said receptacles.

3. In a machine through which printing or like devices arranged in groups by having a group designating means included on one device in each group are advanced seriatim to at least one station in the machine whereat at least one operation is performed on or under control of the device at each station and wherein the groups of devices are sequentially advanced through the machine, discharge means into which the devices are advanced after passage thereof through a station such as the aforesaid in the machine, at least two supports in the machine arranged in spaced relation one with the other and the discharge means and on each of which a storage receptacle for a group of devices may be removably disposed, means for effecting passage of the device from said discharge means into receptacles disposed on said support, sensing means for sensing the group designating means of such devices, when said supports and the receptacles thereon are disposed in the operative positions thereof, and means governed by said sensing means and operative in response to repeated and like sensing operations of said sensing means to so actuate the means for effecting passage of the devices to said receptacles that the devices in one group thereof pass into one of the receptacles and the devices in a succeeding group thereof pass into another of the receptacles whereby a group of devices is collected in each of the receptacles.

4. In a machine through which printing or like devices arranged in groups by having a group designating means included on one device in each group are advanced seriatim to at least one station in the machine whereat at least one operation is performed on or under control of the device at each station and wherein the groups of devices are sequentially advanced through the machine, a discharge member into which the devices are advanced after passage thereof through a station such as the aforesaid in the machine, at least two positions in the machine arranged in spaced relation one with the other and the discharge member and to which the devices may be passed after movement thereof into said discharge member, track means along which the devices may advance from the discharge member to position to pass to said positions, means for effecting passage of the devices along said track means from said discharge member and into said positions, sensing means for sensing the group designating means of such devices, and means governed by said sensing means and operative in response to repeated and like sensing operations of said sensing means to so actuate the means for effecting passage of the devices along said track means and into said positions that the devices in one group thereof pass to one of said positions and the devices in a succeeding group thereof pass to another of said positions.

5. In a machine through which printing or like devices arranged in groups by having a group designated means included on one device in each group are advanced seriatim to at least one station in the machine whereat at least one operation is performed on or under control of the device at each station and wherein the groups of devices are sequentially advanced through the machine, a member into which the devices are advanced after passage thereof through a station such as the aforesaid in the machine, at least two supports in the machine arranged in spaced relation one with the other and the discharge member and on each of which a storage receptacle may be removably disposed, track means along which the devices may advance from the discharge member to position to pass into receptacles disposed on said supports, means for effecting the passage of the devices along said track means from said discharge member and into said receptacles, sensing means for sensing the group designating means of such devices, and means governed by said sensing means and operative in response to repeated and like sensing operations of said sensing means to so actuate the means for effecting passage of the devices along said track means and into said receptacles that the devices in one group thereof pass into one of the receptacles and the devices in a succeeding group thereof pass into another of said receptacles.

6. In a machine through which printing or like devices arranged in groups by having a group designating means included on one device in each group are advanced seriatim to at least one station in the machine whereat at least one operation is performed on or under control of the device at each station and wherein the groups of devices are sequentially advanced through the machine, a discharge member into which the devices are advanced after passage thereof through a station such as the aforesaid in the machine, at least two positions in the machine arranged in spaced relation one with the other and the discharge member and to which the devices may be passed after movement thereof into said discharge member, track means along which the devices may advance from the discharge member to position to pass to said positions, means for advancing the devices along said track means from said discharge member and into position to pass to said positions, means for controlling the passage of said devices from said track means to said positions, sensing means for sensing the group designating means of such devices, and means governed by said sensing means and operative in response to repeated and like sensing operations of said sensing means to so actuate the controlling means that the devices in one group thereof advanced by the advancing means pass to one of said positions and the devices in a succeeding group thereof pass to another of said positions.

7. In a machine through which printing or like devices arranged in groups by having a group designating means included on one device in each group are advanced seriatim to at least one station in the machine whereby at least one operation is performed on or under control of the device at each station and wherein the groups of devices are sequentially advanced through the machine, a member into which the devices are advanced after passage thereof through a station such as the aforesaid in the machine, at least two supports in the machine arranged in spaced relation one with the other and the discharge member and on each of which a storage receptacle may be removably disposed, track means along which the devices may advance from the discharge member to position to pass into receptacles disposed on said supports, means for advancing the printing devices from the discharge member to positions to pass into said receptacles, means for controlling the passage of said devices from the track means to said receptacles, sensing means for sensing the group designating means of such devices, and means governed by said sensing means and operative in response to repeated and like sensing operations of said sensing means to so actuate the controlling means that the devices in one group thereof advanced by the advancing means pass into one of said receptacles and the devices in a succeeding group thereof pass into another of said receptacles.

8. In a machine through which printing or like devices arranged in groups by having a group designating means included on one device in each group are advanced seriatim to at least one station in the machine whereat at least one operation is performed on or under control of the device at each station and wherein the groups of devices are sequentially advanced through the machine, a discharge member into which the devices are advanced after passage thereof through a station such as the aforesaid in the machine, at least two positions in the machine arranged in spaced relation one with the other and the discharge member and to which the devices may be passed after movement thereof into said discharge member, track means along which the devices may advance from the discharge member to position to pass to said positions, means for advancing the devices along said track means from said discharge member and into position to pass to said positions, means in said track means and on which said devices come to rest after advancing thereof by said advancing means and prior to passage thereof to said positions, sensing means operable to sense the group designating means of such devices, and means governed by said sensing means and operative in response to repeated and like sensing operations of said sensing means to so actuate the means on which the devices come to rest that the devices in one group thereof pass to one of said positions and the devices in a succeeding group thereof pass to another of said positions.

9. In a machine through which printing or like devices arranged in groups by having a group designating means included on one device in each group are advanced seriatim to at least one station in the machine whereby at least one operation is performed on or under control of the device at each station and wherein the group of devices are sequentially advanced through the machine, a member into which the devices are advanced after passage thereof through a station such as the aforesaid in the machine, at least two supports in the machine arranged in spaced relation one with the other and the discharge member and on each of which a storage receptacle may be removably disposed, track means along which the devices may advance from the discharge member to position to pass into receptacles disposed on said supports, means for advancing the printing devices from the discharge member to positions to pass into said receptacles, means in said track means and on which said devices come to rest after advancing thereof by said advancing means and prior to passage thereof into said receptacles, sensing means operable to sense the group designating means of such devices, and means governed by said sensing means and operative in response to repeated and like sensing operations of successive group designating means by said sensing means to so actuate the means on which the devices come to rest that the devices in one group thereof pass into one of said receptacles and the devices in the succeeding group thereof pass into another of said receptacles.

10. In a machine through which printing or like devices arranged in groups by having a group designating means included on one device in each group are advanced seriatim to at least one station in the machine whereat at least one operation is performed on or under control of the device at each station and wherein the groups of devices are sequentially advanced through the machine, a discharge member into which the devices are advanced after passage thereof through a station such as the aforesaid in the machine, at least two positions in the machine arranged in spaced relation one with the other and the discharge member and to which the devices may be passed after movement thereof into said discharge member, track means along which the devices may advance from the discharge member to position to pass to said positions, means for advancing the devices along said track means from said discharge member and into position to pass to said positions, means in said track means and on which said devices, after advancing thereof by said advancing means and prior to passage thereof to said positions, come to rest, means for repetitiously withdrawing each of the means on which the devices come to rest as aforesaid, means for selectively retaining one of the means on which the devices come to rest in position to prevent a device resting thereon from passing to the position with which such means is associated, sensing means operable to sense the group designating means of such devices, and means governed by said sensing means and operative in response to repeated and like sensing operations of said sensing means upon successive group designating means of such devices to so actuate the means effective to retain the means on which the devices come to rest in the aforesaid position that the devices in one group thereof pass into one of said positions and the devices in the succeeding group thereof pass to another of said positions.

11. In a machine through which printing or like devices arranged in groups by having a group designating means included on one device in each group are advanced seriatim to at least one station in the machine whereby at least one operation is performed on or under control of the device at each station and wherein the groups of devices are sequentially advanced through the machine, a member into which the devices are advanced after passage thereof through a station such as the aforesaid in the machine, at least two supports in the machine arranged in spaced relation one with the other and the discharge member and on each of which a storage receptacle may be removably disposed, track means along which the devices may advance from the discharge member to position to pass into receptacles disposed on said supports, means for advancing the printing devices from the discharge member to positions to pass into said receptacles, means in said track means and on which said devices come to rest after advancing thereof by said advancing means and prior to passage thereof into said receptacles, means for repetitiously withdrawing each of the means on which the devices come to rest as aforesaid, means for retaining one of the means on which the devices come to rest in position to prevent a device resting thereon from passing into the receptacle with which such means is associated, sensing means operable to sense the group designating means of such devices, and means governed by said sensing means and operative in response to repeated and like sensing operations of said sensing means upon succesive group designating means to so actuate the means effective to retain the means on which the devices come to rest in the aforesaid position that the devices in one group thereof pass into one of said receptacles and the devices in the succeeding group thereof pass into another of said receptacles.

12. In a machine through which printing or like devices arranged in groups by having a group designating means included on one device in each group are advanced seriatim to at least one station in the machine whereat at least one operation is performed on or under control of the device at such station and wherein the groups of devices are sequentially advanced through the machine, discharge means into which the devices are advanced after passage thereof through a station such as the aforesaid in the machine, at least two positions in the machine arranged in spaced relation one with the other and the discharge means and to which the devices may be passed after movement thereof into the discharge means, means for effecting passage of the devices from said discharge means into said positions, sensing means operable to sense the group designating means of such devices, and means governed by said sensing means of a group of devices and operative in response to repeated and like sensing operations of said sensing means upon successive group designating means to so actuate the means for effecting passage of the devices to said positions that all of the devices in one group pass to one of said positions and continue to so pass until said means is governed by the group designating means of a succeeding group of devices whereby the devices in such succeeding group of devices pass to another of said positions and until said means is governed by the group designating means of yet another succeeding group of devices.

13. In a machine through which printing or like devices arranged in groups by having a group designating means included on one device in each group are advanced seriatim to at least one station in the machine whereat at least one operation is performed on or under control of the device at such station and wherein the groups of devices are sequentially advanced through the machine, discharge means into which the devices are advanced after passage thereof through a station such as the aforesaid in the machine, at least two supports in the machine arranged in spaced relation one with the other and the discharge means and on each of which a storage receptacle for a group of the devices may be removably disposed, means for effecting passage of the devices from said discharge means into said receptacles, sensing means operable to sense the group designating means of such devices, and means governed by said sensing means of a group of devices and operative in response to repeated and like sensing operations of said sensing means upon successive group designating means to so actuate the means for effecting passage of the devices to said receptacles that all of the devices in one group pass into one of said receptacles and continue to so pass until said means is governed by the group designating means of a succeeding group of devices whereby the devices in such succeeding group of devices pass to another of said receptacles and until said means is governed by the group designating means of yet another succeeding group of devices.

14. In a machine through which printing or like devices arranged in groups by having a group designating means included on one device in each group are advanced seriatim to at least one station in the machine whereat at least one operation is performed on or under control of the device at such station and wherein the groups of devices are sequentially advanced through the machine, a discharge member into which said devices are advanced after passage thereof through a station such as the aforesaid in the machine, at least two positions in the machine arranged in spaced relation one with the other and with said discharge member and to each of which groups of devices may be passed, means for directing the devices selectively to one or the other of said positions, sensing means operable to sense the group designating means of such devices, and means governed by said sensing means upon sensing of a group designating means on a device in one of said groups to render said directing means effective to direct all of the devices of the group in which the device bearing the designating means is included to one of said positions and also governed by said sensing means in response to the similar sensing of the designating means on a device in a succeeding group of devices to direct all of the devices in a succeeding group of devices to another of said positions.

15. In a machine through which printing or like devices arranged in groups by having a group designating means included on one device in each group are advanced seriatim to at least one station in the machine whereat at least one operation is performed on or under control of the device at such station and wherein the groups of devices are sequentially advanced through the machine, a discharge member into which said devices are advanced after passage thereof through a station such as the aforesaid in the machine, a discharge member into which said devices are advanced after passage thereof through such a position in the machine, at least two supports in the machine arranged in spaced relation one with the other and with said discharge member and on each of which a storage receptacle for the devices may be removably disposed, means for directing the devices selectively into one or the other of the storage receptacles, sensing means operable to sense the group designating means of such devices, and means governed by said sensing means upon sensing of a group designating means on a device in one of said groups to render said directing means effective to direct all of the devices of the group in which the device bearing the designating means is included into one of such storage receptacles and also governed by said sensing means in response to a like sensing of the designating means on a device in a succeeding group of devices to render said directing means effective to direct all of the devices in such succeeding group of devices into another of said storage receptacles.

16. In a machine of the character described, a pair of compartments in the machine each having an entrance and each of said compartments being adapted to house storage receptacles for printing or like devices sequentially fed through the machine, a gravity chute into which said devices are sequentially fed after a printing or like operation performed thereby, a guideway leading from the lower end portion of said gravity chute to the entrances to said compartments, means for moving said devices along said guideway from the lower end portion of said gravity chute to the entrances to said compartments, said moving means including a member for moving said devices one at a time from the lower end portion of said gravity chute to a position at the entrance to one of said compartments, said moving means also including a member for moving said devices one at a time from a position at the entrance to said one of said compartments into a position at the entrance to the other of said compartments, a gate controlling the entrance to each of said compartments and the admission of said devices thereto, means normally urging said gates into closed position, means tending to move said gates into open position against the action of said urging means, and means including a device under the control of the first one of said printing or like devices to enter one of said compartments for rendering said gate-moving means ineffective to open the gate which controls the entrance to the other of said compartments.

17. In a machine of the character described, a pair of compartments in the machine each having an entrance and each of said compartments being adapted to house storage receptacles for printing or like devices sequentially fed through the machine, a gravity chute into which said devices are sequentially fed after a printing or like operation performed thereby, a guideway leading from the lower end portion of said gravity chute to the entrances to said compartments, reciprocating means for moving said devices along said guideway from the lower end portion of said gravity chute to the entrances to said compartments, said moving means including a member for moving said devices one at a time from the lower end portion of said gravity chute to a position at the entrance to one of said compartments, said moving means also including a member for moving said devices one at a time from a position at the entrance to said one of said compartments into a position at the entrance to the other of said compartments, and means for maintaining said members out of engagement with any of said devices which may be disposed in said guideway during the ineffective or idle movement of said members, that is, into position to engage said devices for movement along said guideway toward the entrances to said compartments.

18. In a machine of the character described, a pair of compartments in the machine each having an entrance and each of said compartments being adapted to house storage receptacles for printing or like devices sequentially fed through the machine, a gravity chute into which said devices are sequentially fed after a printing or like operation performed thereby, a guideway leading from the lower end portion of said gravity chute to the entrances to said compartments, reciprocating means for moving said devices along said guideway from the lower end portion of said gravity chute to the entrances to said compartments, said moving means including a member for moving said devices one at a time from the lower end portion of said gravity chute to a position at the entrance to one of said compartments, said moving means also including a member for moving said devices one at a time from a position at the entrance to said one of said compartments into a position at the entrance to the other of said compartments, and means for keeping one of said members at all times out of engagement with said printing or like devices when said printing or like devices are being moved by the other of said members into that one of said compartments which is disposed nearest to the lower end portion of said gravity chute.

19. In a machine in which groups of printing devices or the like fed sequentially through the machine are adapted to be collected in corresponding groups after printing or like operations performed thereby, a plurality of compartments in said machine for housing storage receptacles for said devices, means for advancing said printing devices, routing means settable in repeated succession in different settings to route, different groups of said printing devices into different compartments in succession, a visible signal associated with each of said compartments for indicating the setting of said routing means, and means including a device under the control of a member carried by the leading one of said devices in each of said groups for conjointly operating said signals and said routing means.

20. In a machine through which printing devices or the like are sequentially fed, a compartment in said machine for housing a storage receptacle for said devices, a gravity chute into which said devices are fed one at a time after a printing or like operation performed thereby, a guideway through which said devices are conducted from the lower end portion of said chute to the entrance into said compartment, a gate located between said guideway and the lower end portion of said gravity chute, means for automatically closing said gate each time one of said devices drops down said chute, means for moving said devices one at a time from the lower end portion of said chute past said opened gate and along said guideway to the entrance to said compartment, and means under the control of said moving means for opening said gate.

21. In a machine through which printing devices or the like are sequentially fed, a compartment in said machine for housing a storage receptacle for said devices, a gravity chute into which said devices are fed one at a time after a printing or like operation performed thereby, a guideway through which said devices are conducted from the lower end portion of said chute to the entrance into said compartment, a gate located between said guideway and the lower end portion of said gravity chute, means for automatically closing said gate each time one of said devices drops down said chute, means for moving said devices one at a time from the lower end portion of said chute past said opened gate and along said guideway to the entrance to said compartment, means under the control of said moving means for opening said gate, and means under the control of said device-moving means for preventing other operations in the machine during the operation of said device-moving means.

22. In a machine in which printing devices or the like fed sequentially through the machine are adapted to be collected in groups after a printing or like operation is performed thereby, a pair of compartments in the machine each having an entrance and each of said compartments being adapted to house storage receptacles for printing or like devices sequentially fed through the machine, a gravity chute into which said devices are sequentially fed after a printing or like operation performed thereby, a guideway leading from the lower end portion of said gravity chute to the entrances to said compartments, means for moving said devices along said guideway from the lower end portion of said gravity chute to the entrances to said compartments, said moving means including a first member for moving said devices one at a time from the lower end portion of said gravity chute to a position at the entrance to the first of said compartments, said moving means also including a second member for moving said devices one at a time from a position at the entrance to said first compartment into a position at the entrance to the second of said compartments, gates respectively disposed at the entrances to said compartments for controlling the admission of said devices thereto, means normally urging said gates into closed position, reciprocatory positively driven means operating in timed relation with said device moving means, means interconnecting said gates and said reciprocatory means to enable said gates to be periodically opened against the action of said urging means for admitting devices into said compartments, the interconnecting means for the gate of said first compartment being yieldable, means operable to retain the last-named gate in its closed position against the action of said yieldable interconnecting means while the gate of said second compartment is opened, and governing means operable in repeated and like operations to sense similar control indicia afforded on the leading devices in the successive groups and responsive thereto for rendering said retaining means ineffective to prevent the opening of the gate of said first compartment during the passage of alternate groups of devices from the guideway to the entrance of said first compartment and for rendering said retaining means effective during passage of other alternate groups of devices from said guideway to the entrance of said first compartment, whereby one group of devices is admitted to said first compartment and the devices in the following group are advanced by said second member to said second compartment and are admitted thereto.

23. An apparatus as set forth in claim 22, in which said means for retaining the gate of said first compartment in closed position comprises a latch pawl mounted on a rock shaft, and wherein said governing means comprises a member for detecting the presence of said control indicia on said printing or like devices, a switch closable in response to the sensing of a control indicium on the leading device of each group thereof by said detecting member, and electromagnetic means under control of said switch and operating in response to successive closures thereof to adjust said rock shaft to alternate positions for thereby moving said latch pawl alternately into and out of gate latching position as successive groups of devices are advanced through said guideway.

24. In an apparatus as set forth in claim 22, a pair of lamps one associated with each of said compartments, and switch means under control of said governing means for causing a selected one of said lamps to become illuminated in accordance with which of said storage receptacles is to receive printing or like devices.

25. In a machine for successively utilizing printing or like devices introduced thereto and which includes a magazine or the like into which groups of such devices are transferred from respective storage receptacles to be held pending their introduction to the machine, means forming a discharge station to which said devices are fed after utilization thereof by the machine, other means forming a plurality of stations from which devices may be ejected by the machine, members pivotally mounted on said machine for supporting a plurality of storage receptacles respectively at said ejecting stations, each of said members being normally disposed in a first position wherein the receptacle carried thereby is adapted to receive devices ejected from the corresponding station and each member being independently movable to a second position for enabling said receptacle to be conveniently withdrawn therefrom, and means for automatically returning each group of devices to a respective storage receptacle after utilization thereof by the machine and as an incident thereto indicating the fact of such return, said automatic means comprising means for advancing said devices successively from said discharge station to said ejecting stations, selector means responsive to control indicia borne by certain of the devices in a corresponding plurality of successively advanced groups for directing the devices of each group to the storage receptacle at a respective one of said ejecting stations, and means under control of said selector means and operating when a change in groups is detected to automatically move the member supporting the receptacle containing the last preceding group of devices from its first position to its second position to thereby indicate that said last preceding group has been returned to its receptacle.

26. In a machine for successively utilizing printing or like devices introduced thereto and which includes a magazine into which groups of such devices are transferred from respective drawers to be held pending their introduction to the machine, means forming first and second stations from which devices may be ejected from the machine, supporting means on said machine for supporting drawers respectively at said ejecting stations, and means for automatically returning each group of devices to a respective drawer after utilization thereof by the machine and as an incident thereto indicating the fact of the return of a complete group, said automatic means comprising means adapted to feed devices which have been utilized by the machine to said first and second stations in sequence, the devices of each group being fed consecutively, gates respectively disposed at said ejecting stations for controlling the admission of devices to said drawers, means normally urging said gates into closed position, reciprocatory positively driven means operating in timed relation with said device moving means, means interconnecting said gates and said reciprocatory means to enable said gates to be periodically opened against the action of said urging means for admitting devices into said drawers, the interconnecting means for the gate at said first ejecting station being yieldable, a pawl operable to latch the last-named gate in its closed position against the action of said yieldable interconnecting means while the gate at said second ejecting station is opened, means for sensing the presence of control indicia on a predetermined one of the printing or like devices in each group thereof as they are advanced toward said first ejecting station, and selector means under control of said sensing means and operating to alternately adjust said pawl into and out of gate-latching position in response to the passage and sensing of the control indicia bearing devices of alternate groups of devices to said first ejecting station, whereby one group of devices is fed to a drawer at said first ejecting station when said pawl is out of gate-latching position and the succeeding group is fed to the drawer at said second ejecting station when said pawl is in said gate-latching position.

27. An apparatus as set forth in claim 26, in which said device feeding means comprises a first feeding means for advancing devices successively to said first ejecting station, and a second feeding means adapted to advance devices successively from said first ejecting station to said second ejecting station when the gate at said first ejecting station is closed, and which apparatus also includes means normally effective to disable said second member, and means controlled by said selector means for rendering said disabling means ineffective when said latching pawl is in its gate-latching position.

28. In an apparatus as set forth in claim 26, a pair of indicators each associated with a respective one of said ejecting stations, and means controlled by said selector means for selectively operating said indicators according to the selection of the ejecting station from which said devices are to be discharged to a drawer.

29. In a machine through which groups of printing or like devices are adapted to be fed sequentially, means constituting a pair of stations from which said devices may be selectively ejected from the machine, a pair of members movably mounted on said machine at said ejecting stations respectively and supporting a pair of drawers for receiving devices ejected by the machine, selector means responsive to control indicia on said devices for directing successive groups of devices to different drawers, means controlled by said selector means for independently moving each support member and the drawer carried thereby away from device-receiving position whenever a change in groups requires that devices be fed to the other drawer, and safety means operating when both drawers are concurrently disposed away from device-receiving position to interrupt feeding of said devices.

30. In a machine through which groups of printing or like devices are adapted to be fed sequentially, means constituting a plurality of stations from which said devices may be selectively ejected from the machine, a plurality of members movably mounted on said machine at said ejecting stations respectively and supporting a plurality of drawers for receiving devices ejected by the machine, selector means responsive to control indicia on said devices for directing successive groups of devices to different drawers, means controlled by said selector means for independently moving each support member and the drawer carried thereby away from device-receiving position whenever a change in groups requires that devices be fed to another drawer, and safety means operating when at least two of said drawers are concurrently disposed away from device-receiving position to interrupt feeding of said devices.

31. In a machine through which groups of printing or like devices are sequentially fed to have printing or other operations performed thereby, means forming a discharge station to which said devices are fed in the direction of the advancing movement thereof through said machine, means constituting a plurality of ejecting stations variantly spaced from said discharge station transversely of the direction of movement of said devices through the machine, a plurality of members pivotally mounted on said machine and each normally arranged to support a storage receptacle at a respective one of said ejecting stations, means for moving said devices successively from said discharge station to said ejecting stations in sequence, means at each of said ejecting stations operable to control the passage of devices therefrom into the respective storage receptacle, governing means responsive to predetermined indicia on certain of the devices in the successively fed groups thereof for rendering said ejecting stations and the control means therefor effective in sequence for directing each of a plurality of said groups of devices to a different storage receptacle, and means rendered effective whenever an entire group of devices has been deposited in any of said storage receptacles to cause the supporting member for such receptacle to be rocked away from its normal position.

32. In a machine through which relatively thin and substantially rectangular printing or like devices are successively advanced flatwise to be utilized by the machine in printing or like operations, a gravity chute to which said devices are delivered after passing through the machine, means forming a narrow horizontally extending guideway at the bottom of said chute, said devices being deposited vertically edgewise in said guideway after passing through said chute, a horizontally reciprocatory member, a first transfer pawl connected to said member and operating to successively engage and slide the devices on edge along said guideway and away from the point at which they are discharged by said chute, means constituting a first station in said guideway for receiving said devices from said first transfer pawl, means at said first station operable to discharge said devices from the machine as they are delivered to said first station, means for disabling said discharging means, means responsive to control indicia on certain of said devices for rendering said disabling means effective, means constituting a second station in said guideway, a second transfer pawl connected to said reciprocatory member and operable to advance said devices successively from said first station to said second station along said guideway when said discharging means is disabled, and means at said second station for discharging from the machine all devices delivered to said second station.

33. In a machine through which printing or like devices are adapted to be fed sequentially, said devices being divided into predetermined successive groups, a pair of members pivotally mounted on said machine and normally arranged to support a respective pair of storage receptacles in position to receive said devices as they are discharged from the machine, each of said receptacles being adapted to store the devices in a corresponding group thereof, a guideway to which said devices are successively delivered after passing through said machine, transfer means normally operating in timed relation with the delivery of devices to said guideway for moving said devices in sequence from said guideway into said receptacles and including selector means responsive to indicia on certain of said devices for directing successive groups of devices into said receptacles in alternation, means under control of said selector means and operating whenever a complete group is deposited in a receptacle to automatically cause the supporting member for such receptacle to assume an inactive position in which said receptacle is not adapted to receive devices from said machine, thereby indicating that a new receptacle should be substituted therefor and said supporting member thereupon manually returned to its normal position, a first safety means for detecting an unsafe variation from the aforesaid timed relation in the operation of said transfer means, a second safety means for detecting an unsafe overloading of any storage receptacle, a third safety means for detecting an unsafe condition existing when both of said supporting members are in their inactive positions, and means under the joint control of said first, second and third safety means and operating when an unsafe condition has been detected by any of said safety means to interrupt the feeding of said devices through the machine.

WALTER T. GOLLWITZER.